(12) United States Patent
Sugita et al.

(10) Patent No.: US 7,311,482 B2
(45) Date of Patent: Dec. 25, 2007

(54) MAIN SHAFT DEVICE AND MACHINE TOOL WITH THE SAME

(75) Inventors: Sumio Sugita, Kanagawa (JP);
Mitsuho Aoki, Kanagawa (JP);
Yoshifumi Inagaki, Kanagawa (JP);
Yasushi Morita, Kanagawa (JP)

(73) Assignee: NSK Ltd., Tokyo (JP)

( * ) Notice: Subject to any disclaimer, the term of this patent is extended or adjusted under 35 U.S.C. 154(b) by 238 days.

(21) Appl. No.: 10/534,354

(22) PCT Filed: Mar. 31, 2004

(86) PCT No.: PCT/JP2004/004591

§ 371 (c)(1),
(2), (4) Date: May 9, 2005

(87) PCT Pub. No.: WO2004/087353

PCT Pub. Date: Oct. 14, 2004

(65) Prior Publication Data

US 2006/0034670 A1    Feb. 16, 2006

(30) Foreign Application Priority Data

| Mar. 31, 2003 | (JP) | 2003-096503 |
| Apr. 7, 2003 | (JP) | 2003-103219 |
| Nov. 14, 2003 | (JP) | 2003-384703 |
| Dec. 17, 2003 | (JP) | 2003-419854 |
| Jan. 5, 2004 | (JP) | 2004-000261 |

(51) Int. Cl.
*B23C 1/00* (2006.01)

(52) U.S. Cl. .................. 409/231; 408/239 R; 409/233

(58) Field of Classification Search ................ 409/231, 409/232, 233; 408/239 R, 239 A; 82/147; 451/178; 310/66, 90, 91
See application file for complete search history.

(56) References Cited

U.S. PATENT DOCUMENTS 4,944,638 A * 7/1990 Brohammer ................ 409/231
5,307,901 A * 5/1994 Stromberg .................. 184/5.1

(Continued)

FOREIGN PATENT DOCUMENTS

CN    1158288 A    9/1997

(Continued)

OTHER PUBLICATIONS

Machine Translation of DE 10027750, 4 pages.*

*Primary Examiner*—Erica Cadugan
(74) *Attorney, Agent, or Firm*—Sughrue Mion, PLLC

(57) ABSTRACT

An object of the invention is to provide a spindle apparatus which facilitates assembling and removing operations at the time of maintenance and which is low cost. In the invention, the diameter becomes smaller in the order of an inner peripheral diameter of an outer cylinder (3), an inside diameter of a stator (4), and an outside diameter of a bearing sleeve (11); a sub-assembly (2) made up of a front housing (8), a rotating shaft (6), and the bearing sleeve (11) is withdrawable from the outer cylinder (3); and the diameter of a rotating part in an arbitrary section located rearwardly of the bearing sleeve (11) is made smaller than a minimum diameter of a non-rotating part between a rear end of the bearing sleeve (11) and the section.

24 Claims, 29 Drawing Sheets

U.S. PATENT DOCUMENTS

| | | | |
|---|---|---|---|
| 2004/0074074 A1 * | 4/2004 | Kikkawa et al. | 29/402.08 |
| 2007/0110533 A1 * | 5/2007 | Geissler et al. | 409/231 |

FOREIGN PATENT DOCUMENTS

| | | |
|---|---|---|
| DE | 19532976 A1 * | 3/1997 |
| DE | 10027750 A1 * | 12/2001 |
| EP | 0 743 511 A1 | 11/1996 |
| EP | 0743511 A1 | 11/1996 |
| JP | 3-142142 A | 6/1991 |
| JP | 05-277806 A | 10/1993 |
| JP | 07-024603 A | 1/1995 |
| JP | 7-112303 A | 5/1995 |
| JP | 08-294802 A | 11/1996 |
| JP | 11-99403 A | 4/1999 |
| JP | 11-138305 A | 5/1999 |
| JP | 2000-52104 A | 2/2000 |
| JP | 2003-159622 A | 6/2003 |

* cited by examiner

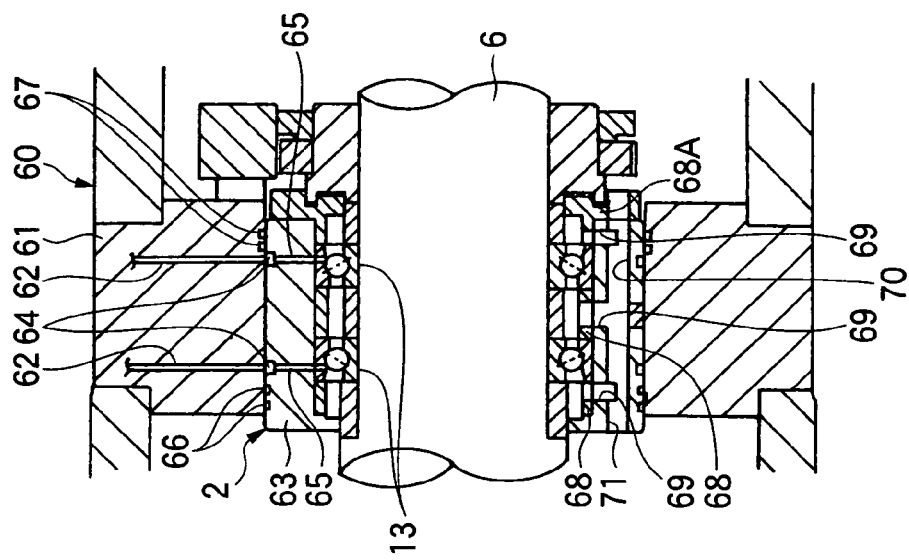
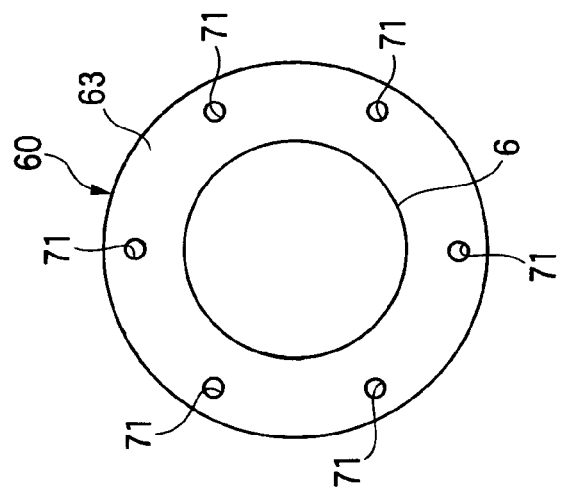

MAIN SHAFT DEVICE AND MACHINE TOOL WITH THE SAME

TECHNICAL FIELD

The present invention relates to a spindle apparatus equipped in a machine tool such as a milling machine or a machining center, and a machine tool having the spindle apparatus.

BACKGROUND ART

Conventionally, as a spindle apparatus of a machine tool or the like, a built-in motor spindle apparatus having a front side bearing interposed between a front housing and a spindle shaft and a rear side bearing interposed on an outer periphery of a rear portion of the spindle shaft is conventionally known, as described in, for example, JP-A-7-112303 (hereafter referred to as a "patent document 1") and JP-A-2003-159622 (hereafter referred to as a "patent document 2").

As shown in FIG. 31, a built-in motor spindle apparatus 500 disclosed in the patent documents 1 and 2 includes a motor housing 502 held by a unit supporting member 501, as well as a front housing 503 which is joined to a front side of this motor housing 502. The built-in motor spindle apparatus 500 further includes a spindle shaft 505, which is fitted in this motor housing 502 and the front housing 503, and a stator 506 secured to an inner periphery of an intermediate portion of the motor housing 502, a rotor 507 being secured to an outer periphery of the intermediate portion of the motor housing 502.

Further, the spindle shaft 505 is formed in a hollow tubular shape, and a drawbar 509 which is urged by a coned disk spring 508 and is slidable in the tube is provided in the tube, a chuck portion 510 being provided at its tip. Further, four front side bearings 511 are interposed between the front housing 503 and the spindle shaft 505. In addition, a rear side bearing 512, which is a cylindrical roller bearing, and a bearing sleeve 513 are fitted over an outer periphery of a rear portion of the spindle shaft 505, and a rear cover 514 is bolted to a rear portion of the motor housing 502.

Incidentally, with the machine tool, a failure of the spindle is frequently caused primarily by damage occurring in the bearings. Its causes are the life of the bearings, a collision of the spindle due to a machining program error, and the like. The reduction of the time (downtime) from the failure of the spindle until it is reset is particularly important at a site of parts machining which is directly linked to a production line of automotive parts machining or the like. In addition, a trend toward the higher speed of the machine tool spindle is under way, and the spindle bearing life for low-speed machines (less than 600,000 dmN) (dm: pitch circle diameter (mm) of a rolling bearing, N: rotational speed (min$^{-1}$)) has been virtually unlimited at 100,000 hours or more, whereas the spindle bearing life for high-speed machines is becoming 10,000 to 20,000 hours. Thus, the spindle bearings have come to be regarded as being handled as consumables, so that there has arisen a need to lower the maintenance cost.

With the spindle apparatus 500 disclosed in the above-described patent document 1, the spindle shaft 505 is arranged to be drawn out for the improvement of the maintenance efficiency. However, with this arrangement, although the spindle shaft 505 can be drawn out, no description is given as to the replacement of the rear side bearing 512 which is a cylindrical roller bearing. If the rear side bearing 512 is damaged, the time and trouble involved in the maintenance remain unchanged from a conventional case. In addition, since a projecting portion of a lubricating nozzle is not provided to draw out the spindle shaft 505, 2 to 10 hours or thereabouts is inevitably required as the running-in time for the rear side bearing 512 after its assembly. Hence, there has been a problem in that the downtime becomes long.

In addition, with the spindle apparatus 500 disclosed in the above-described patent document 2, there has been a problem in that the operating efficiency is poor, since at the time of removing the spindle, an operator must move around to the rear side to remove a pipe, and at the time of assembly an operation is further required for adjusting a bearing case to the phase of the pipe.

As another example of the spindle apparatus of a machine tool or the like, a spindle apparatus in which a plurality of coned disk springs are stacked and disposed between the sleeve housing and the bearing sleeve is conventionally known, as described in, for example, JP-A-11-138305 (hereafter referred to as a "patent document 3").

In the spindle apparatus, one bearing (rear side bearing) is fixed to the bearing sleeve which is fitted in the sleeve housing and is movable in the axial direction, so as to be able to absorb the axial displacement when the rotating shaft has become axially elongated due to heat generation or the like at the time of high-speed rotation. As for the fit between the sleeve housing and the bearing sleeve, a plane surface sliding method in which a simple fit is used, a ball sliding method using an axially movable ball bush, and the like are known. Slidability as well as radial stiffness and axial vibration damping properties are required for the bearing sleeve for supporting the free end side of the rotating shaft.

In the case where the plane surface sliding method is adopted for the fitting between the sleeve housing and the bearing sleeve, the fitting clearance decreases in conjunction with heat generation, so that it is necessary to set an initial fitting clearance to be large. This has constituted one factor increasing the vibration of the rotating shaft when the spindle apparatus rotates. Meanwhile, in the case of the ball sliding method of the fitting using the ball bush, an increase in the interference due to heat generation hinders the smooth axial movement of the bearing sleeve, and the axial stiffness is low. Hence, there have been cases where self-excited vibration called the chattering of the rotating shaft occurs.

For this reason, in the spindle apparatus disclosed in the patent document 3, to damp the self-excited vibration of the rotating shaft, the arrangement is provided such that a plurality of coned disk springs are stacked between the sleeve housing and the bearing sleeve so as to increase the axial stiffness and prevent the self-excited vibration through the friction of the coned disk springs.

However, in the spindle apparatus disclosed in the patent document 3, the self-excited vibration is arranged to be damped through the friction of the coned disk springs, and the damping force is determined by the spring constant of the coned disk spring, the number of the coned disk springs, their installation direction, and the like. These items, which are set at the time of assembling the spindle apparatus, are constant and fixed unless the coned disk springs are recombined by such as disassembling the spindle apparatus. In other words, it has been difficult to change the characteristics in correspondence with the conditions of rotation, e.g., to reset the damping factor and the like to values optimal to the operating conditions.

In recent years, the trend toward the higher speed of the spindle apparatus is noticeable, and the amount of heat generated has also increased in consequence of the trend toward the higher speed. Therefore, there has been a demand for a more sophisticated method of supporting the rotating shaft, which is capable of coping with it.

In addition, as one example of the machine tool having the spindle apparatus, a machine tool in which the housing of the spindle head is divided into a front housing and a rear housing and the two members are fastened by bolts is conventionally known, as described in, for example, JP-A-2003-159622 (the "patent document 2").

In such a machine tool, an arrangement is provided such that not the entire cartridge but the shaft, the front side bearing, the front housing, the rotor of the built-in motor, the rear side bearing, and the rear housing are removed as a spindle sub-assembly by leaving the stator of the built-in motor and the outer cylinder.

Incidentally, in a machine tool, in a case where the spindle apparatus is replaced due to a failure or the arrival of its life, with a type which is so constructed as to incorporate the bearings and the stator individually into the spindle head, the replacement operation takes time, and the downtime of the machine increases. Accordingly, it is known that the replacement time can be shorted by structuring the spindle apparatus so as to be capable of being divided and assembled integrally as a cartridge with respect to the spindle head.

Although there is also a type having a structure in which the entire spindle cartridge is drawn out, with this structure it is necessary to disengage oil and air pressure pipings and cables in the case of the built-in motor system, so that the operation takes time.

In contrast, in the above-described patent document 2, the arrangement is provided such that not the entire cartridge but the shaft, the front side bearing, the front housing, the rotor of the built-in motor, the rear side bearing, and the rear housing are removed integrally as a spindle sub-assembly by leaving the stator of the built-in motor and the outer cylinder. However, although at the time of disassembling the spindle cartridge it is necessary to withdraw from the spindle head all the portion of the spindle cartridge which is located inside the spindle head, the spindle cartridge is a heavy piece and cannot be pulled out manually.

Accordingly, the spindle cartridge can be drawn out safely and in a short time if the spindle cartridge is fixed to a worktable of the machine tool and is drawn out by making use of the feeding in a Z-axis which is a feeding axis parallel to the axial direction of the spindle. However, if the amount of Z-axis movement is shorter than the length necessary for the spindle cartridge to be completely drawn out from the spindle head, the withdrawal making use of the Z-axis feeding becomes impossible.

In addition, when the spindle cartridge is disassembled, the operation of disengaging many oil and air pressure pipings and cables is required, and the replacement time is long. In contrast, in the case of the spindle sub-cartridge, the operation of disengaging the many oil and air pressure pipings and cables is not required. However, if the amount of Z-axis movement is shorter than the length necessary for the spindle cartridge to be completely drawn out from the spindle head, the withdrawal making use of the Z-axis feeding becomes similarly impossible.

Meanwhile, in the case of a structure in which a flat mounting surface is provided on a side surface of the spindle cartridge and the spindle cartridge is fixed from its side surface to the spindle head, the spindle cartridge can be disassembled from the spindle head irrespective of the amount of Z-axis movement. With this method, however, since the load is received only by the side surface of the spindle cartridge, the fastening stiffness becomes low, so that this method is inappropriate in terms of stiffness.

In addition, with the above-described patent document 2, it is unnecessary to disengage the oil and air pressure pipings and cables, but parts cannot be removed excluding those parts which can be removed as a sub-cartridge. For this reason, this arrangement does not function effectively at the time of the failure of the stator, an unclamp cylinder, or the like, so that this arrangement lacks a functional feature concerning disassembly.

The spindle apparatus and the machine tool having the spindle apparatus in accordance with the invention are invented in view of such circumstances, and a first object of the invention is to provide a spindle apparatus which facilitates assembling and removing operations at the time of maintenance and which is low cost. A second object of the invention is to provide a spindle apparatus which has high stiffness and excels in satisfactory damping properties and slidability. A third object of the invention is to provide a machine tool in which a spindle cartridge or a spindle sub-cartridge can be disassembled and assembled in a short time, which minimizes the machine height, and which has high stiffness. A fourth object of the invention is to provide a spindle apparatus which is capable of attaining improvement of the maintenance efficiency by making it possible to facilitate the operation of replacing all internal component parts.

DISCLOSURE OF THE INVENTION

The spindle apparatus subject to the invention has an outer cylinder, a rotating shaft, a front side bearing, and a rear side bearing in the same way as the above-described conventional structure, and is assembled to a machine too, and the rotating shaft rotates at high speed.

In particular, the spindle apparatus according to the present invention includes: an outer cylinder having a stator; a rotatable rotating shaft having a rotor; a front side bearing having an outer ring fixed to a front housing and an inner ring fitted over one end of the rotating shaft; a bearing sleeve disposed on another end side of the rotating shaft and fitted in the outer cylinder so as to be movable in an axial direction of the rotating shaft; and a rear side bearing having an inner ring fitted over the other end of the rotating shaft and an outer ring fixed to the bearing sleeve to rotatably support the rotating shaft in cooperation with the front side bearing, wherein the diameter becomes smaller in the order of an inner peripheral diameter of the outer cylinder, an inside diameter of the stator, and an outside diameter of the bearing sleeve, a sub-assembly made up of the front housing, the rotating shaft, and the bearing sleeve is withdrawable from the outer cylinder, and a radius of a rotating parts in an arbitrary section located rearwardly of the bearing sleeve is smaller than a minimum radius of a non-rotating parts between a rear end of the bearing sleeve and the section.

In addition, the spindle apparatus according to the present invention includes: an outer cylinder having a stator; a rotatable rotating shaft having a rotor; a front side bearing having an outer ring fixed to a front housing and an inner ring fitted over one end of the rotating shaft; a bearing sleeve disposed on another end side of the rotating shaft and fitted in the outer cylinder so as to be movable in an axial direction of the rotating shaft; and a rear side bearing having an inner ring fitted over the other end of the rotating shaft and an outer ring fixed to the bearing sleeve to rotatably support the rotating shaft in cooperation with the front side bearing, wherein a sub-assembly made up of the front housing, the rotating shaft, and the bearing sleeve is withdrawable from the outer cylinder, and an inside diameter part capable of replacing a tool is incorporated in the rotating shaft, and a piston mechanism for tool replacement is provided.

In addition, in the spindle apparatus according to the present invention, a distance between a mounting reference plane of the sub-assembly and a piston pressing surface of the inside diameter part is adjusted to within ±0.1 mm relative to a reference dimension.

In addition, in the spindle apparatus according to the present invention, the inside diameter part is incorporated in such a manner as to be capable of compressing a spring, and an adjustment part is fixed to a rear portion of the inside diameter part, the piston pressing surface for pressing the piston mechanism being formed on the adjustment part.

In addition, in the spindle apparatus according to the present invention, the front housing is fitted to the outer cylinder with an interference fit.

In addition, in the spindle apparatus according to the present invention, the bearing sleeve is fitted in a sleeve housing, and an outside diameter of the bearing sleeve is clearance-fitted with respect to an inside diameter of the sleeve housing.

In addition, in the spindle apparatus according to the present invention, a plurality of pairs of O-rings are interposed between the outside diameter of the bearing sleeve and the inside diameter of the sleeve housing.

In addition, in the spindle apparatus according to the present invention, a ratio between, on the one hand, a fitting length of the bearing sleeve and the sleeve housing and, on the other hand, an outside diameter of the bearing sleeve is set within a range of "fitting length/outside diameter=0.45 to 0.8."

In addition, in the spindle apparatus according to the present invention, there are provided a plurality of lubricant discharging holes provided circumferentially in the bearing sleeve, circumferential grooves provided in a fitting surface of an outer periphery of the bearing sleeve, and radial lubricant supplying passages communicatingly connected to the circumferential grooves.

In addition, in the spindle apparatus according to the present invention, the rear side bearing is a back-to-back arrangement angular contact ball bearing with fixed-position preload.

In addition, in the spindle apparatus according to the present invention, grease lubrication is adopted.

In addition, in the spindle apparatus according to the present invention, a grease replenishing unit is provided.

In addition, in the spindle apparatus according to the present invention, a mechanism is provided for discharging excess grease after the supply of grease.

In addition, in spindle apparatus according to the present invention, a very small amount of lubrication of any one of oil-air, oil-mist, and direct-injection lubrication is used.

In addition, the spindle apparatus according to the present invention includes: a rotatable rotating shaft having a rotor; a front side bearing having an outer ring fixed to a front housing and an inner ring fitted over one end of the rotating shaft; a bearing sleeve disposed on another end side of the rotating shaft and fitted in a sleeve housing so as to be movable in an axial direction of the rotating shaft; and a rear side bearing having an inner ring fitted over the other end of the rotating shaft and an outer ring fixed to the bearing sleeve to rotatably support the rotating shaft in cooperation with the front side bearing, the spindle apparatus being capable of displacing the other end of the rotating shaft in the axial direction, wherein an elastic body for sealing the sleeve housing and the bearing sleeve is provided between fitting surfaces of the sleeve housing and the bearing sleeve, and a fluid for applying pressure is arranged to be supplied to the elastic body.

In addition, in the spindle apparatus according to the present invention, the elastic body is an O-ring, and the fluid is compressed air, the compressed air being supplied between the O-rings provided in a plural number, so as to apply the pressure to the O-rings.

In addition, in the spindle apparatus according to the present invention, the pressure of the fluid for applying pressure to the elastic body is variable.

In addition, in the spindle apparatus according to the present invention, the O-ring is formed of nitrile rubber or fluoro rubber, and the interference when the O-ring is installed between the sleeve housing and the bearing sleeve is not less than 10% of a working standard value and not more than the working standard value.

In addition, in the spindle apparatus according to the present invention, a plurality of sets of elastic bodies are disposed as the elastic body, each of the sets being formed by a plurality of elastic bodies, one of the sets of elastic bodies arranged at both ends being disposed on the bearing sleeve, another one of the sets of elastic bodies being disposed on the sleeve housing.

In addition, a machine tool according to the present invention includes:

a spindle cartridge including a rotatable rotating shaft, a front side bearing having an inner ring fitted over one end of the rotating shaft, a front housing in which an outer ring of the front side bearing is fitted, a rotor of a built-in motor, a stator of the built-in motor, a rear side bearing having an inner ring in which a rear end of the rotating shaft is fitted, and an outer cylinder fitted in a spindle head, wherein the spindle cartridge is inserted in a spindle cartridge gripping portion provided in an axial direction of the spindle head, and an amount of movement in a feeding axis direction parallel to an axial direction of the rotating shaft is set to be longer than a length necessary for inserting the spindle cartridge into the spindle head, whereby the spindle cartridge is capable of being disassembled and assembled integrally with respect to the spindle head.

In addition, a machine tool according to the present invention includes: a spindle sub-cartridge including a rotatable rotating shaft, a front side bearing having an inner ring fitted over one end of the rotating shaft, a front housing in which an outer ring of the front side bearing is fitted, a rotor of a built-in motor, a stator of the built-in motor, a rear side bearing having an inner ring in which a rear end of the rotating shaft is fitted, and a bearing sleeve in which an outer ring of the rear side bearing is fitted, wherein an amount of movement in a feeding axis direction parallel to an axial direction of the rotating shaft is set to be longer than a length necessary for inserting the spindle sub-cartridge into the spindle head, whereby the spindle sub-cartridge is capable of being disassembled and assembled integrally with respect to the spindle head.

In addition, in the machine tool according to the present invention, the spindle cartridge gripping portion of the spindle head can be disassembled by being divided at a position for dividing at least in half.

In addition, a spindle apparatus according to the present invention includes: an outer cylinder having a stator; a spindle head in which the outer cylinder is fitted; a rotatable rotating shaft with a rotor disposed inside the stator; a front side bearing having an inner ring in which one end of the rotating shaft is fitted; a rear side bearing having an inner ring in which another end of the rotating shaft is fitted; a front housing in which an outer ring of the front side bearing is fitted and which is installed at one end of the outer cylinder; a sleeve housing in which an outer ring of the rear side bearing is fitted and which is fitted in another end of the outer cylinder; and a tool unclamp cylinder fixed to one end of the outer cylinder, wherein the rotating shaft with the rotor, the front side bearing, the rear side bearing, the front housing, and the sleeve housing are integrally assembled to form a spindle sub-cartridge, the spindle sub-cartridge, the outer cylinder, and the tool unclamp cylinder are arranged in a three-divided form, and the spindle sub-cartridge is withdrawable from the outer cylinder.

In addition, in the spindle apparatus according to the present invention, the tool unclamp cylinder is withdrawable from the outer cylinder.

In addition, in the spindle apparatus according to the present invention, an assembly of the tool unclamp cylinder and the outer cylinder with the spindle sub-cartridge withdrawn therefrom is withdrawable from the spindle head.

In addition, in the spindle apparatus according to the present invention, an assembly of the spindle sub-cartridge, the outer cylinder, and the tool unclamp cylinder is withdrawable from the spindle head.

In addition, in the spindle apparatus according to the present invention, a coupler having various fluid pipings and a power supply coupler is detachably installed on the tool unclamp cylinder or the outer cylinder.

In addition, in the spindle apparatus according to the present invention, a sensor for detecting the rotation of the rotating shaft is disposed between the rotating shaft and the outer cylinder.

According to the spindle apparatus of the invention constructed as described above, a sub-assembly made up of the front housing, the rotating shaft, and the bearing sleeve is withdrawable from the outer cylinder. As a result, the assembling efficiency improves, and these parts can be replaced speedily when they become damaged. In addition, as for the bearing sleeve, since the rear side bearing is in an assembled state, the state of grease does not change in the withdrawal and insertion of the sub-assembly.

Accordingly, with this spindle apparatus, as the sub-assembly is kept in stock after performing the running-in operation in advance by using another outer cylinder, the sub-assembly can be replaced at the time of the damage of the rotating shaft, and the normal operation is made possible immediately, thereby permitting a substantial reduction in downtime. In addition, a cost reduction is made possible in comparison with the replacement of the entire spindle apparatus, and a reduction in inventory cost is also made possible. As a result, it becomes possible to overcome the conventional problem that the downtime becomes long since the running-in operation of the bearings is required after assembly since grease lubrication is adopted for which the time and trouble in maintenance cannot be reduced.

In addition, the diameter becomes smaller in the order of the inner peripheral diameter of the outer cylinder, the inside diameter of the stator, and the outside diameter of the bearing sleeve. To ensure that the non-rotating parts does not constitute a hindrance when an attempt is made to withdraw the spindle in the rear of the bearing sleeve, the radius of the rotating part in an arbitrary section is smaller than a minimum radius of the non-rotating part between the rear end of the bearing sleeve and that section, thereby preventing the non-rotating part from constituting a hindrance. Accordingly, when an attempt is made to withdraw the sub-assembly, the piston mechanism and the like, which are the non-rotating part, for holding/releasing the tool do not constitute a hindrance Here, as the front side bearing, it is possible to cite by way of example a multi-row arrangement angular contact ball bearing. In addition, as the rear side bearing, it is possible to cite by way of example a pair of angular contact ball bearings.

In addition, if the sub-assembly made up of the front housing, the rotating shaft, and the bearing sleeve is withdrawable from the outer cylinder, the assembling efficiency improves, and these parts can be replaced speedily when they became damaged. In addition, as for the bearing sleeve, since the rear side bearing is in an assembled state, the state of grease does not change in the withdrawal and insertion of the sub-assembly.

Accordingly, with this spindle apparatus, as the sub-assembly is kept in stock after performing the running-in operation in advance by using another outer cylinder, the sub-assembly can be replaced at the time of the damage of the spindle apparatus, and the normal operation is made possible immediately, thereby permitting a substantial reduction in downtime. In addition, a cost reduction is made possible in comparison with the replacement of the entire spindle apparatus, and a reduction in inventory cost is also made possible.

In addition, since the tool replacement is effected through the piston mechanism by the inside diameter part incorporated in the rotating shaft, in comparison with an externally exposed type, it is possible to effect the tool replacement with high lubricating performance.

In addition, unclamping can be performed appropriately if the distance between the mounting reference plane of the sub-assembly and the piston pressing surface of the inside diameter part is adjusted to within ±0.1 mm relative to the reference dimension. Therefore, piston adjustment is made unnecessary at the time of performing the replacement of the sub-assembly, making it possible to improve the maintenance efficiency.

In addition, if the inside diameter part is incorporated in such a manner as to be capable of compressing a spring, and the adjustment part is fixed to a rear portion of the inside diameter part, and the piston pressing surface for pressing the piston mechanism is formed on the adjustment part, then the amount of pushing of the tool holder can be set to a predetermined value by the adjustment part. Therefore, it is possible to appropriately effect unclamping by adjusting its tolerance. As a result, piston adjustment is made unnecessary at the time of performing replacement of the inside diameter part, making it possible to improve the maintenance efficiency.

In addition, if the front housing is fitted to the outer cylinder with an interference fit, in cases such as where the sub-assembly is subjected to disassembly, assembly, or replacement, offset does not occur between the axes of the front housing and the outer cylinder, making it possible to maintain high accuracy.

In addition, if the bearing sleeve is fitted in the sleeve housing, and the outside diameter of the bearing sleeve is clearance-fitted with respect to the inside diameter of the sleeve housing, the rear side bearing and the bearing sleeve function mainly to support the rotating shaft, but are capable of absorbing with a simple structure the axial displacement such as thermal expansion due to the heat generation by the rotor.

In addition, if a plurality of pairs of O-rings are interposed between the outside diameter of the bearing sleeve and the inside diameter of the sleeve housing, the leakage of the lubricant is prevented by the plurality of pairs of O-rings between the outside diameter of the bearing sleeve and the inside diameter of the sleeve housing, and the vibration of the bearing sleeve can be damped by the damping effect based on the interference of the O-rings.

In addition, if the ratio between, on the one hand, a fitting length of the bearing sleeve and the sleeve housing and, on the other hand, the outside diameter of the bearing sleeve is set within a range of "fitting length/outside diameter=0.45 to 0.8," the outside diameter of the bearing sleeve and the length of the fitting portion of the sleeve housing is set to an appropriate relationship. Hence, it is possible to obtain a structure of the sub-assembly excelling in the maintenance efficiency and the performance of the machine tool.

In addition, if there are provided a plurality of lubricant discharging holes provided circumferentially in the bearing sleeve, circumferential grooves provided in a fitting surface of the outer periphery of the bearing sleeve, and radial lubricant supplying passages communicatingly connected to the circumferential grooves, then it becomes possible to discharge the lubricant without a problem at whatever phase the bearing sleeve may be. Although a discharging hole is required on the lower side in the case of, for instance, a horizontally mounted spindle, discharging can be effected since one of the holes faces the lower side. Furthermore, the lubricant can be supplied at whatever position the bearing sleeve may be. Accordingly, it becomes unnecessary to adjust the phase of the bearing sleeve, so that the operating efficiency in maintenance is excellent.

In addition, if the rear side bearing is a back-to-back arrangement angular contact ball bearing with fixed-position preload, it is possible to absorb with a simple structure the axial displacement such as thermal expansion due to the heat generation by the rotor.

In addition, if grease lubrication is adopted, maintenance can be performed at a small cost by virtue of grease lubrication which is easy to handle and is relatively inexpensive.

In addition, if a grease replenishing unit is provided, it is possible to replenish the shortage of grease by the grease replenishing unit, making it possible to avoid a seizure and the like.

In addition, if a mechanism is provided for discharging excess grease after the supply of grease, the lubricant which is supplied to the interior of the bearing and has become unnecessary adheres to a rotating member such as an outer ring spacer disposed in the vicinity of the bearing. The lubricant adhering to the rotating member is slung off to outside the bearing by the rotational force. Consequently, the lubricant which became unnecessary can be forcibly discharged to outside the bearing.

In addition, if a very small amount of lubrication of any one of oil-air, oil-mist, and direct-injection lubrication is used, it is possible to effect highly efficient lubrication through a very small amount of lubrication of any one of oil-air, oil-mist, and direct-injection lubrication. Hence anti-seizure properties can be improved further.

In addition, if an elastic body is arranged between fitting surfaces of the sleeve housing and the bearing sleeve made movable in the axial direction of the rotating shaft by fitting to the sleeve housing, it is possible to increase the radial stiffness by the elastic body and improve the damping factor on the axial direction, thereby making it possible to prevent the self-excited vibration of the rotating shaft. In addition, since a fluid for applying pressure is arranged to be supplied to the elastic body, it is possible to further increase the radial stiffness by allowing the elastic body to be deformed, and enhance the effect of suppressing the self-excited vibration of the rotating shaft by improving the damping factor on the axial direction.

In addition, the elastic body is an O-ring, and the fluid is compressed air, the compressed air being supplied between the O-rings provided in a plural number, so as to apply the pressure to the O-rings. Therefore, it is possible to effectively prevent the self-excited vibration of the rotating shaft by increasing the radial stiffness while maintaining high slidability. In addition, since the O-ring excels in workability and versatility, a high-performance spindle apparatus can be fabricated without requiring a complex manufacturing process.

In addition, if the pressure of the fluid for applying pressure to the elastic body is made variable, the amount of deformation of the elastic body due to the pressure of the fluid can be varied by changing the pressure in correspondence with the working conditions of the spindle apparatus. In addition, the self-excited vibration of the rotating shaft can be effectively prevented by setting the radial stiffness and the damping factor of the elastic body to values optimal to the working conditions. In addition, the radial stiffness and the damping factor of the elastic body can be changed by merely changing the pressure of the fluid supplied, and can be changed very easily.

In addition, the O-ring is formed of nitrile rubber or fluoro rubber, and the interference of the O-ring is set to be not less than 10% of a working standard value and not more than the working standard value. Therefore, the O-ring has a sealing effect and an elastically supporting effect, has wear resistance against the axial movement and heat resistance against heat generation, and can thereby be made to have a long life. In addition, it is possible to improve the radial stiffness and the axial damping properties while maintaining the slidability by appropriately increasing the stiffness of the O-ring.

In addition, a plurality of sets of elastic bodies are disposed, each of the sets being formed by a plurality of elastic bodies, one of the sets of elastic bodies arranged at both ends being disposed on the bearing sleeve, the other one of the sets of elastic bodies on the sleeve housing. If this arrangement is provided, the assembly is facilitated, and the possibility of causing damage to the O-rings is small. It should be noted that the effect whereby the movement of the bearing sleeve is allowed to take place uniformly an stably in cases where various loads are applied to the spindle apparatus is identical to a case where the elastic body is disposed only on the bearing sleeve and a case where it is disposed only on the sleeve housing. Further, an arrangement may be provided such that two elastic bodies are disposed in the spindle apparatus, one on the bearing sleeve and the other on the sleeve housing, and a fluid is supplied to between the elastic bodies.

In addition, the spindle cartridge is inserted in the spindle cartridge gripping portion provided in the axial direction of the spindle head, and the amount of movement in the feeding axis direction parallel to the axial direction of the rotating shaft is set to be longer than the length necessary for inserting the spindle cartridge into the spindle head. The spindle cartridge is thereby capable of being disassembled and assembled integrally with respect to the spindle head. Consequently, since the amount of movement in the Z-axis, which is the feeding axis direction parallel to the axial direction of the rotating shaft, is set to be longer than the length necessary for inserting the spindle cartridge into the spindle head, it is possible to easily effect the withdrawal making use of the Z-axis feeding.

In addition, the amount of movement in the feeding axis direction parallel to the axial direction of the rotating shaft is set to be longer than the length necessary for inserting the spindle sub-cartridge into the spindle head. The spindle sub-cartridge is thereby capable of being disassembled and assembled integrally with respect to the spindle head. Consequently, since the amount of movement in the Z-axis, which is the feeding axis direction parallel to the axial direction of the rotating shaft, is set to be longer than the length necessary for inserting the spindle sub-cartridge into the spindle head, it is possible to easily effect the withdrawal making use of the Z-axis feeding.

In addition, if the spindle cartridge gripping portion of the spindle head can be disassembled by being divided at a position for dividing at least in half, even if, for instance, the amount of Z-axis movement is set to be short, removal and assembly can be performed by dividing and developing the spindle cartridge gripping portion of the spindle head. Further, the stiffness of the entire machine tool can be increased by increasing the fastening stiffness of the spindle cartridge and the spindle head.

In addition, the rotating shaft with the rotor, the front side bearing, the rear side bearing, the front housing, and the sleeve housing are integrally assembled to form the spindle sub-cartridge, the spindle sub-cartridge, the outer cylinder, and the tool unclamp cylinder are arranged in a three-divided form, and the spindle sub-cartridge is withdrawable from the outer cylinder.

Accordingly, since the rotating shaft with the rotor, the front side bearing, the rear side bearing, the front housing, and the sleeve housing, which make up the spindle sub-cartridge, can be withdrawn integrally from the outer cylinder, only the rotating shaft, the front side bearing, and the rear side bearing which require inspection, repair, or replacement can be easily dismounted without disassembling the entire spindle apparatus. Consequently, it becomes possible to control any parts making up the spindle cartridge without removing the wirings and pipings.

Here, as the spindle apparatus, it is possible to cite by way of example an apparatus which rotates at high speed while replaceably gripping a multiplicity of tools. Such a spindle apparatus is subjected to high cutting resistance during the machining of workpieces, so that a tool mounting hole in the spindle becomes worn, a collet and a coned disk spring become damaged, and the bearings become worn or damaged. For this reason, in cases where repair is conducted for such a failure or trouble at the site of use, it is general practice to perform reassembly after disengaging electric wirings for a built-in motor and a limit switch, disassembling the entire spindle apparatus, and replacing the spindle, parts or bearings within the spindle. This repair operation is a large-scale one, needs high-level expertise and skills, and requires a large amount of time.

In addition, if the tool unclamp cylinder is withdrawable from the outer cylinder, only the tool unclamp cylinder can be easily dismounted without disassembling the entire spindle apparatus, so that inspection, repair, or replacement is easily possible for any parts making up the tool unclamp cylinder.

In addition, if an assembly of the tool unclamp cylinder and the outer cylinder with the spindle sub-cartridge withdrawn therefrom is withdrawable from the spindle head, in addition to the spindle sub-cartridge, an assembly of the outer cylinder and the tool unclamp cylinder can be easily dismounted from the spindle head without disassembling the entire spindle apparatus. Hence, inspection, repair, or replacement is easily possible for any parts making up the outer cylinder or the tool unclamp cylinder.

In addition, if an assembly of the spindle sub-cartridge, the outer cylinder, and the tool unclamp cylinder is withdrawable from the spindle head, an assembly of the spindle sub-cartridge, the outer cylinder, and the tool unclamp cylinder can be easily dismounted from the spindle head without disassembling the entire spindle apparatus. Hence, inspection, repair, or replacement is easily possible for any parts making up the spindle apparatus.

In addition, if a coupler having various fluid pipings and a power supply coupler is detachably installed on the tool unclamp cylinder or the outer cylinder, a power supply coupler and opening and closing valves for the various fluid pipings are provided for the coupler. Consequently, if the operation is performed at the time of inspection, repair, or replacement after closing the various fluid pipings and removing the power supply wiring, the operation can be performed while preventing the leakage of the fluid, entanglement of the power supply wiring, and the like.

In addition, if a sensor for detecting the rotation of the rotating shaft is disposed between the rotating shaft and the outer cylinder. Consequently, the inspection, repair, or replacement of the sensor becomes possible by merely removing the tool unclamp cylinder.

BRIEF DESCRIPTION OF THE DRAWINGS

FIG. 11(a) is a front view of a bearing sleeve in accordance with a fourth embodiment of the invention;

FIG. 11(b) is a longitudinal cross-sectional view of FIG. 11(a);

Figure 1:
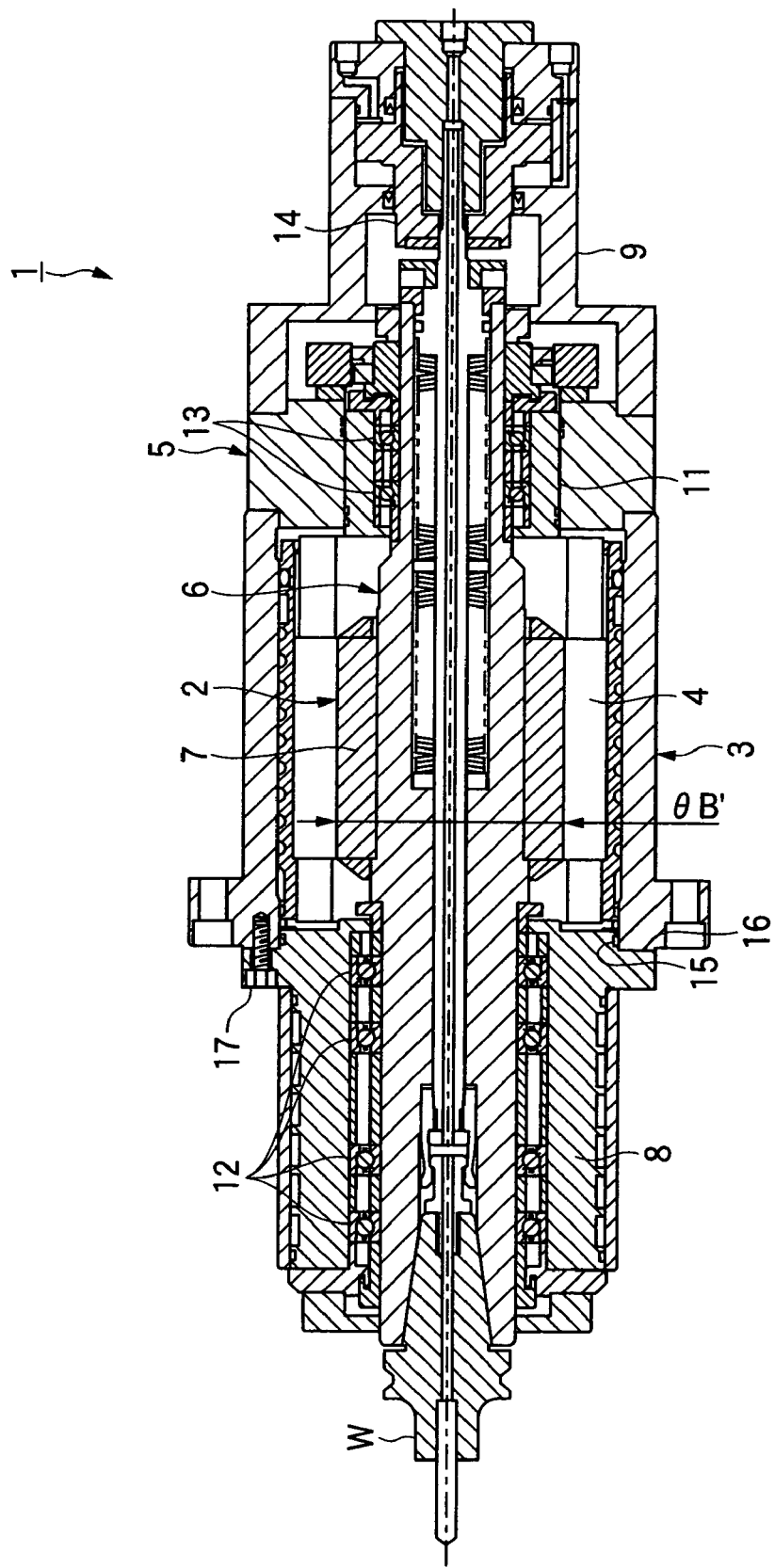
FIG. 1 is a longitudinal cross-sectional view illustrating a first embodiment of the invention.

It should be noted that, in the drawings, reference numeral 1 denotes a spindle apparatus; 2, sub-assembly; 3, outer cylinder; 4, stator; 5, sleeve housing; 6, rotating shaft; 7, rotor; 8, front housing; 9, rear cover; 11, bearing sleeve; 12, front side bearing; 13, rear side bearing; 14, piston mechanism; 30, spindle apparatus; 31, inside diameter part; 32, spring; 33, inside diameter part-side adjustment part (adjustment part); 34, piston; 39, mounting reference plane; 40, spindle apparatus; 50, spindle apparatus; 60, spindle apparatus; 61, sleeve housing; 62, lubricant supplying port (lubricant supplying passage); 63, bearing sleeve; 64, circumferential groove; 65, radial hole (lubricant supplying passage); 66, front-side O-ring (O-ring); 67, rear-side O-ring (O-ring); 71, lubricant discharging hole; 72, O-ring; 80, spindle apparatus; 81, rotating shaft; 82, front side bearing; 83, front side bearing; 84, bearing sleeve; 85, rear side bearing; 86, rear side bearing; 87, front housing; 88, sleeve housing; 89, outer ring; 90, outer ring; 91, inner ring; 92, inner ring; 94, O-ring (elastic body); 97, inner ring; 98, inner ring; 99, outer ring; 100, outer ring; 120, machine tool; 121, rotating shaft; 122, front side bearing; 123, inner ring; 124, outer ring; 125, front housing; 126, built-in motor; 127, rotor; 128, stator; 129, inner ring; 130, rear side bearing; 131, spindle head; 132, outer cylinder; 133, spindle cartridge (spindle apparatus); 134, spindle cartridge gripping portion; 142, bearing sleeve; 145, rear housing; 150, machine tool; 151, spindle sub-cartridge; 160, machine tool; 161, spindle head; 180, spindle apparatus; 181, outer cylinder; 182, stator; 183, spindle head; 184, rotating shaft; 185, rotor; 186, front side bearing; 187, inner ring; 188, rear side bearing; 189, inner ring; 190, outer ring; 191, front housing; 192, outer ring; 193, sleeve housing; 194, tool unclamp cylinder; 195, spindle sub-cartridge; 196, first assembly (assembly); 197, second assembly (assembly); 198, rotation sensor (sensor); 207, cooling oil supplying hose (various fluid piping); 220, spindle apparatus; 221, coupler; 222, spindle cartridge; 224, oil pressure supplying hose (various fluid piping); 226, sleeve housing; and 230, power supply coupler.

BEST MODES FOR CARRYING OUT THE INVENTION

Figure 2:
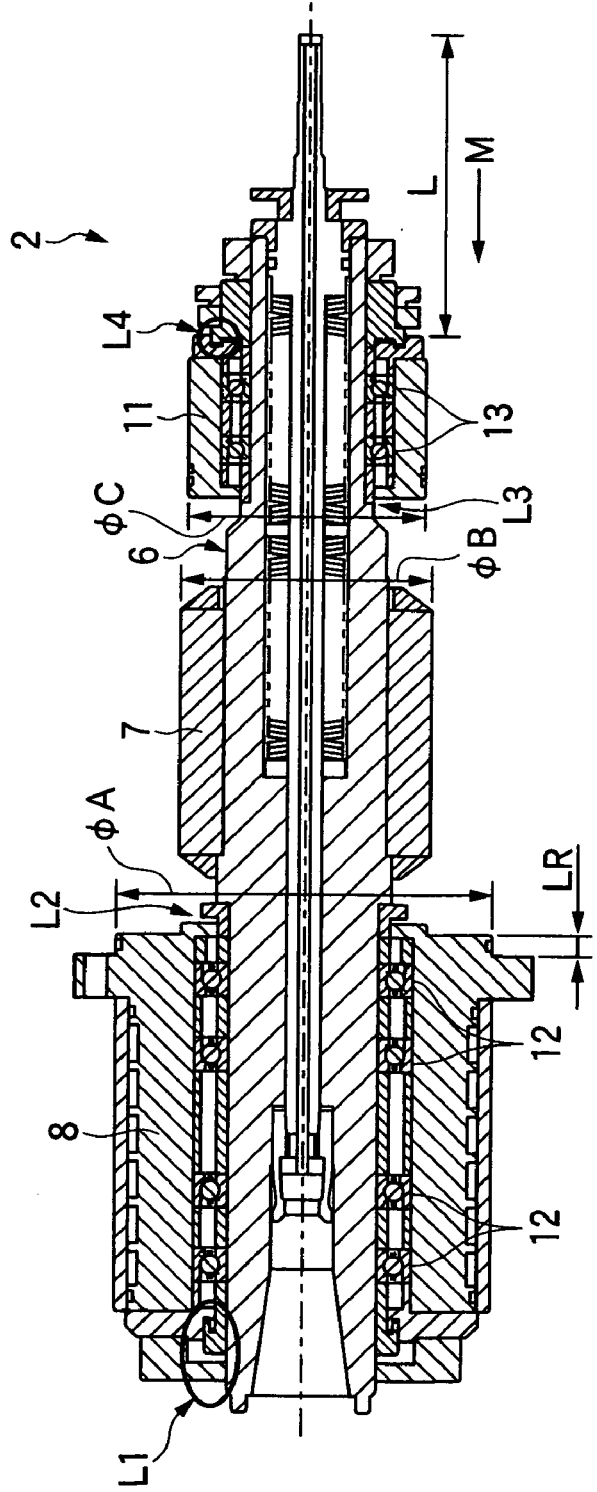
FIG. 2 is a longitudinal cross-sectional view illustrating a sub-assembly in the first embodiment.
Figure 3:
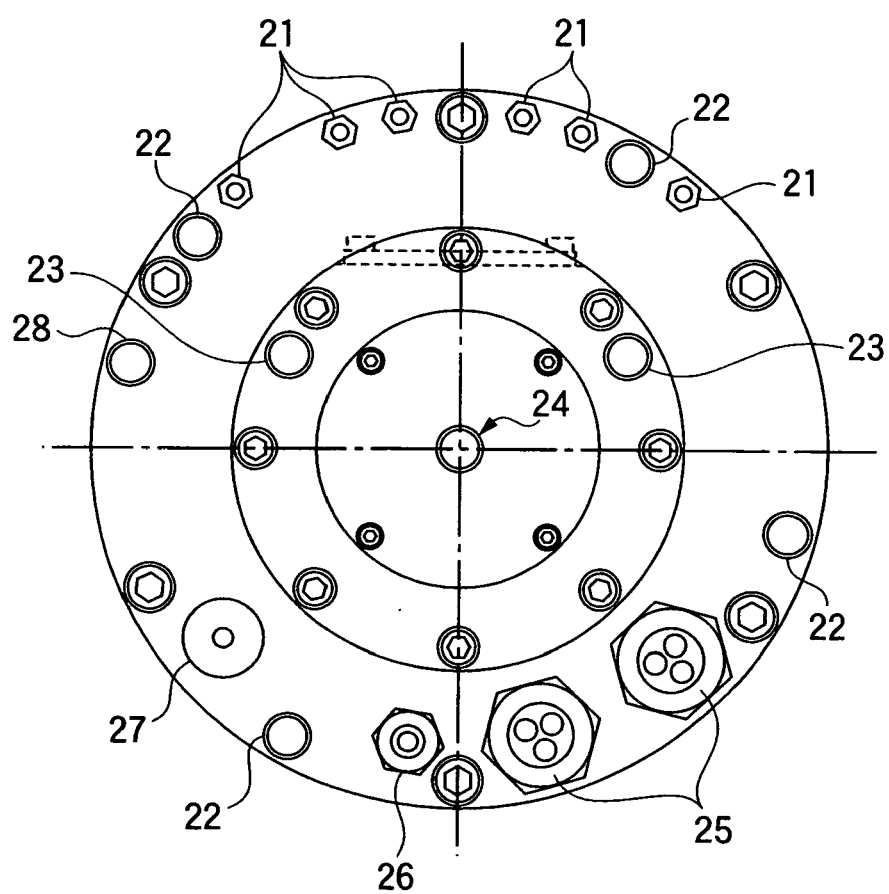
FIG. 3 is a front view illustrating a rear cover in the first embodiment.

FIGS. 1 to 3 show a first embodiment of the invention. It should be noted that the characteristics of this embodiment are as follows: The diameter becomes smaller in the order of the inner peripheral diameter $\phi A$ of an outer cylinder 3, the inside diameter $\phi B'$ of a stator 4, and the outside diameter $\phi C$ of a bearing sleeve 11. A sub-assembly 2 made up of a front housing 8, a rotating shaft 6, and the bearing sleeve 11 is withdrawable from the outer cylinder 3. The radius of a rotating part in an arbitrary section located rearwardly of the bearing sleeve 11 is smaller than a minimum radius of a non-rotating part between a rear end of the bearing sleeve 11 and that section, or the diameter of the rotating part in an arbitrary section located rearwardly of the bearing sleeve 11 is smaller than a minimum diameter of the non-rotating part between the rear end of the bearing sleeve 11 and that section.

As shown in FIG. 1, a spindle apparatus 1 in accordance with the first embodiment includes the outer cylinder 3 having the stator 4 and a sleeve housing 5; the rotatable rotating shaft 6 having a rotor 7; and a front side bearing 12 which is an arrangement angular contact ball bearing having outer rings fixed to the front housing 8 and inner rings fitted over one end of the rotating shaft 6. The spindle apparatus 1 further includes the bearing sleeve 11 disposed on the other end side of the rotating shaft 6 and fitted in the sleeve housing 5 so as to be movable in the axial direction of the rotating shaft 6; and a rear side bearing 13 which is a paired arrangement angular contact ball bearing having inner rings fitted over the other end of the rotating shaft 6 and outer rings fixed to the bearing sleeve 11 to rotatably support the rotating shaft 6 in cooperation with the front side bearing 12. Reference numeral 14 denotes a piston mechanism for tool replacement. It should be noted that the sleeve housing 5 and the outer cylinder 3 may be formed as an integral structure.

As shown in FIG. 2, the sub-assembly 2 made up of the front housing 8, the rotating shaft 6, and the bearing sleeve 11 is constructed so as to be withdrawable from the outer cylinder 3. Namely, in the spindle apparatus 1 of this embodiment, the diameter becomes smaller in the order of the inner peripheral diameter $\phi A$ of the outer cylinder 3, the outside diameter $\phi B$ of the rotor 7, and the outside diameter $\phi C$ of the bearing sleeve 11 ($\phi A > \phi B > \phi C$). Alternatively, with respect to the stator inside diameter $\phi B'$ (see FIG. 1) instead of the rotor inside diameter $\phi B$, an arrangement may be provided such that $\phi A > \phi B' > \phi C$. In addition, in a range L located rearwardly of the bearing sleeve 11, the outside diameter of the sub-assembly 2 is set to be smaller than the outside diameter of the bearing sleeve 11. Namely, to ensure that the non-rotating part does not constitute a hindrance when an attempt is made to withdraw the spindle in the direction of arrow M, the outside diameter of the rotating part of the spindle in an arbitrary section in the range L is made smaller than a minimum inner peripheral diameter of the non-rotating part between that section and the rear end of the bearing sleeve. Thus, the outside diameter of the rotating part is defined so that the non-rotating part does not constitute a hindrance. Accordingly, when an attempt is made to withdraw the sub-assembly 2 in the direction M in the drawing, the piston mechanism 14 and the like, which are a non-rotating part, for holding/releasing a tool W which is installed in a left end portion in the drawing do not constitute a hindrance (see FIG. 1).

In addition, in the spindle apparatus 1, a clearance fit of 5 to 30 µm is provided for the outside diameter of the bearing sleeve 11 with respect to the inside diameter of the sleeve housing 5. Further, in the spindle apparatus 1, the rear side bearing 13 is a back-to-back arrangement angular contact ball bearing with fixed-position preload. As a result, the rear side bearing 13 and the bearing sleeve 11 function mainly to support the rotating shaft 6, but are capable of absorbing with a simple structure the axial displacement such as thermal expansion due to the heat generation by the rotor.

In addition, in the spindle apparatus 1, an interference fit of 0 to 20 µm is provided for an inlay portion 15 between the front housing 8 and an inner peripheral surface of the outer cylinder 3. As a result, the axes of the front housing 8 and the outer cylinder 3 do not become misaligned. In addition, as for matching surfaces 16, the front housing 8 and the outer cylinder 3 are finished to high precision with a perpendicularity of 2 to 5 µm or less with respect to the axis. As a result, even if the length LR of the inlay portion 15 is short, the axes of the two members are aligned. If the length of the inlay portion 15 is long, the assembling efficiency is poor; however, in this embodiment, the inlay length LR is made short at about $\frac{1}{10}$ to $\frac{1}{30}$ of the inlay diameter φA. In addition, since the length LR of the inlay portion 15 is short, the front housing 8 and the outer cylinder 3 can be easily assembled by being tightened by assembling bolts 17. As a result, there is no need of the alignment operation.

In addition, in the sub-assembly 2, labyrinth seals L1 to L4 are formed with respect to the outside air. During the use of the spindle, the entry of foreign objects of such as a cutting fluid and cuttings is prevented by the powerful labyrinths L1 and L4. In cases such as when only the sub-assembly 2 is kept in stock, foreign objects such as dust are shut off by the labyrinths L1 to L4. The labyrinths L2 and L3 function to prevent the entry of foreign objects during the replacement of the sub-assembly due to maintenance. At the time of the maintenance, since it is impossible to expect an environment where the amount of foreign objects is small, such as a clean room, the labyrinths L2 and L3 are useful. The structures of the labyrinths L3 and L4 are realizable by the use of the bearing sleeve 11.

As shown in FIG. 3, as for the rear portion of a rear cover 9, seven wirings (motor power lines 25, a motor temperature sensor line 26, a rotary encoder line, etc. (partly not shown)), 14 pipings (bearing lubricating pipings 21, coolant oil pipings 22, tool unclamping hydraulic pipings 23, a tool tapered air-blow piping 24, and an air seal piping 28) are connected to the outside. Therefore, at the time of maintenance, none of these need to be handled, so that downtime is very short, and the maintenance efficiency is excellent.

According to the above-described spindle apparatus 10, the sub-assembly 2 made up of the front housing 8, the rotating shaft 6, and the bearing sleeve 11 is withdrawable from the outer cylinder 3. For this reason, the assembling efficiency improves and the sub-assembly 2 can be replaced speedily when it is broken. In addition, as for the bearing sleeve 11, since the rear side bearing 13 is in an assembled state, the state of grease does not change by the withdrawal of the sub-assembly 2. Accordingly, as the sub-assembly 2 is kept in stock after performing the running-in operation in advance by using another outer cylinder, the sub-assembly can be replaced at the time of the damage of the spindle apparatus, and the normal operation is made possible immediately, thereby permitting a substantial reduction in downtime. In addition, a cost reduction is made possible in comparison with the replacement of the entire spindle apparatus 1, and a reduction in inventory cost is also made possible.

FIGS. 4 to 7 show a second embodiment of the invention. The characteristics of this embodiment lie in that an inside diameter part 31 is incorporated so as to be capable of compressing springs 32, that an adjustment part 33 is fixed to a rear portion of the inside diameter part 31, and that a piston pressing surface 34 for the piston mechanism 14 is formed on the adjustment part 33. Since the other arrangements are identical to those of the first embodiment, identical members will be denoted by the same reference numerals, and a detailed description thereof will be omitted.

Figure 4:
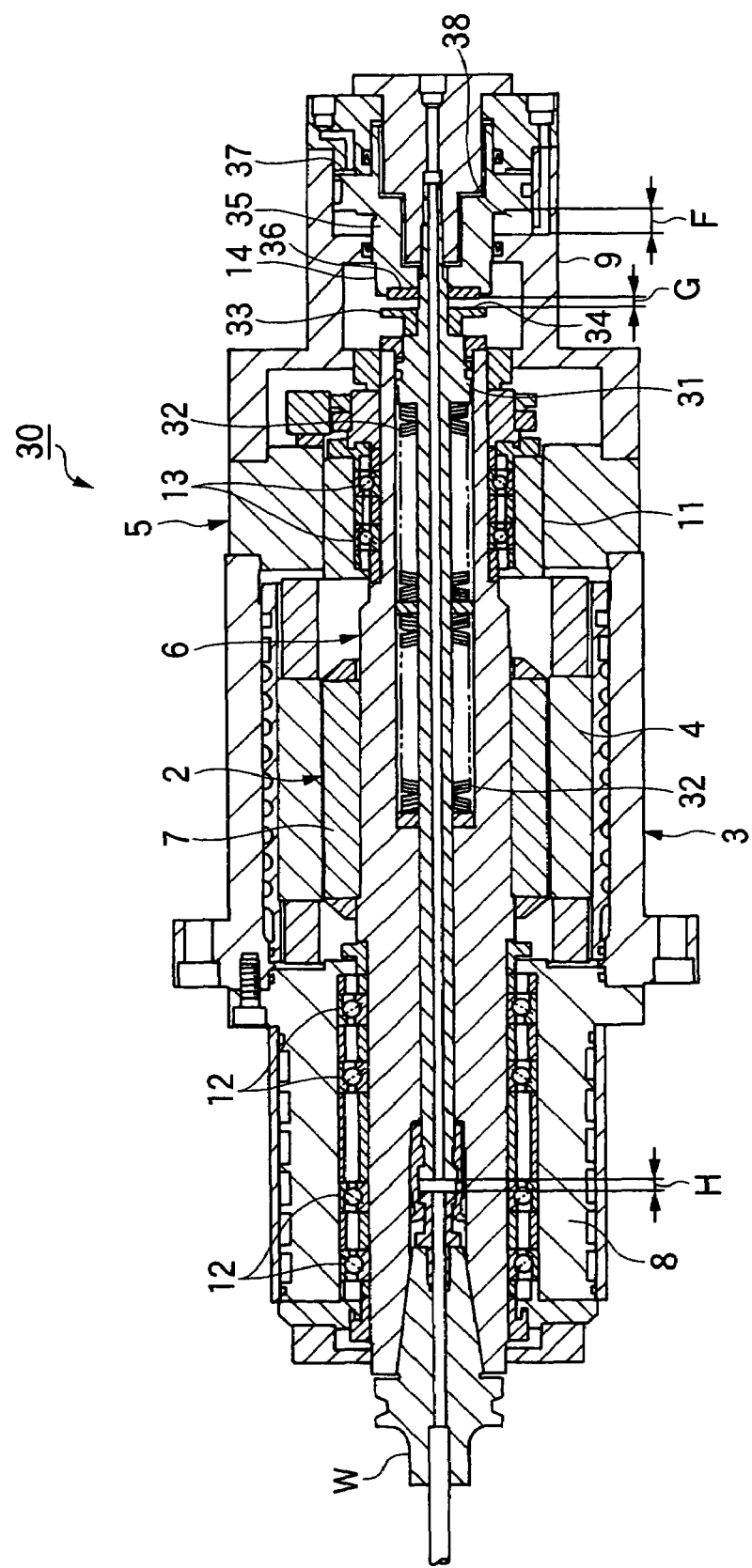
FIG. 4 is a longitudinal cross-sectional view illustrating a second embodiment of the invention.

As shown in FIG. 4, in a spindle apparatus 30 in accordance with the second embodiment, the inside diameter part (also referred to as a drawbar) 31, which is capable of compressing the two springs 32 and of replacing the tool, is incorporated in the rotating shaft 6 which rotates together with the rotor 7 as the stator 4 of the outer cylinder 3 is energized. Further, the inside diameter part-side adjustment part 33 is installed on a rear end portion of the inside diameter part 31. The piston pressing surface 34 for the piston mechanism 14 is formed at an end portion of the inside diameter part-side adjustment part 33. A piston-side adjustment part 36 for pressing the inside diameter part-side adjustment part 33 is installed on an end portion of a piston 35 of the piston mechanism 14.

As for the piston mechanism 14, as a pressure medium such as oil, water, air, or the like is introduced into an advance-side pressure introducing portion 37, the piston 35 is advanced. Hence, the piston-side adjustment part 36 of the piston 35 presses the piston pressing surface 34 of the inside diameter part-side adjustment part 33, thereby pressing and moving the inside diameter part 31 in the axial direction to push out the tool W and assume a tool unclamped state. In contrast, as the pressure within the advance-side pressure introducing portion 37 is released, and the pressure medium is introduced into a return-side pressure introducing portion 38, the piston 35 is returned, thereby pressing and moving the inside diameter part 31 in the axial direction to assume a tool clamped state.

Figure 5:
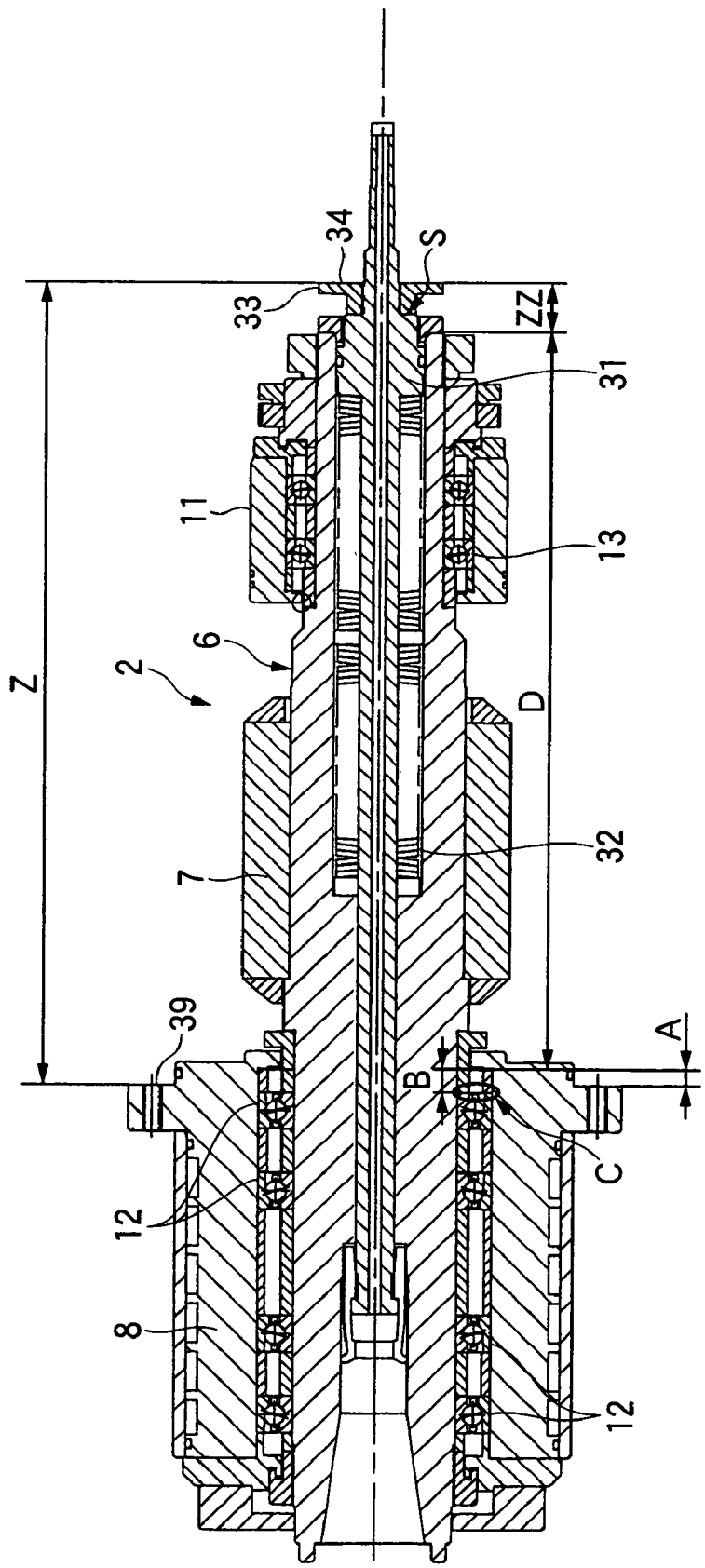
FIG. 5 is a longitudinal cross-sectional view illustrating the sub-assembly in the second embodiment.

As shown in FIG. 5, the inside diameter part-side adjustment part 33 is capable of adjusting an axial dimension (distance) Z between a mounting reference plane 39 of the sub-assembly 2 and the piston pressing surface 34 in the inside diameter part 31 to within ±0.1 mm relative to the reference dimension. Namely, as for the sub-assembly 2, a dimensional difference occurs in the axial dimension Z from the mounting reference plane 39 to the piston pressing surface 34 in the inside diameter part 31 due to the stacking of the multiplicity of parts. For this reason, unless adjustment is effected in advance, it is necessary to perform the adjustment operation of the piston stroke at the site. For example, if the amount of movement (amount of pushing out) of the inside diameter part 31 becomes small due to a shortage of the piston stroke, a tool holder cannot unclamp. If the amount of movement of the inside diameter part 31 is too large to the contrary, the inside diameter part 31 excessively presses the holder forward, so that an automatic tool changer (ATC) 40 (see FIG. 7) becomes unable to grip the tool holder. In contrast, if it is assumed that the tool holder pushing amount (the amount of the tool holder pushed out from the grip position by the inside diameter part 31 when the piston 35 is pushed to a foremost end) is 0.4 mm to 0.6 mm, the inside diameter part-side adjustment part 33 adjusts its tolerance to within ±0.1 mm, which is 0.1 mm to 0.2 mm or thereabouts, thereby making it possible to appropriately effect unclamping. As a result, piston adjustment is made unnecessary at the time of performing replacement of the sub-assembly, making it possible to improve the maintenance efficiency.

Here, as for the adjustment based on the inside diameter part-side adjustment part 33, it is possible to cite, among others, a method in which cutting (turning and grinding) work is performed by providing a stock allowance in advance, a method in which a shim having a varying thickness is inserted in the gap S, a method in which an adjustment plate is selected from adjustment plates of various sizes prepared in advance and is installed, and a method in which an adjustment plate is disposed at a desired position by an adjustment screw and is fixed by an anaerobic adhesive or the like. Furthermore, a large-size jig is required to directly measure the axial dimension Z, and there are cases where the sub-assembly, which is a heavy piece, must be set on the jig. Therefore, to simplify the adjustment operation, there are cases where dimensional control of some degree is provided for various parts. For example, it is possible to cite a method in which a dimension A, a dimension B (both of the inner ring spacer and the outer ring spacer), a differential width C between rearmost-side inner and outer rings of the front side bearing 12, and a dimension D are controlled in advance, and only a dimension ZZ is measured and adjusted with the inside diameter part 31 fitted to the rotating shaft 6. With this method, since it is unnecessary to control axial dimensions of spindle inside diameter portions (e.g., various dimensions of a collet portion, displacement of the tool's taper, and the hole depth of the inside diameter part 31), it is possible to reduce the cost of dimensional control, and the burden of the adjustment operation is small. It should be noted that a universal arrangement bearing for which all the differential widths between the front face and the back face are adjusted individually may be used for the four rows of the front side bearing 12 to simplify the control of the differential width C.

Figure 6:
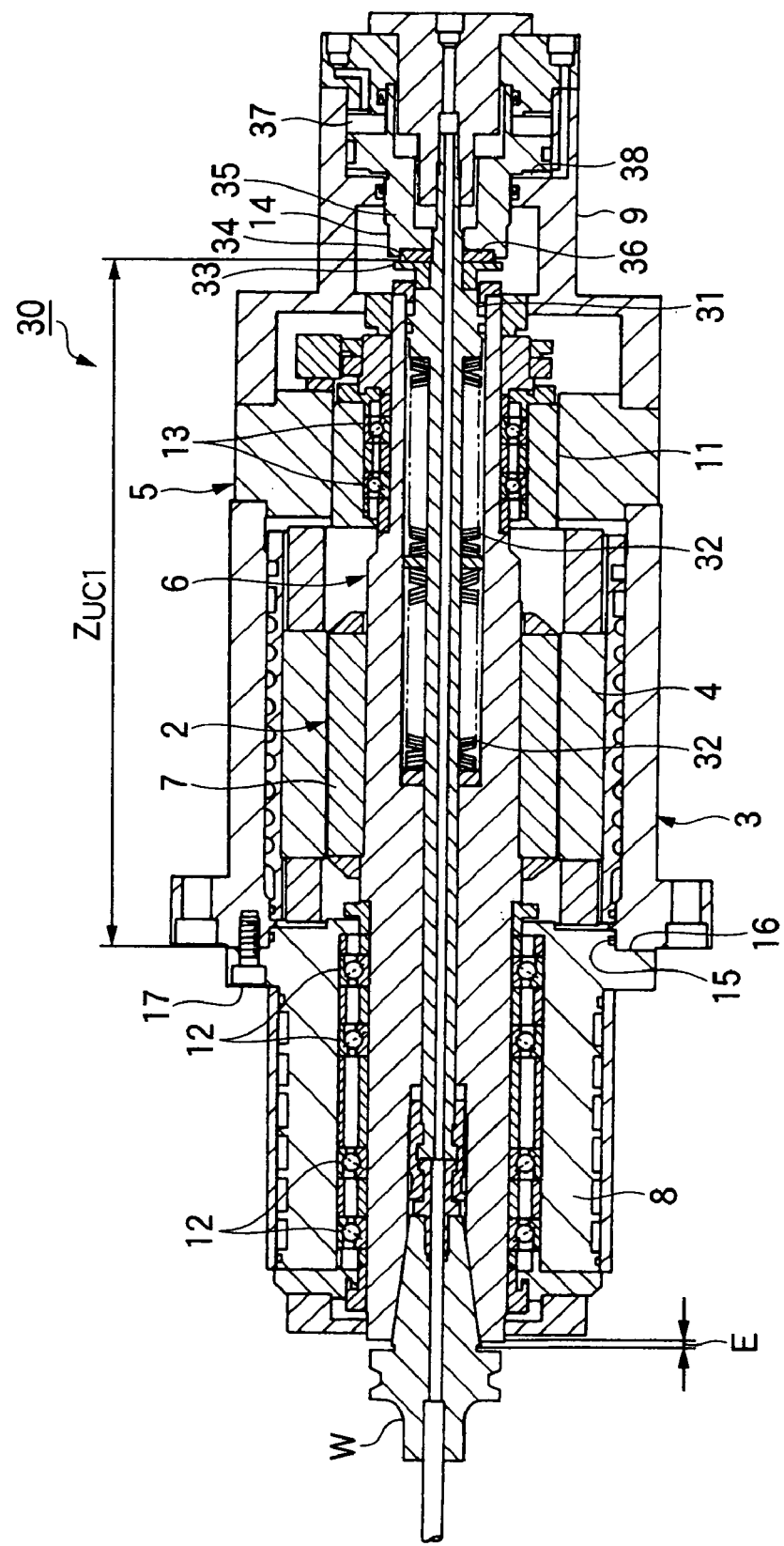
FIG. 6 is a longitudinal cross-sectional view in a tool unclamped state in the second embodiment.

As shown in FIGS. 4 to 6, a tool holder pushing amount (see FIG. 6) E is adjusted by using the sub-assembly 2 for which the axial dimension Z is controlled.

Since tool holder pushing amount E=(piston stroke F)–(space G)–(space H), either the respective amounts of the right-hand side are measured, or the pushing amount E (the amount by which the tool holder advances) is measured by actually effecting the unclamping. Then, here, the piston-side adjustment part 36 is machined for adjustment such that E=0.5±0.1 mm. Consequently, the axial position of the clamp-unclamp stroke is determined. As a result, in the case of the replacement of the mutually adjusted subassemblies 2 the adjustment of the piston portion is subsequently made unnecessary since the positional relationship between the piston 35 and the inside diameter part 31 does not change.

By so doing, with respect to the tolerance of the axial dimension Z from the mounting reference plane 39 to the piston pressing surface 34, the sub-assembly 2 is controlled to a value smaller than the tolerance of 0.1 mm to 0.2 mm of the tool holder pressing amount E. When the piston mechanism 14 for tool replacement is assembled, the piston stroke F is adjusted in accordance with this controlled sub-assembly 2. Consequently, if the units of the subassemblies 2 whose axial dimensions Z are controlled are replaced with each other at the time of maintenance, the axial phase relationship of the piston pressing surface 34 of the inside diameter part 31 does not change, so that the readjustment of the piston stroke becomes unnecessary. In addition, since the axial dimension Z is determined by the stacking of the multiplicity of parts, tolerances of axial dimensions of these parts may be respectively set, and control may be provided such that a value of their accumulation assumes a desired value or less. However, such a method, i.e., to satisfy the tolerance of 0.1 to 0.2 mm by the accumulation of, specifically, 10 or more dimensional tolerances, often leads to higher cost and an increase in the fraction defective. Accordingly, the axial dimension Z can be controlled at very low cost by assembling the inside diameter part-side adjustment part 33 to the rear portion of the inside diameter part 31 after making adjustment subsequent to the assembly of the inside diameter part 31.

As shown in FIG. 6, as for the piston mechanism 14, as the pressure medium is introduced into the advance-side pressure introducing portion 37, the piston 35 is reciprocated, causing the piston-side adjustment part 36 to press the piston pressing surface 34 of the inside diameter part-side adjustment part 33. Hence, the inside diameter part 31 is pressed and moved in the axial direction against the springs 32 to push out the tool W, thereby assuming the tool unclamped state.

Figure 7:
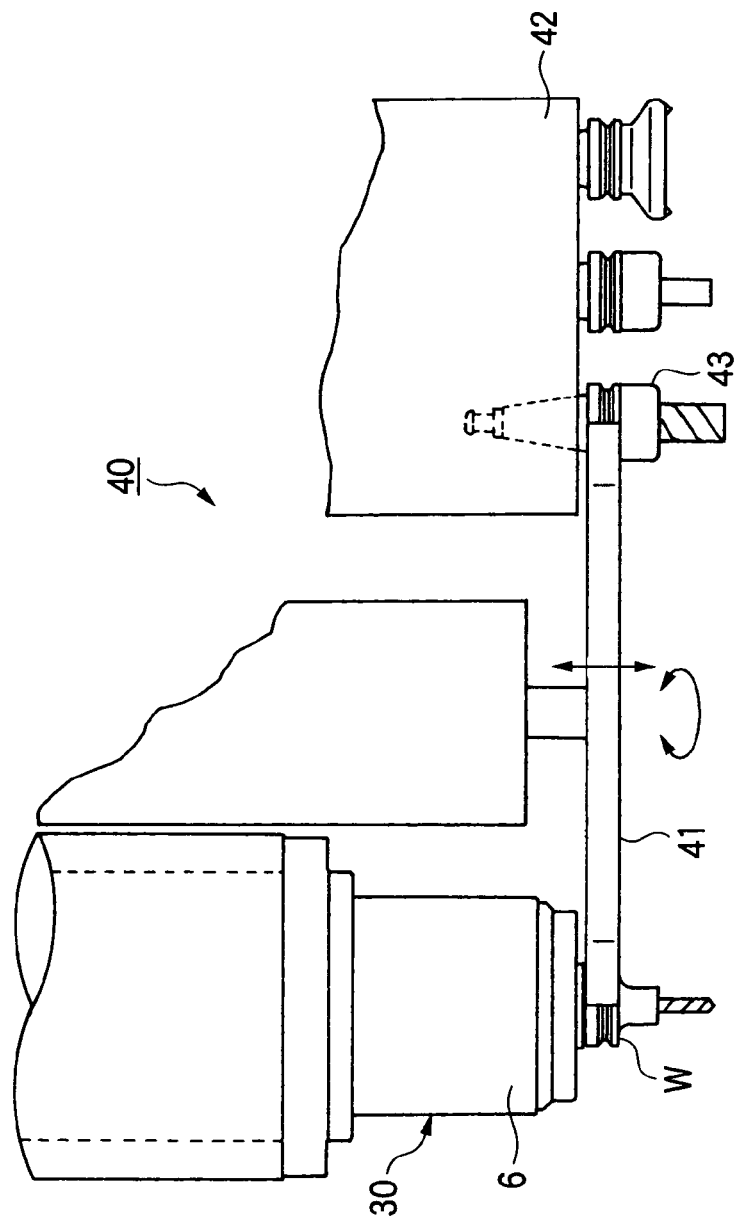
FIG. 7 is a diagram of assembly to an automatic tool changer in the second embodiment.

As shown in FIG. 7, at the time of the automatic tool replacement of the spindle apparatus 30, the operation of the automatic tool changer 40 is very fast for improvement of the efficiency, and the replacement time is normally 0.2 to 1.5 seconds or thereabouts. For this reason, it is necessary to maintain the strength and stiffness of the respective parts to a high level. The automatic tool changer 40 operates such that after an arm 41 has gripped the rotating shaft 6 and a tool holder 43 of a tool magazine 42, the tool W in the rotating shaft 6 is unclamped, and the arm 41 undergoes vertical and swiveling operation to allow tool replacement. When the tool W is gripped and the rotating shaft 6 is unclamped, if the amount of pushing of the tool holder 43 is too large, since the tool holder 43 has high stiffness and is being gripped by the arm 41, an excessive load is applied to the arm 41. Hence, a failure of the automatic tool changer 40 can result. For this reason, the amount of pushing of the tool holder 43 needs to be set to 0.5 to 0.6 mm or less. With the spindle apparatus 30, even if maintenance is performed and the sub-assembly 2 is replaced, the amount of pushing of the tool holder 43 does not change, so that adjustment does not involve much time and trouble, and replacement in a short period of time becomes possible.

Figure 8:
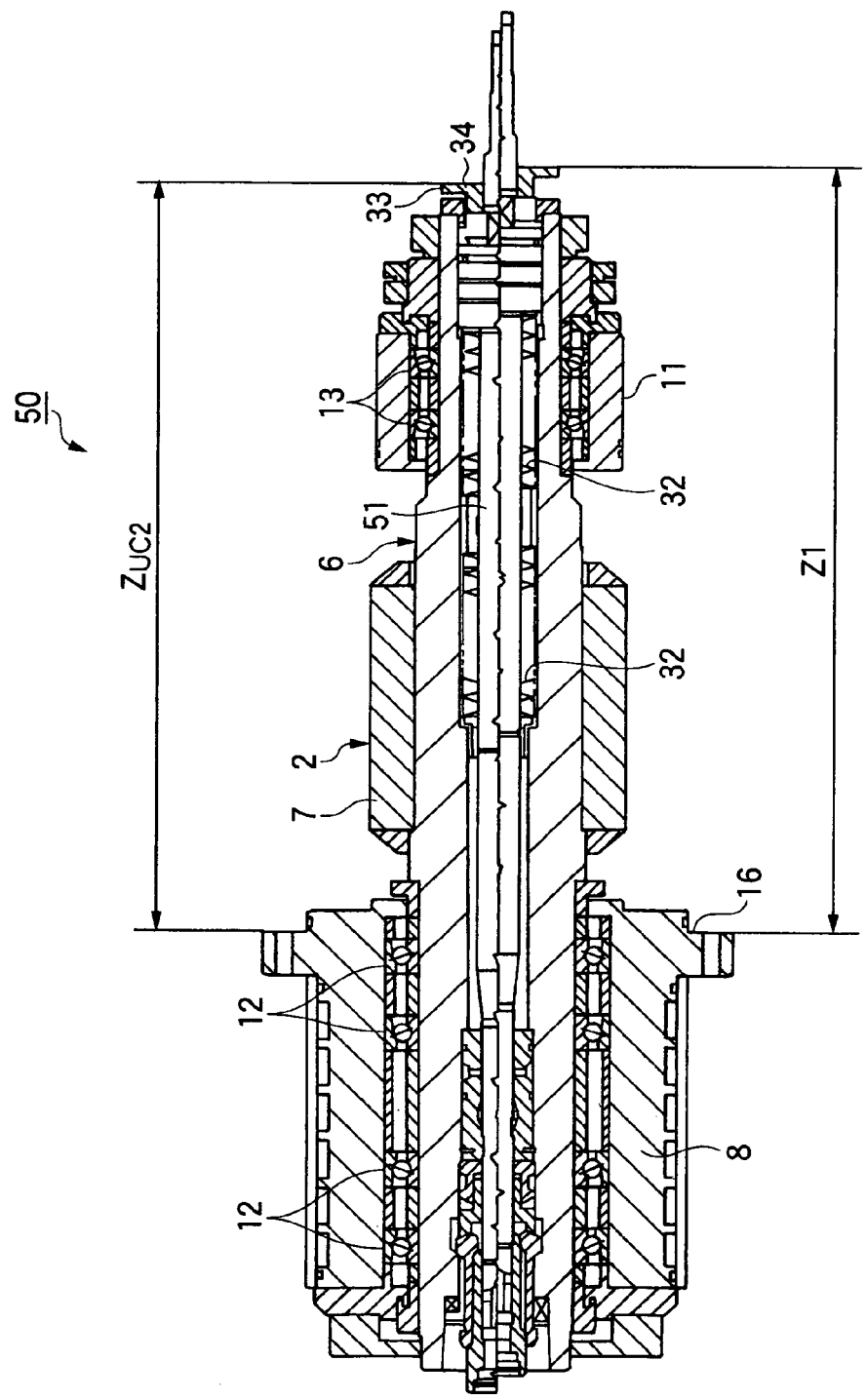
FIG. 8 is a longitudinal cross-sectional view illustrating a third embodiment of the invention.
Figure 9:
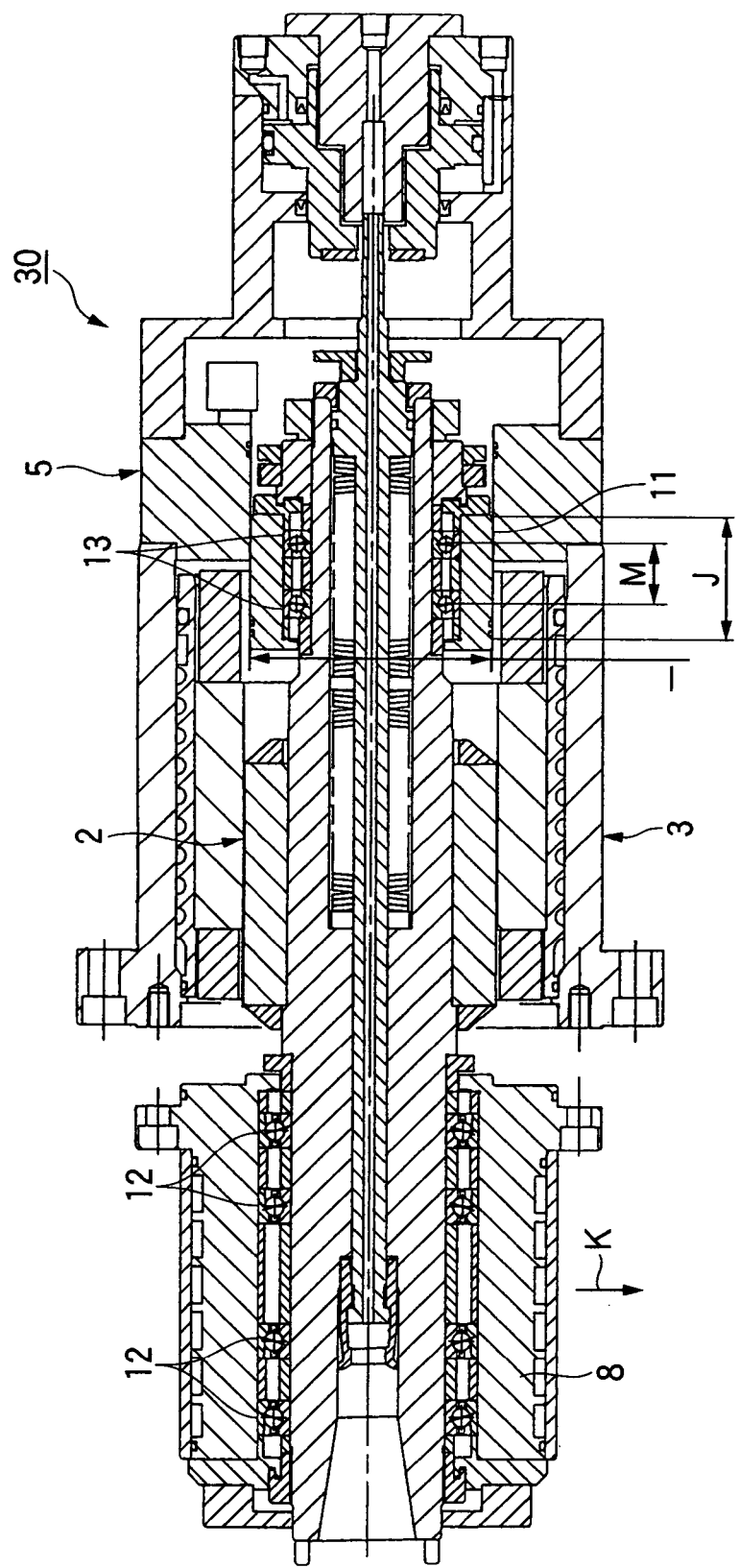
FIG. 9 is a longitudinal cross-sectional view illustrating the sub-assembly in accordance with a third embodiment of the invention.
Figure 10:
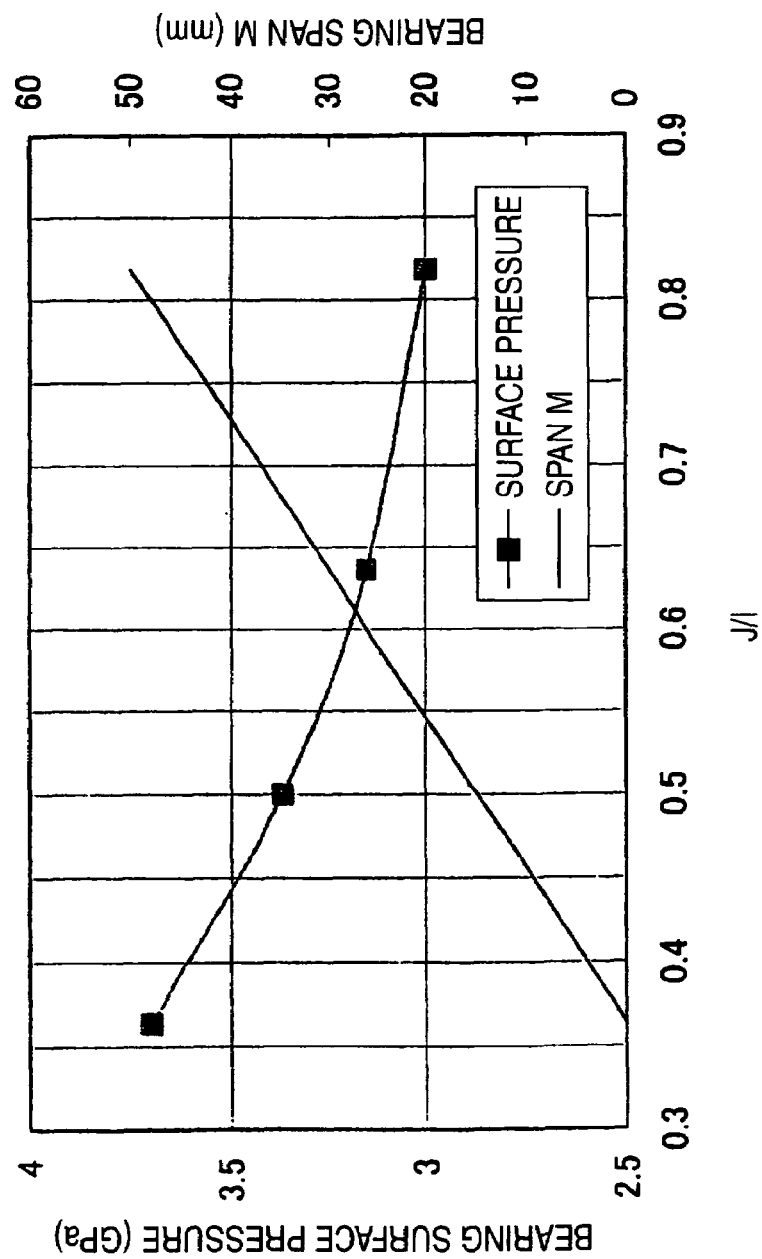
FIG. 10 is a characteristic diagram of the size and surface pressure of bearings in the third embodiment.

FIGS. 8 to 10 show a third embodiment of the invention corresponding to claims 1, 2, 4, 5, 8, 10, 11, 12, 13, and 14. The characteristic of this embodiment lies in that a ratio between, on the one hand, a fitting length J of the bearing sleeve 11 and the sleeve housing 5 and, on the other hand, an outside diameter I of the bearing sleeve 11 is set within the range of "fitting length J/outside diameter I=0.45 to 0.8." Since the other arrangements are identical to those of the first embodiment, identical members will be denoted by the same reference numerals, and a detailed description thereof will be omitted.

Referring to FIG. 8, a description will be given of the third embodiment of the spindle apparatus in accordance with the invention. It should be noted that, in FIG. 8, an upper half in the drawing illustrates the tool unclamped state, and a lower half in the drawing illustrates the tool clamped state.

As shown in FIG. 8, in a spindle apparatus 50 in accordance with the third embodiment, an inside diameter part 51 having a different cone angle is used for the sub-assembly 2. At this time, inside diameter parts for BT holders (JIS B 6339) and HSK holders (ISO-12164) are adjusted so as to be interchangeable with those shown in FIGS. 1 and 4, although there are variations in a target value Z1 to be controlled with respect to the axial dimension Z owing to the standards of the tool taper. Namely, adjustment is made such that an axial dimension $Z_{UC2}$ at the time of unclamping becomes identical to an unclamped state $Z_{UC1}$ shown in FIG. 6. It should be noted that the space G in FIG. 4 is set to a value greater than a minimum necessary amount for unclamping the BT holder for the purpose of application to inside diameter parts having thus different axial dimensions Z. There are cases where various tool taper standards are used depending on applications, but since interchangeability is provided to permit unclamping in different tool standards as in this embodiment, a change in specifications is facilitate, and the inventory control of inner cartridges for maintenance is facilitated, thereby attaining a reduction in the cost.

In addition, as shown in FIG. 9, in the spindle apparatus 50, the ratio between the outside diameter I of the bearing sleeve 11 and the length J of its fitting portion is set such that J/I≈0.5. In this case, the relationship between the outside diameter I and the length J should preferably be set to be 0.45 to 0.8. When the sub-assembly 2 is inserted into the outer cylinder 3, the bearing sleeve 11 is first fitted to the inside diameter of the sleeve housing 5. Since the replacement of the sub-assembly 2 is generally performed at the work site of the machine tool user, there are many cases where a special jig cannot be used in the replacement operation. In such a case, if the sub-assembly 2 is subjected to a force acting in a direction K, such as its own weight, a moment load is applied to the rear side bearing 13. At that juncture, if the length J is small, the span M of the two rows of the rear side bearing 13 becomes short, and contact pressure becomes large, possibly damaging the rear side bearing 13.

As shown in FIG. 10, in the spindle apparatus 50, examinations are made of the relationship between the above-described J/I and the bearing span and the relationship of the contact pressure generated in the rear side bearing 13 at the time when a load K is applied. The load K is the self-weight of the sub-assembly 2 and is a load which is generated by handling at the time of assembly in the replacement operation at a site where a jig cannot be united. The rear side bearing 13 is an angular contact ball bearing with an inside diameter of φ55 mm. As for the contact pressure of the bearing, it is known that, in a bearing steel with a hardness Hv=700, an indentation occurs at 3.5 GPa or more. From these, it can be understood that "J/I≧0.45" is necessary. Meanwhile, if the span of the rear side bearing 13 is made too long, the performance of the machine tool cannot be improved, and problems occur such as an increase in the inertial moment of the spindle (an increase in the acceleration/deceleration time) and a decline in a resonance point. Therefore, it is desirable to provide a setting such that J/I≦0.8. Furthermore, by setting the relationship of J/I as described above, an O-ring which exhibits vibration damping action, which will be described later, can be provided. As the relationship between the outside diameter I of the bearing sleeve 11 and the length J of its fitting portion is thus set and designed appropriately, it is possible to obtain the structure of the sub-assembly 2 excelling in the maintenance efficiency and the performance of the machine tool.

Figure 12:
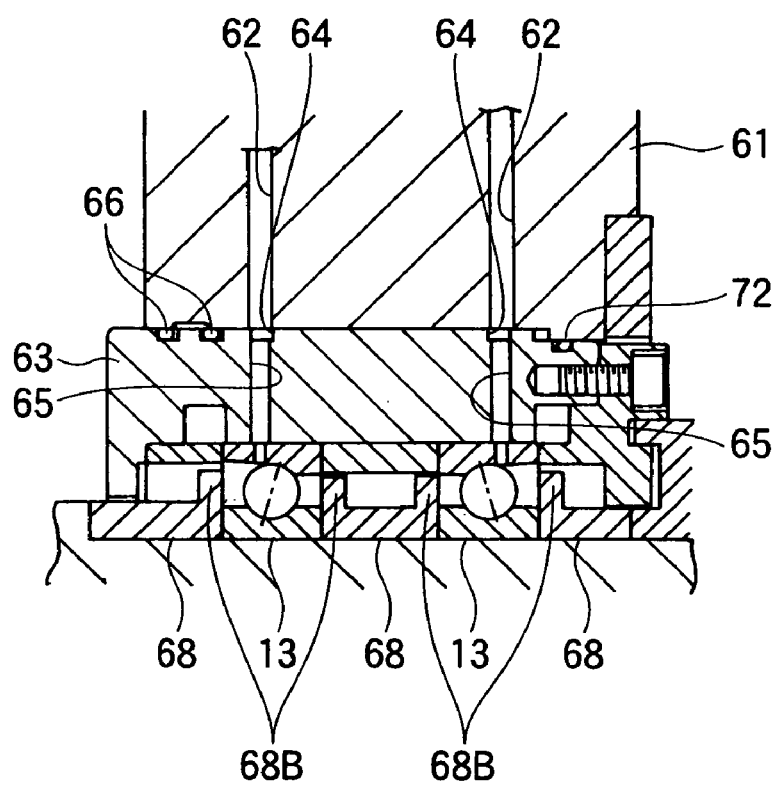
FIG. 12 is a longitudinal cross-sectional view of essential portions illustrating a modification of the fourth embodiment.

FIGS. 11(a), 11(b), and 12 show a fourth embodiment of the invention. The characteristic of this embodiment lies in that there are provided a plurality of lubricant discharging holes 71 provided circumferentially in the bearing sleeve 11, circumferential grooves 64 provided in a fitting surface of the outer periphery of the bearing sleeve 11, and radial lubricant supplying passages 62 and 65 communicatingly connected to the circumferential grooves 64. Since the other arrangements are identical to those of the first embodiment, identical members will be denoted by the same reference numerals, and a detailed description thereof will be omitted.

As shown in FIGS. 11(a) and 11(b), in a spindle apparatus 60 in accordance with the fourth embodiment, lubricant supplying and discharging structures are disposed in the rear side bearing 13, and a structure which makes it unnecessary to determine the phase is provided to permit easy removal and assembly of the sub-assembly 2.

In addition, the bearing sleeve 11 is clearance-fitted with respect to the inside diameter of the sleeve housing 5 (see FIG. 6). As a result, the bearing sleeve 11 easily rotates relative to the rotating shaft 6 in a state in which the inside diameter part 31 is assembled thereto. Accordingly, in a case where a lubricant is supplied to the rear side bearing 13, projections, such as a nozzle and a key, for determining its supply phase and a lubricant discharge hole phase are conventionally provided. For this reason, there has been a problem in that unless phase adjustment and withdrawal and insertion of the projecting parts are effected, the assembly and separation of the sub-assembly 2 cannot be performed, making maintenance difficult. In contrast, since projections such as the lubricating nozzle are not provided on the outer periphery of the sub-assembly 2, the removal of the sub-assembly 2 becomes possible only by removing the assembling bolts 17.

As for the lubricant supplying structure, a lubricant is supplied into the bearing space through the outer rings of the rear side bearing 13 by means of the radial lubricant supplying passages 62 communicatingly connected to a lubricant replenishing device (not shown), the circumferential grooves 64 provided in a fitting surface of the outer periphery of a bearing sleeve 63, and the radial holes (lubricant supplying passages) 65 formed in communication with the circumferential grooves 64. Further, as for the sleeve housing 61 and the bearing sleeve 63, their front-side end portions are sealed by front-side O-rings 66 and 66, while their rear-side end portions are sealed by rear-side O-rings 67 and 67. At this time, even if the radial lubricant supplying passages of the sleeve housing 61 and the bearing sleeve 63 are in the same phase, or the two members rotate in a counter phase of 180°, the lubricating oil is supplied smoothly to the rear side bearing 13. It should be noted that the circumferential grooves 64 are provided in the inner periphery of the sleeve housing 61.

The discharging structure consists of radial discharging holes 69, 69, and 69 formed radially by outer ring spacers 68 and 68 respectively disposed between the rows of the rear side bearing 13, an outer ring presser 68A, and the bearing sleeve 63; an axial discharging hole 70 formed axially in the bearing sleeve 63 in communication with the radial discharging holes 69, 69, and 69; and the plurality of, i.e., six, lubricant discharging holes 71, 71, 71, 71, 71, and 71 provided circumferentially in the bearing sleeve 63 at equal intervals in communication with the axial discharging hole 70. Since the six lubricant discharging holes 71, 71, 71, 71, 71, and 71 are disposed in equally distributed form, at least one lubricant discharging hole 71 is secured within a range of a position located directly below ±15° at whatever phase. Thus, discharging at the time of horizontal mounting is made possible.

The lubricant supplying and discharging structures have the function of discharging excess grease after grease is supplied. As a result, the lubricant which is supplied to the interior of the bearing and becomes unnecessary is slung off to outside the bearing by the rotational force of a slinger portion 68B in FIG. 12 disposed in the vicinity of the bearing. Consequently, it becomes possible to discharge the lubricant without a problem at whatever phase. Although a discharging hole is required on the lower side in the case of, for instance, a horizontally mounted spindle, discharging can be effected since one of the holes faces the lower side. Furthermore, since grease lubrication is adopted, maintenance can be performed at a small cost by virtue of grease lubrication which is easy to handle and is relatively inexpensive. In addition, since a lubricant feeding device (grease replenishing unit) is provided, it is possible to replenish the shortage of grease, making it possible to avoid a seizure and the like. Furthermore, it is possible to use a very small amount of lubrication of any one of oil-air, oil-mist, and direct-injection lubrication. By so doing, it is possible to effect highly efficient lubrication, so that anti-seizure properties can be improved further.

Then, in the sleeve housing 61 and the bearing sleeve 63, to prevent the breakage of O-rings at the time of withdrawal and insertion of the bearing sleeve, the front-side O-rings 66 and 66 are disposed on the front-side outer periphery of the bearing sleeve 63, while the rear-side O-rings 67 and 67 are disposed on the rear-side inner periphery of the sleeve housing 61. As a result, when the bearing sleeve 63 slides on the inner periphery of the sleeve housing 61 in the insertion or withdrawal of the sub-assembly 2, the distance slid by the O-rings 66, 66, 67, and 67 is made shortest. At the same time, since the O-rings 66, 66, 67, and 67 do not pass steps or holes constituting factors of O-ring breakage, the reliability of the O-rings 66, 66, 67, and 67 can be improved remarkably.

In addition, as for the O-rings 66, 66, 67, and 67, multiplicities of O-rings are used, two on the front end side and two on the rear end side. This is for the purpose of damping the vibration of the bearing sleeve 63 through the damping effect based on the interference of the respective O-rings 66, 66, 67, and 67. Since the bearing sleeve 63 is clearance-fitted to the sleeve housing 61, the bearing sleeve 63 vibrates in the gap unless damping elements such as O-rings are provided. If the vibration is large, the cutting performance and accuracy of the machine tool deteriorates, and the inside diameter of the sleeve housing 61 or the outside diameter of the bearing sleeve 63 is possibly subjected to fretting wear. If the fretting wear occurs, the vibration increases further, or faulty sliding results. Further, the entire spindle apparatus must be replaced in its repair. In addition, since the force of constraint increases by using the plurality of O-rings, the bearing sleeve 63 ceases to rotate freely in the rotating direction, so that it becomes possible to prevent creep and also prevent the creep wear of fitting surfaces. Thus, by using the plurality of O-rings, it becomes possible to exhibit even greater effects.

As shown in FIG. 12, in a modification of the fourth embodiment, a single small-diameter O-ring 72 is used only on the rear side of the bearing sleeve 63. By so doing, the number of the O-rings can be reduced, so that O-rings can be disposed compactly. However, the arrangement shown in FIGS. 11a and 11b excels in that the bearing sleeve 63 is not subjected to axial force owing to the pressure of the lubricant.

It should be noted that the spindle apparatuses in accordance with the first, second, third, and fourth embodiments are not limited to the above-described modes for carrying out the invention, and appropriate modifications, improvements, and the like are possible.

For example, in addition to being applied to a machining center, the spindle apparatus may be applied to an NC machine tool, a general purpose machine tool for effecting feeding operation manually, and the like.

In addition, the front and rear side bearings are not limited to angular contact ball bearings, and may be deep groove ball bearings or rolling bearings such as various roller bearings.

FIGS. 13 to 16 show a fifth embodiment of the invention. The characteristics of this embodiment lie in that an elastic body 94 for sealing a sleeve housing 88 and a bearing sleeve 84 is provided between fitting surfaces of the sleeve housing 88 and the bearing sleeve 84, and that a fluid for applying pressure is arranged to be supplied to the elastic body 94.

Figure 13:
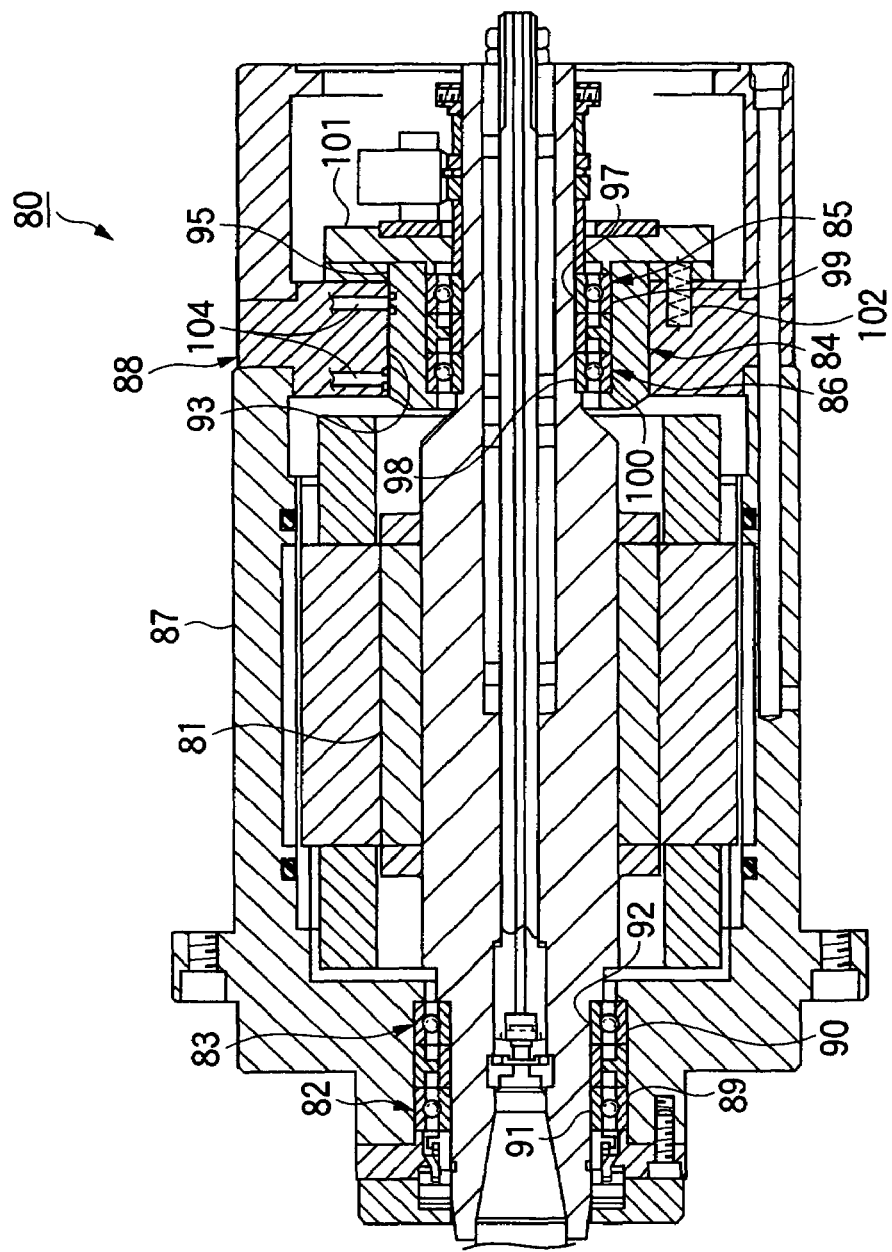
FIG. 13 is a longitudinal cross-sectional view of a fifth embodiment of the invention.
Figure 14:
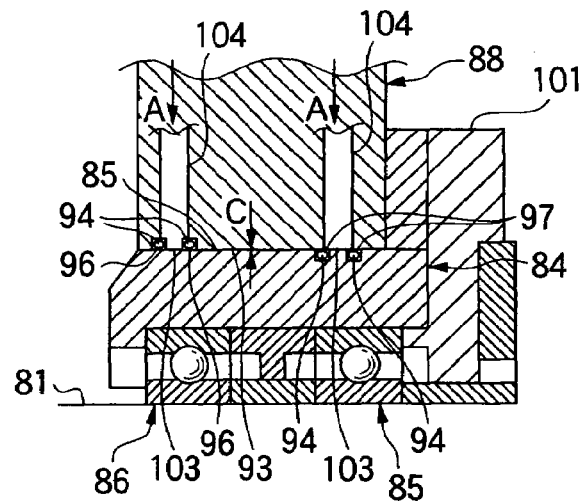
FIG. 14 is an enlarged longitudinal cross-sectional view of a sleeve portion in the fifth embodiment.

As shown in FIGS. 13 and 14, a spindle apparatus 80 in accordance with the fifth embodiment includes a rotating shaft 81; a pair of rolling bearings 82 and 83 which are front side bearings; the bearing sleeve 84; a pair of rolling bearings 85 and 86 which are rear side bearings; a front housing 87; and the sleeve housing 88. The sleeve housing 88 is fixed to the front housing 87 and virtually functions as a part of the front housing 87.

The pair of rolling bearings 82 and 83 are front side bearings having outer rings 89 and 90 fixed to the front housing 87 and inner rings 91 and 92 fitted and fixed to one end of the rotating shaft 81, such that the irrelative position with respect to the front housing 87 is fixed, so as to rotatably support the rotating shaft 81.

The bearing sleeve 84 is fitted in an inside diameter surface 93 of the sleeve housing 88 disposed on the other end side of the rotating shaft 81, and is disposed movable in the axial direction. The gap C between the bearing sleeve 84 and the inside-diameter surface 93 of the sleeve housing 88 is determined by taking into account the sleeve dimensions, required stiffness, thermal expansion due to the heat generation accompanying the rotation of the rotating shaft 81, and the like, and is designed by being appropriately selected from the range of 1 to 200 μm. If the gap C is too small, there is a possibility of the bearing sleeve 84 and the inside diameter surface 93 of the sleeve housing 88 coming into contact with each other. On the other hand, if the gap C is too large, the center position of the bearing sleeve 84 tends to become unstable.

Between the fitting surfaces of the bearing sleeve 84 and the inside diameter surface 93, O-rings 94, which are examples of the elastic bodies, are disposed two each at each end portion, i.e., a total of four O-rings 94 are disposed. A plurality of O-rings are combined to constitute one set. In this embodiment, two sets of O-rings are respectively disposed at both ends of an outer peripheral surface 95 of the bearing sleeve 84.

Namely, the two O-rings 94 disposed on a side close to the front side bearings 82 and 83 are installed in O-ring grooves 96 provided in the inside diameter surface 93 of the sleeve housing 88. Meanwhile, the two O-rings 94 disposed on a side far from the front side bearings 82 and 83 are installed in O-ring grooves 97 provided in the outside diameter surface 95 of the bearing sleeve 84. It should be noted that an arrangement may be provided such that, to the contrary of the arrangement of this embodiment, the O-ring grooves are provided in an outer peripheral surface of the sleeve on the side close to the front side bearings 82 and 83, while the O-ring bearings are provided in the sleeve housing on the side far from the front side bearings. Still alternatively, an arrangement may be provided such that the O-ring grooves are provided only in the outer peripheral surface of the sleeve, or the O-ring grooves are provided only in the sleeve housing.

The interference of the O-ring 94 is desirably set to not more than a working standard value of the O-ring 94 and not less than 10% of the working standard value. For instance, the interference in the case of an O-ring 94 with an inside diameter of 84.5 mm and a size of 2 mm is desirably set to not less than 0.05 mm and not more than 0.5 mm (standard values used are generally provided by O-ring manufacturers as recommended values, and the working standard value in the case of the aforementioned O-ring 94 is 0.3 to 0.6 mm). It should be noted that the working standard value is set to 15 to 20% of the average diameter of the elastic body such as the O-ring. Preferably, the standard reference value used is set to 0.2 mm to 0.4 mm. In addition, it is possible to use the elastic body is not limited to the O-ring 94, and rubber packing or metallic packing having sealing properties.

Here, the reason the upper limit of the interference in the O-ring 94 is set to not more than the working standard value is that if it is set to be greater than the same, the slidability of the bearing sleeve 84 becomes poor, and the amount of displacement of the O-ring 94 becomes large, possibly resulting in a short life of the O-ring 94. In addition, the reason the lower limit of the interference is set to be not less than 10% of the standard value is that if it becomes smaller than the same, the sealing properties of the O-ring 94 become poor.

The pair of rolling bearings 85 and 86 are rear side bearings having inner rings 97 and 98 fitted over the other end of the rotating shaft 81 and outer rings 99 and 100 fitted in the bearing sleeve 84 and fixed to the bearing sleeve 84 by an outer ring presser 101, and are movable in the axial direction of the rotating shaft 81 together with the bearing sleeve 84. Further, the pair of rolling bearings 85 and 86 rotatably support the rotating shaft 81 in cooperation with the front side bearings 82 and 83. A preload spring 102 is installed between the sleeve housing 88 and the outer ring presser 101, and applies preload to the rolling bearings 85 and 86 and the rolling bearings 82 and 83 by pulling the bearing sleeve 84 rearwardly by means of the outer ring presser 101. It should be noted that in the case of fixed-pressure preload, there are cases where a preload spring is not provided under fixed-position preload.

A fluid supplying passage 104 in which a fluid supplying port is open between the pair of O-rings 94 is provided in the sleeve housing 88. The fluid supplying passage is connected to a compressed fluid supplying device (not shown) disposed on an outer side of the spindle apparatus 80, and a compressed fluid is supplied thereto from the compressed fluid supplying device so as to supply the compressed fluid between the pair of O-rings 94. The compressed fluid supplying device is, for example, a compressor, and the fluid is, for example, air.

Next, a description will be given of the operation of this embodiment. As shown in FIGS. 13 and 14, in the spindle apparatus 80, when the rotating shaft 81 rotates, the temperature rises due to such as frictional heat generated. As a result, the rotating shaft 81 becomes elongated in the axial direction, but the pair of rolling bearings 85 an 86 which are the rear side bearings move in the axial direction (rightwardly in FIG. 1) together with the bearing sleeve 84, and absorbs the elongation of the rotating shaft 81 due to the heat. At the same time, the bearing sleeve undergoes thermal expansion, and its outside diameter becomes large, so that the gap C with the sleeve housing 88 becomes small. Therefore, the gap C is set to, for example, 10 μm or thereabouts by estimating the thermal expansion in advance. If the gap C is large, radial stiffness declines. Actually, however, since the plurality of O-rings 94 are disposed between the bearing sleeve 84 and the sleeve housing 88 in a state of being crushed by the portion of the interference, the radial stiffness is increased by the O-rings 94, suppressing the vibration of the rotating shaft 81.

Figure 15:
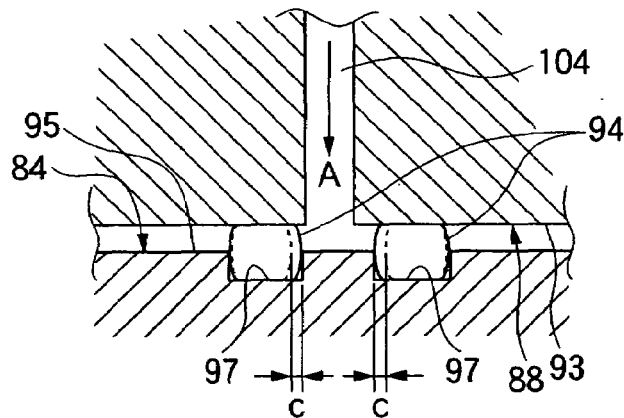
FIG. 15 is an enlarged longitudinal cross-sectional view of essential portions illustrating a state in which an elastic body is deformed by the pressure of a fluid supplied in the fifth embodiment.

As shown in FIG. 15, when compressed air is supplied under pressure in the direction of arrow A from the compressor, i.e., the compressed fluid supplying device, through the fluid supplying passage 104, and is supplied between the pair of O-rings 94, the pair of O-rings 94 which are installed by being fitted in the O-ring grooves 97 are pressed and crushed (compressed amount c) in mutually opposite directions. As a result, the stiffness of the pair of O-rings 94 is further increased, so that the radial stiffness and axial damping properties of the bearing sleeve 84 become high. As for the stiffness of the pair of O-rings 94, it is possible to obtain arbitrary stiffness by adjusting the amount of the O-rings 94 crushed by adjusting the pressure of the compressed air. In addition, since the pressure acting on both O-rings 94 acts uniformly on either O-ring 94, their amounts of crushed can be made uniform, so that the stiffness can be increased while maintaining the balance of the stiffness of both O-rings 94.

EXAMPLE

Figure 16:
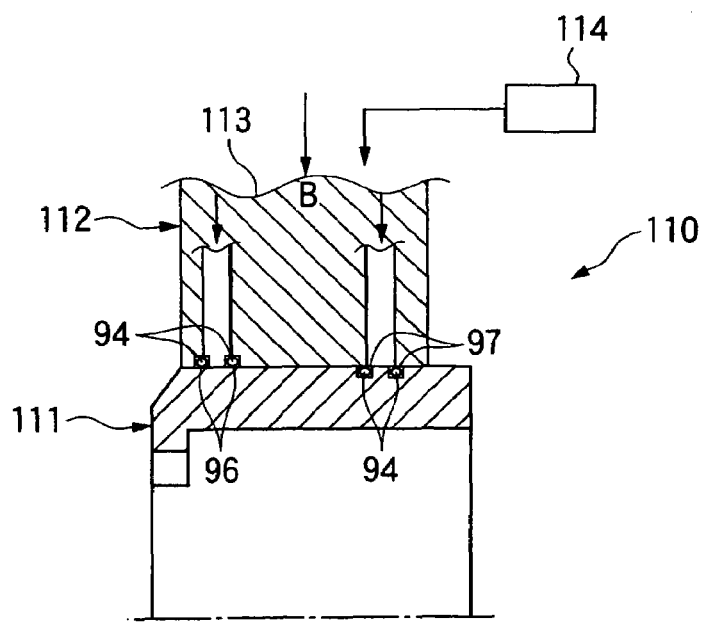
FIG. 16 is an enlarged longitudinal cross-sectional view of essential portions of a testing device for measuring various characteristics of the sleeve portion in the fifth embodiment.

Next, a description will be given of the results of measurement of stiffness conducted by using a testing device 110 (its essential portions are shown in FIG. 16 by way of example).

The testing device 110 is disposed such that a dummy sleeve housing 112 with an inside diameter of 85 mm is fitted in a dummy bearing sleeve 111 with an outside diameter of 85 mm by providing a fitting gap of 150 μm, the dimensions being identical to those of the actual spindle apparatus 80. The two O-ring bearings 96 are provided on the front side bearing side (left-hand side in FIG. 16) of the dummy sleeve housing 112, the two O-ring bearings 97 are similarly provided in parallel on the rear side bearing side (right-hand side in FIG. 16) of the dummy bearing sleeve 111. The O-ring 94 with an inside diameter of 84.5 mm and a size of 2 mm is installed in each of the O-ring bearings 97 and 96. In addition, a pickup of an electric micrometer is attached to an outer peripheral surface 113 of the dummy sleeve housing 112 so as to be able to detect the amount of radial displacement of the outer peripheral surface 113 of the dummy sleeve housing 112 (which is also the amount of displacement of the center of the dummy sleeve housing 112) by an electric micrometer 114.

A load is applied to the testing device 110 thus constructed, by pressing the outer peripheral surface of the dummy sleeve housing 112 in the direction of arrow B by an air cylinder (not shown).

The respective test conditions other than those described above are as follows:
Material of the O-ring:
  A) nitrile rubber
  B) fluoro rubber Interference of the O-ring:
  A) 0.300 mm
  B) 0.275 mm
  C) 0.250 mm
Pressure of compressed air:
  A) 0 MPa
  B) 0.49 MPa
Load on two O-rings by the air cylinder:
  A) 50 N
  B) 100 N
Testing Method: Tests are conducted by randomly changing the respective conditions including the material of the O-ring, the interference of the O-ring, the pressure of the compressed air, and the load by the air cylinder. The amount of displacement (the amount of displacement of the center) of the outer peripheral surface 113 of the dummy sleeve housing 112 is measured by the electric micrometer 114. As for the respective measurements, measurements are made five times each, and their average value is set as the result of measurement.

(Results of Measurement)

The results of measurement of the stiffness of the O-rings when the pressure of the compressed air is set to 0 MPa (i.e., when there is no supply of the compressed air) are shown in Table 1 as ratios between the load applied to the dummy sleeve housing 112 by the air cylinder and the amount of displacement of the center. It should be noted that the unit is N/μm, and shows that the greater the numerical value, the greater the radial stiffness.

TABLE 1

Compressed air pressure: 0 MPa
Unit: N/μm

| | Material of O-ring | | | | | |
|---|---|---|---|---|---|---|
| | nitrile rubber | | | fluoro rubber | | |
| | Interference mm | | | | | |
| Load N(*) | 0.3 | 0.275 | 0.25 | 0.3 | 0.275 | 0.25 |
| 100 | 2.35 | 1.79 | 1.47 | 1.75 | 1.53 | 1.33 |
| 50 | 1.93 | 1.44 | 1.27 | 1.56 | 1.25 | 1.10 |

(*)The load is the one which is applied to the two O-rings.

The results of measurement of the stiffness of the O-rings when the pressure of the compressed air is set to 0.49 MPa are shown in Table 2 as ratios between the load applied to the dummy sleeve housing 112 by the air cylinder and the amount of displacement of the center. It should be noted that the unit is N/μm, and shows that the greater the numerical value, the greater the radial stiffness.

TABLE 2

Compressed air pressure: 0.49 MPa
Unit: N/μm

| | Material of O-ring | | | | | |
|---|---|---|---|---|---|---|
| | nitrile rubber | | | fluoro rubber | | |
| | Interference mm | | | | | |
| Load N (*) | 0.3 | 0.275 | 0.25 | 0.3 | 0.275 | 0.25 |
| 100 | 2.70 | 2.67 | 2.30 | 2.25 | 2.11 | 1.94 |
| 50 | 2.27 | 2.15 | 1.85 | 2.05 | 1.74 | 1.51 |

(*)The load is the one which is applied to the two O-rings.

In addition, the O-rings 94 made of fluoro rubber whose interference is set to 0.250 mm are installed in a random installation order, and the offset of the center position of the dummy sleeve housing 112 is measured five times. The variations (maximum value–minimum value) are shown in Table 3.

TABLE 3

| Compressed air pressure MPa | 0 | 0.49 |
|---|---|---|
| Variation of the amount of center displacement μm | 56 | 22 |

As can be appreciated from Table 1, in the case where compressed air is not supplied to the O-rings 94, the larger the interference of the O-rings 94, the higher the radial stiffness. In addition, the amount of change in the radial stiffness with respect to the amount of change in interference is greater in the case of the fluoro rubber-made O-rings than in the case of the nitrile rubber-made O-rings.

From Tables 1 and 2, it can be appreciated that the radial stiffness can be increased by supplying compressed air to the O-rings 94. This is attributable to the fact that the O-rings 94 are crushed (see FIG. 15) by the compressed air, and the stiffness of the O-rings 94 themselves has become high. In addition, the smaller the interference, the greater the amount of change in the radial stiffness due to the supply of compressed air. Furthermore, the amount of change in the radial stiffness due to the supply of the compressed air is greater in the case of the fluoro rubber-made O-rings than in the case of the nitrile rubber-made O-rings.

As can be appreciated from Table 3, the variation of the amount of offset of the center position of the dummy sleeve housing 112 is 56 μm in the case where the compressed air is not supplied, whereas the variation of the amount of offset is small at 22 μm in the case where the compressed air is supplied. Thus, it can be understood that the shapes and attitudes of the O-rings 94 become stabilized by supplying the compressed air.

From the above-described test results, it can be understood that by disposing the plurality of O-rings 94 between the front housing 87 and the bearing sleeve 84 and by supplying the compressed air between the O-rings 94, it is possible to increase the radial stiffness, and that by adjusting the pressure of the compressed air, it is possible to adjust the radial stiffness to arbitrary hardness.

It should be noted that the spindle apparatus in accordance with the fifth embodiment is not limited to the above-described modes for carrying out the invention, and appropriate modifications, improvements, and the like are possible.

For example, in addition to being applied to a machining center, the spindle apparatus may be applied to an NC machine tool, a general purpose machine tool for effecting feeding operation manually, and the like.

In addition, the front and rear side bearings are not limited to angular contact ball bearings, and may be deep groove ball bearings or rolling bearings such as various roller bearings.

Figure 17:
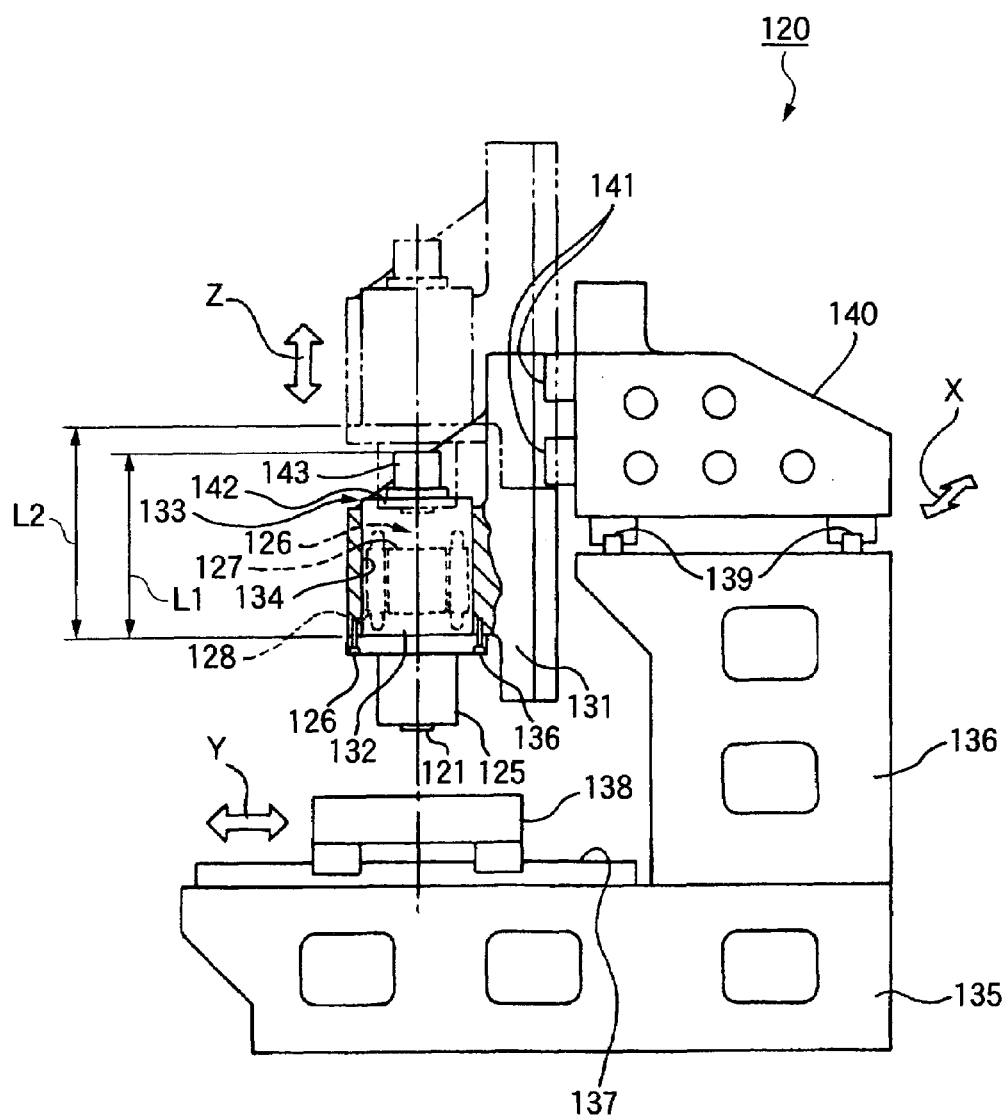
FIG. 17 is a side elevational view illustrating a sixth embodiment of the invention.
Figure 18:
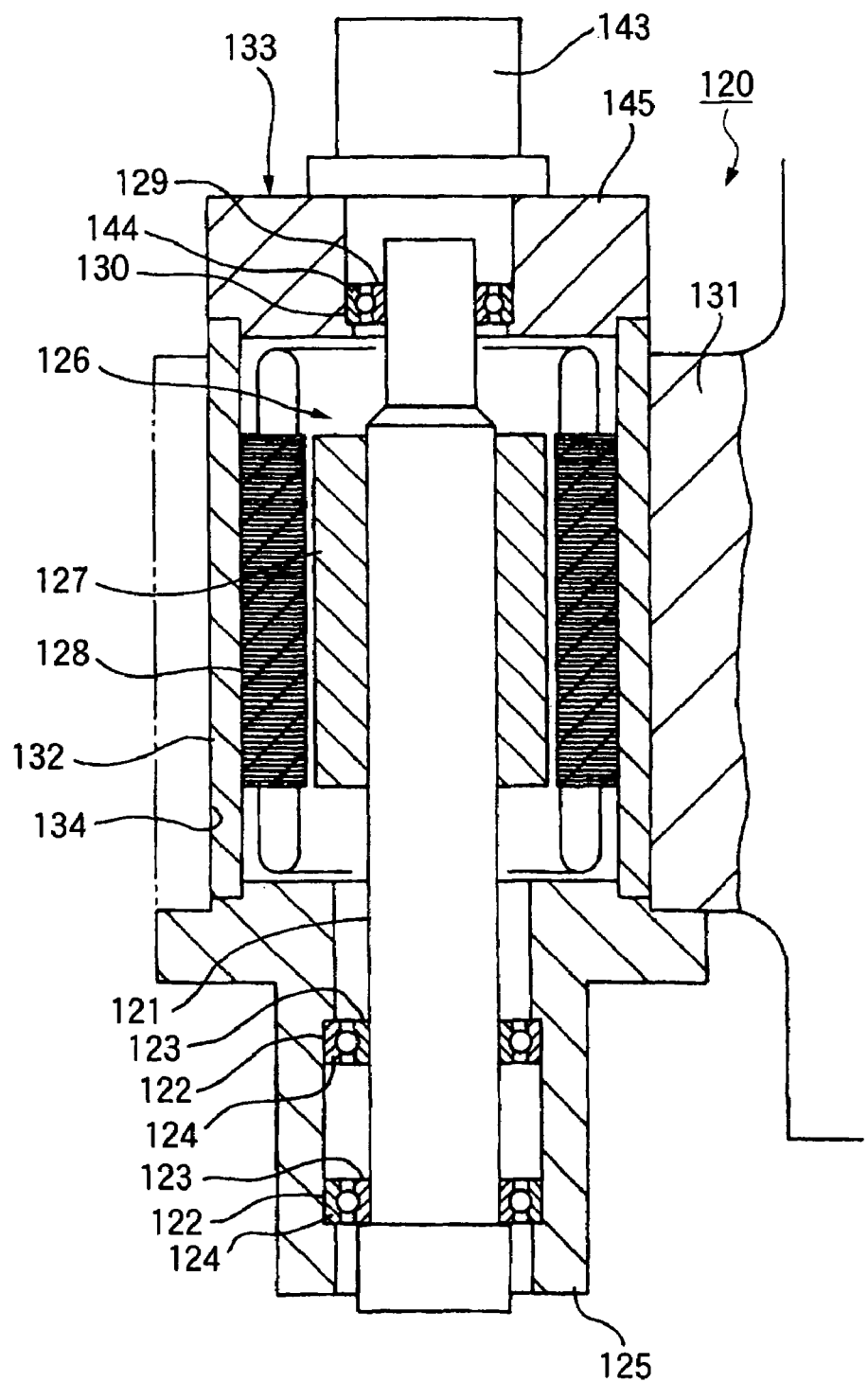
FIG. 18 is a cross-sectional view of a spindle cartridge used in the sixth embodiment.

FIGS. 17 and 18 show a sixth embodiment of the invention. The characteristic of this embodiment lies in that a spindle cartridge 133, which includes a rotating shaft 121, front side bearings 122 and 122, a front housing 125, a rotor 127 and a stator 128 of a built-in motor 126, a rear side bearing 130, a rear housing 145, and an outer cylinder 132, is capable of being disassembled and assembled integrally with respect to a spindle head 131.

As shown in FIGS. 17 an 18, a spindle apparatus 120 in accordance with the sixth embodiment includes the spindle cartridge 133 which includes the rotatable rotating shaft 121; the front side bearings 122 and 122 having inner rings 123 and 123 in which the front end of the rotating shaft 121 is fitted; the front housing 125 in which outer rings 124 and 124 of the front side bearings 122 and 122 are fitted; the rotor 127 of the built-in motor 126; the stator 128 of the built-in motor 126; the rear side bearing 130 having an inner ring 129 in which the rear end of the rotating shaft 121 is fitted; and the outer cylinder 132 fitted in the spindle head 131. The spindle cartridge 133 is capable of being disassembled and assembled integrally with respect to the spindle head 131.

Further, the spindle head 131 has a spindle cartridge gripping portion 134 in the axial direction, and the spindle cartridge 133 is inserted in that spindle cartridge gripping portion 134. In addition, the amount of movement in a feeding axis direction parallel to the axial direction of the rotating shaft 121 is set to be longer than the length necessary for inserting the spindle cartridge 133 into the spindle head 131.

The machine tool 120 is a vertical machining center, and a column is uprightly fixed on a bed 135. A worktable 138, while being supported by a pair of Y-axis guide rails 137 disposed on the bed 135, moves in a Y-axis direction which is a feeding axis direction perpendicular to the axial direction of the rotating shaft 121 in which the worktable 138 is advanced or retreated with respect to the column 136. A pair of X-axis guide rails 139 are disposed on an upper end of the column 136, and a saddle 140, while being supported by these X-axis guide rails 139, moves in an X-axis direction perpendicular to the axial direction of the rotating shaft 121, i.e., in the lateral direction with respect to the columns 136 (in a direction perpendicular to the plane of the drawing of FIG. 17). A pair of Z-axis guide rails 141 are disposed at a leading end of the saddle 140, and the spindle head 131, while being supported by these Z-axis guide rails 141, moves in such a manner as to advance or retreat with respect to the worktable 138 in a Z direction which is a feeding axis direction parallel to the axial direction of the rotating shaft 121.

The spindle cartridge 133 includes the rotating shaft 121; the front side bearings 122; the front housing 125; the rotor 127 for making up the built-in motor 126; the stator 128 for similarly making up the built-in motor 126; the rear side bearing 130; the rear housing 145; and the outer cylinder 132. The spindle cartridge 133 is capable of being disassembled and assembled integrally with respect to the spindle head 131.

The rotating shaft 121 has the rotor 127 in non-contact with the inner peripheral portion of the stator 128. The rotor 127 rotates the rotating shaft 121 by the rotating magnetic field generated by the stator 128. The rotating shaft 121 is coupled to a tool holder (not shown) through an interiorly fitted drawbar (not shown).

The outer cylinder 132 is formed in a cylindrical shape, and its one end portion, and the stator 128 is fixed to its inner peripheral surface. The stator 128 generates a rotating magnetic field on its inner peripheral side by an electric current supplied through a motor power supply cable (not shown).

The front housing 125 is formed in a cylindrical shape and is fixed to a front end of the outer cylinder 132.

The rear housing 145 is formed in a cylindrical shape and is fixed to a rear end of the outer cylinder 132. A tool unclamp cylinder 143 of a piston mechanism, in which a rotary joint (not shown) which moves in such a manner as to advance or retreat to press the drawbar, is joined to the rear housing 145.

The front side bearings 122 and 122 are multi-row angular contact ball bearings, and the front end portion of the rotating shaft 121 is fitted in the inner rings 123 and 123, respectively, while the outer rings 124 and 124 are respectively fitted in the front housing 125.

The rear side bearing 130 is a single-row angular contact ball bearing, and the rear end portion of the rotating shaft 121 is fitted in its inner ring 129, while its outer ring 144 is fitted in the rear housing 145.

According to the machine tool 120 of this embodiment, the amount of movement in the feeding axis direction parallel to the axial direction of the rotating shaft 121 is set to be longer than the length necessary for inserting the spindle cartridge 133 into the spindle head 131. As a result, the amount of Z-axis movement, which is the feeding axis direction parallel to the axial direction of the rotating shaft 121, is longer than the length necessary for inserting the spindle cartridge 133 into the spindle head 131. Hence, withdrawal can be performed easily by making use of the Z-axis feeding.

FIGS. 19 to 23 show a seventh embodiment of the invention. A characteristic of this embodiment lies in that a spindle sub-cartridge 151, which a sub-assembly includes the rotating shaft 121, the front side bearings 122, the front housing 125, the rotor 127 of the built-in motor 126, the rear side bearing 130, and the bearing sleeve 142, is capable of being disassembled and assembled integrally with respect to the spindle head 131. Another characteristic of this embodiment is that the amount of movement in the feeding axis direction parallel to the axial direction of the rotating shaft 121 is set to be longer than the length necessary for inserting the spindle sub-cartridge 151 into the spindle head 131. Since the other arrangements are identical to those of the first embodiment, identical members will be denoted by the same reference numerals, and a detailed description thereof will be omitted.

Figure 19:
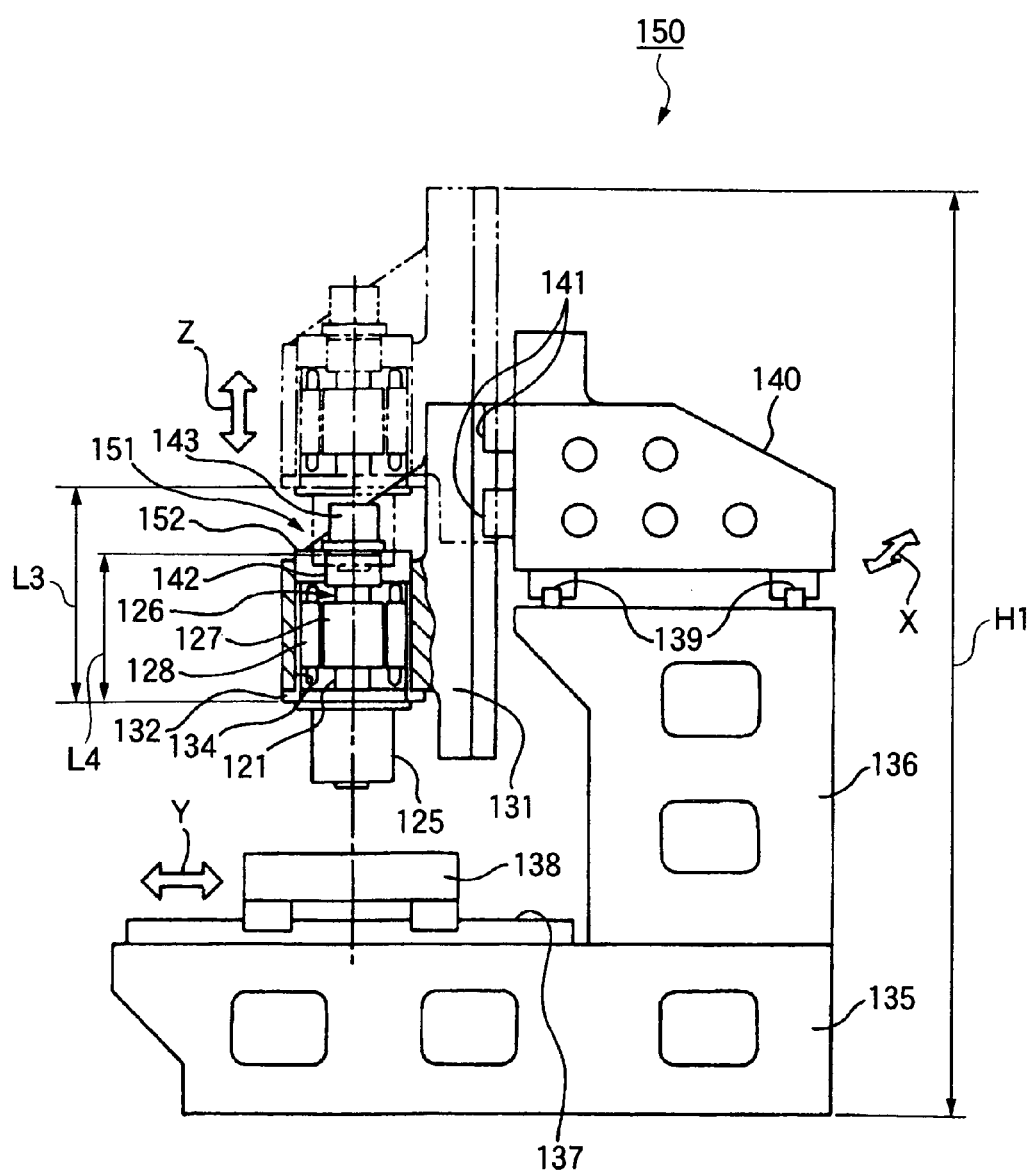
FIG. 19 is a side elevational view illustrating a seventh embodiment of the invention.

As shown in FIG. 19, a spindle apparatus 150 in accordance with the seventh embodiment includes the spindle sub-cartridge 151 which is a sub-assembly including the rotatable rotating shaft 121; the front side bearings 122 having the inner rings 123 in which the front end of the rotating shaft 121 is fitted; the front housing 125 in which the outer rings 124 of the front side bearings 122 are fitted; the rotor 127 of the built-in motor 126; the rear side bearing 130 having the inner ring 129 in which the rear end of the rotating shaft 121 is fitted; and the bearing sleeve 142 in which the outer ring 144 of the rear side bearing 130 is fitted. The spindle sub-cartridge 151 is capable of being disassembled and assembled integrally with respect to the spindle head 131. In addition, the amount of movement in the feeding axis direction parallel to the axial direction of the rotating shaft 121 is set to be longer than the length necessary for inserting the spindle sub-cartridge 151 into the spindle head 131.

In the case of the machine tool of the vertical machining center, if the amount of Z-axis movement L3 of the spindle head 131, which moves in the Z-axis direction while being supported by the Z-axis guide rails 141, becomes long, the machine height H1 inevitably becomes high. The machine height H1 is subject to restrictions of the height at the time of transportation on a road, the height of entrance/exit sections of a factory at the time of the carrying in and out of the machine, and the ceiling height of the installation site. For this reason, with the machine tool 150, the length L4 necessary for completely withdrawing the spindle sub-cartridge 151, i.e., the sub-assembly, from the spindle head 131 is smaller than the length L1 necessary for withdrawing the spindle cartridge 133 (see FIG. 17), so that the amount of Z-axis movement L3 can be made short. Consequently, the machine height H1 can be made low.

Figure 20:
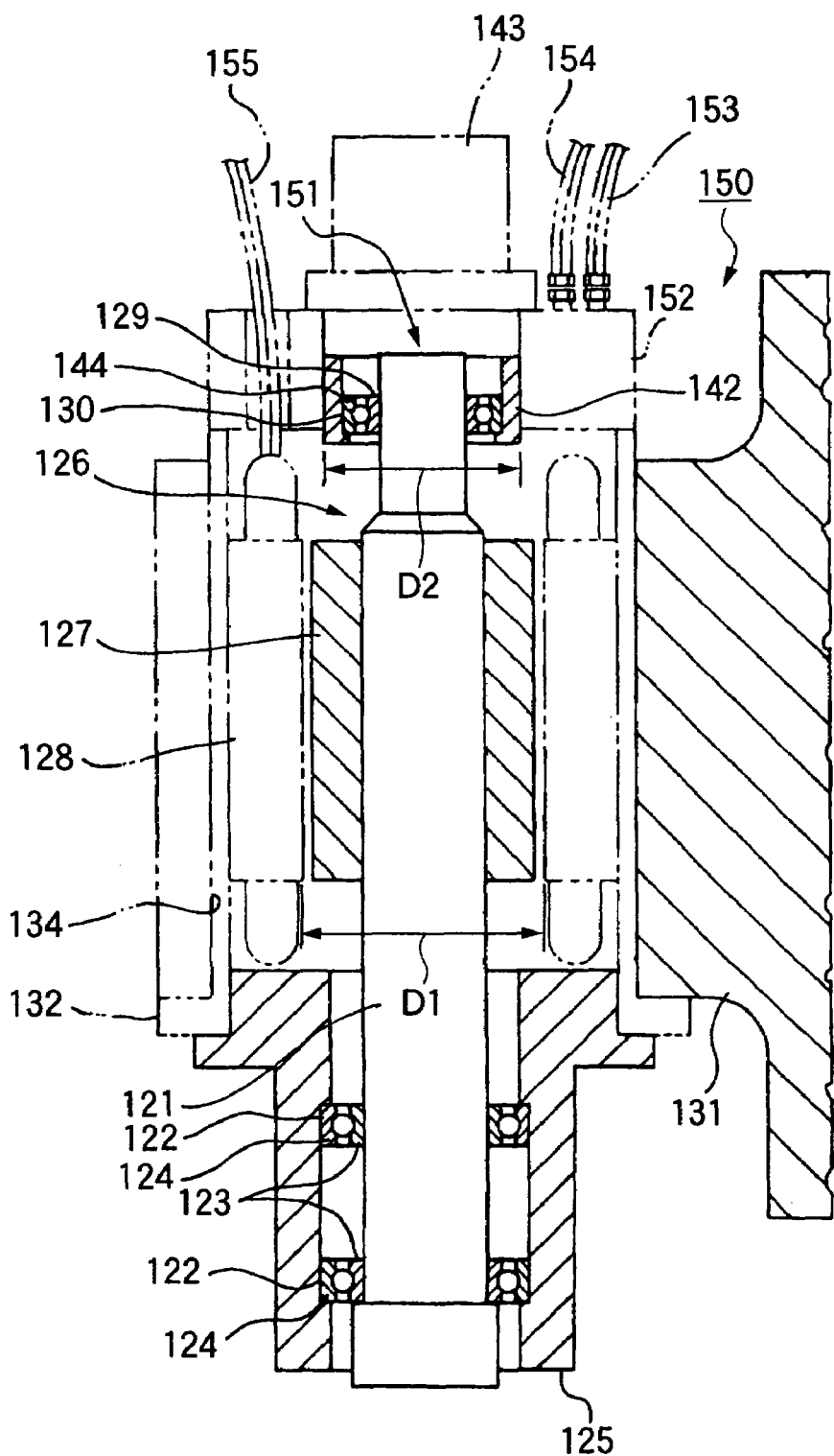
FIG. 20 is a cross-sectional view of a spindle sub-cartridge used in the seventh embodiment.

As shown in FIG. 20, with the spindle sub-cartridge 151, the outside diameter φD2 of the bearing sleeve 142 is smaller than the inside diameter φD1 of the stator 128. Further, with the spindle sub-cartridge 151, the bearing sleeve 142 is capable of moving freely in the axial direction downwardly in FIG. 20 with respect to a sleeve housing 152 with this bearing sleeve 142 fitted therein. As a result, the spindle sub-cartridge 151, i.e., the sub-assembly, can be integrally withdrawn from the outer cylinder 132, with the front housing 125 heading first, by merely removing bolts (not shown) which fasten the spindle sub-cartridge 151 and the outer cylinder 132. At the same time, the spindle sub-cartridge 151 can be disassembled and assembled integrally with respect to the spindle head 131 without performing the operation of removing a cooling oil supplying hose 153, an oil pressure supplying hose 154, and a motor power cable 155, which are disposed on the sleeve housing 152. It is thereby possible to shorten the replacement time.

Next, referring to FIGS. 21 to 23, a description will be given of the procedure of dismounting the spindle sub-cartridge 151 in the machine tool 150 in accordance with the seventh embodiment.

Figure 21:
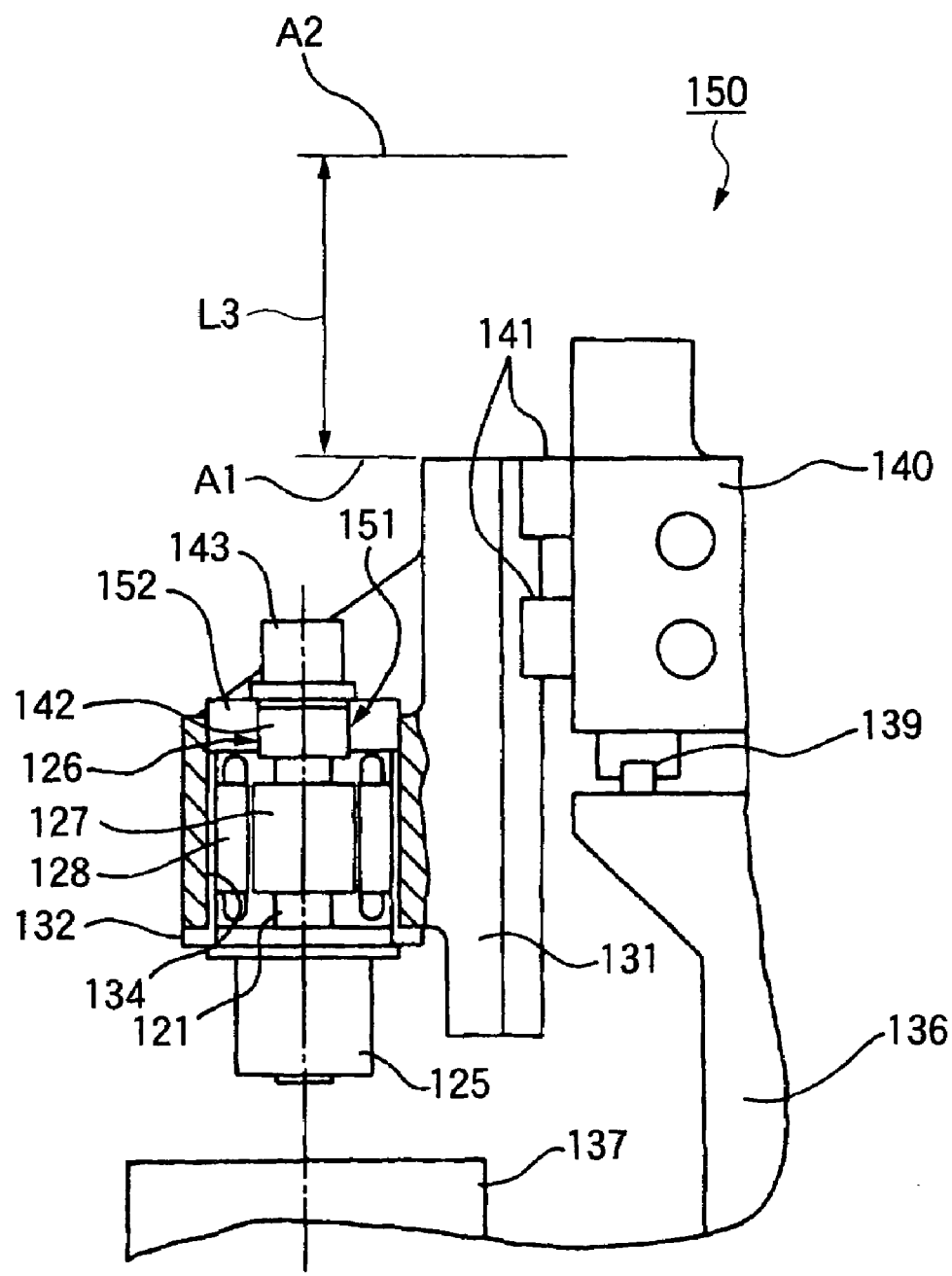
FIG. 21 is an explanatory diagram illustrating the procedure for dismounting the spindle sub-cartridge in the seventh embodiment.

As shown in FIG. 21, the spindle head 131 is first lowered to a lowest position A1 by making use of the Z-axis feeding. The fixation of the front housing 125 to the outer cylinder 132 is released there.

Figure 22:
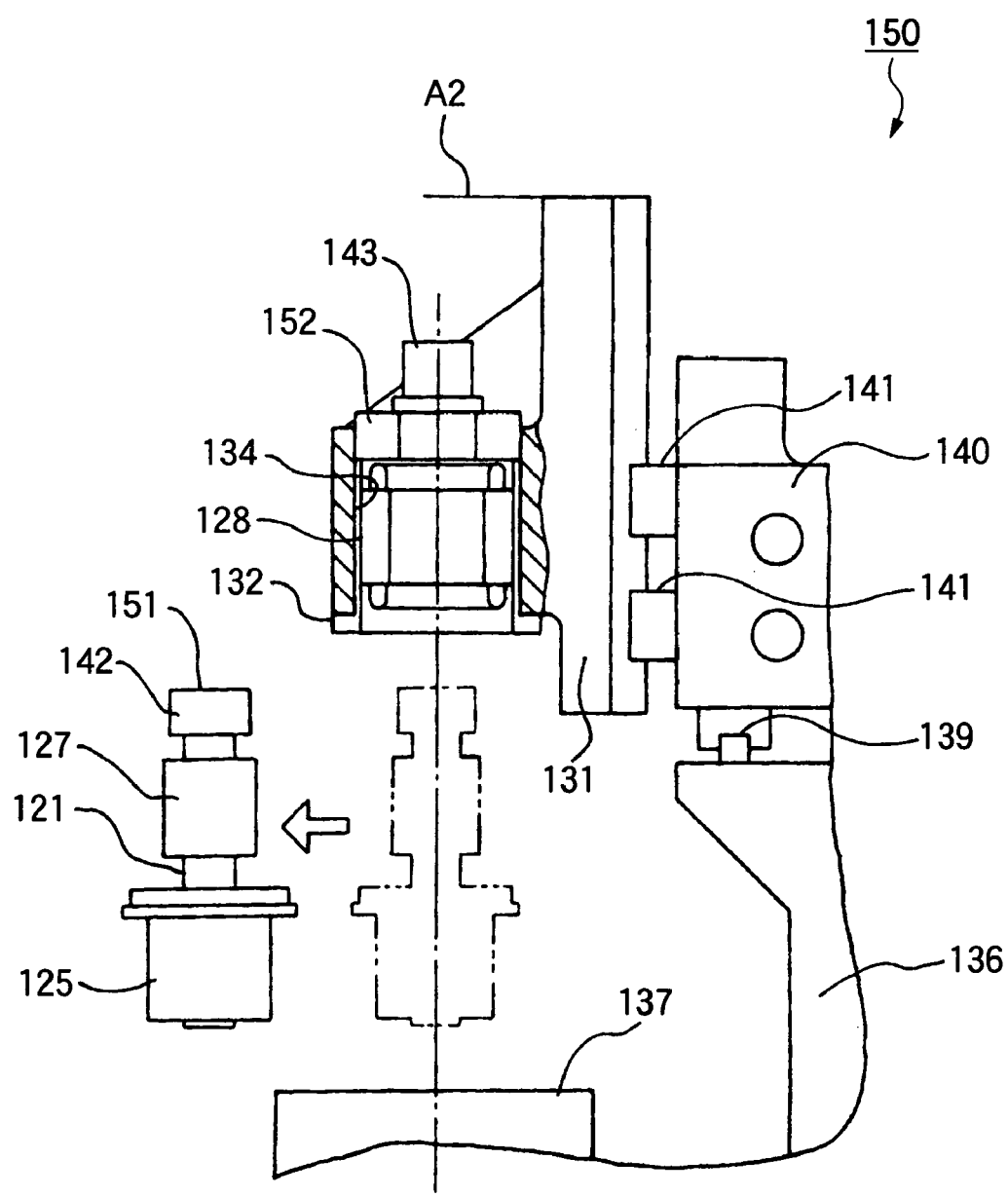
FIG. 22 is an explanatory diagram illustrating the procedure for dismounting the spindle sub-cartridge in the seventh embodiment.

As shown in FIG. 22, the spindle head 131 is raised to a highest position A2 by making use of the Z-axis feeding. Since the spindle head 131 is raised together with the sleeve housing 152 and the outer cylinder 132 having the stator 128, only the spindle sub-cartridge 151, i.e., the sub-assembly, is left, so that this spindle sub-cartridge 151 can be removed integrally.

Figure 23:
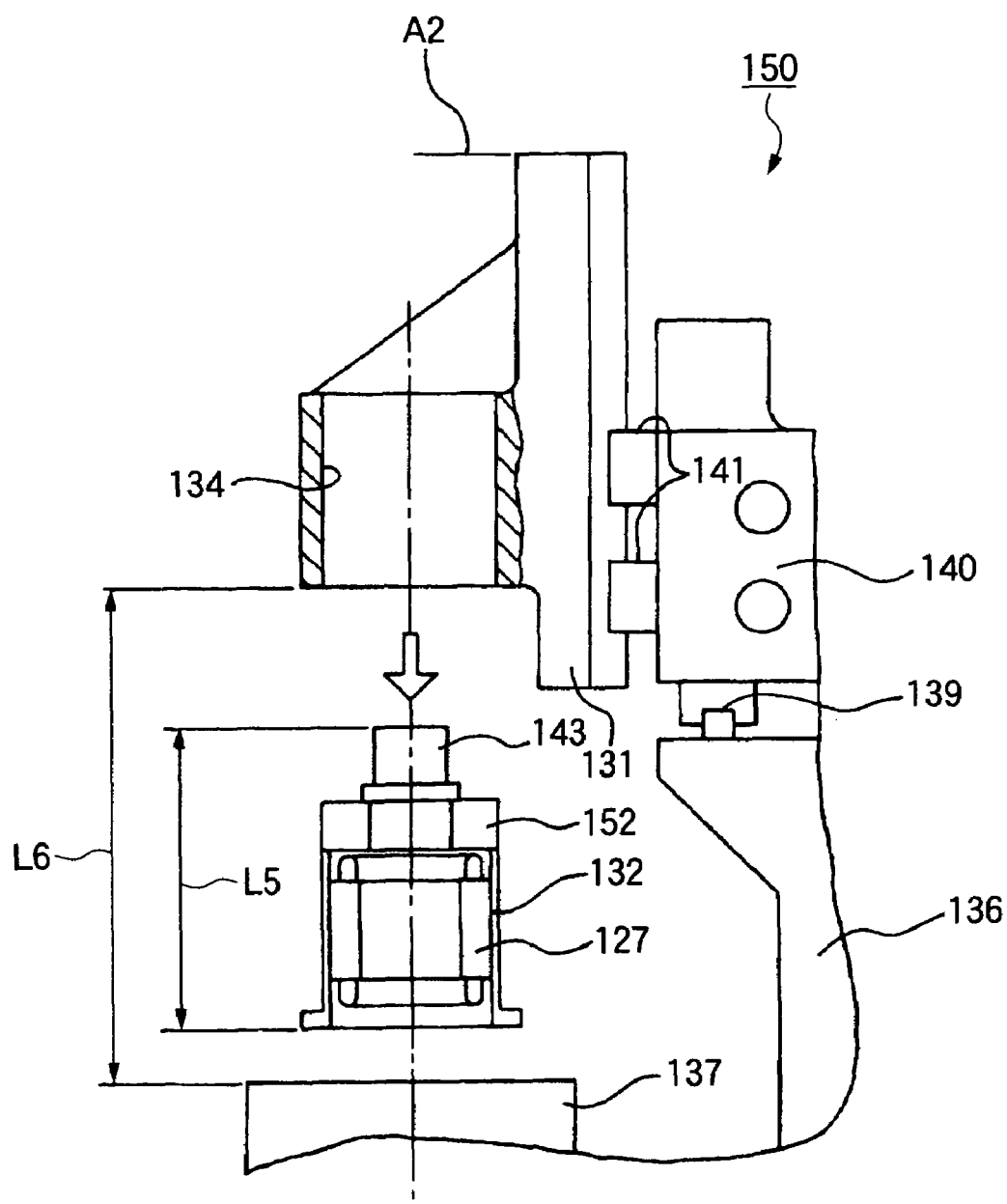
FIG. 23 is an explanatory diagram illustrating the procedure for dismounting the spindle sub-cartridge in the seventh embodiment.

As shown in FIG. 23, the remaining parts, such as the sleeve housing 152 and the outer cylinder 132 having the stator 128, can be removed by releasing the tightening of the spindle head 131 to the outer cylinder 132. At this time, in order to integrally remove the remaining parts, such as the sleeve housing 152 and the outer cylinder 132 having the stator 128, the distance L6 from a lower surface of the spindle head 131 to an upper surface of the worktable 137 must be longer than the overall length L5 of the remaining parts. However, since the spindle sub-cartridge 151 is already disassembled, it is readily possible to establish the relationship of L5<L6. It is thereby possible to shorten the amount of Z-axis movement L3 and lower the machine height H1.

According to the machine tool 150 of this embodiment, the spindle sub-cartridge 151 includes the rotating shaft 121, the front side bearings 122, the front housing 125, the rotor 127, the rear side bearing 130, and the bearing sleeve 142. This spindle sub-cartridge 151 is disposed so as to be capable of being disassembled and assembled integrally with respect to the spindle head 131. Accordingly, the spindle sub-cartridge 151, i.e., the sub-assembly, which requires inspection, repair, or replacement can be dismounted as a single unit from the spindle head 131, and can be disassembled and assembled without disassembling the entire machine tool 150.

Figure 24:
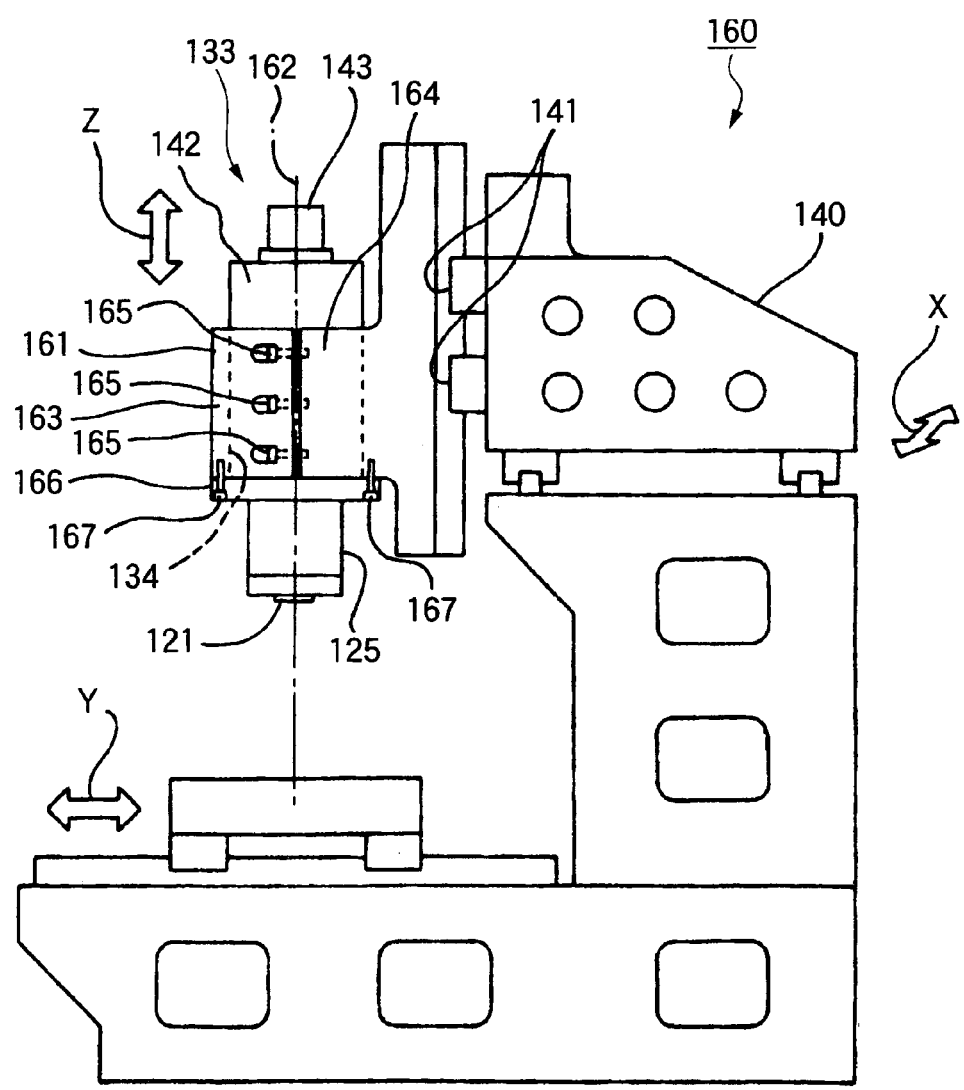
FIG. 24 is a side elevational view illustrating an eighth embodiment of the invention.

FIG. 24 shows an eighth embodiment of the invention. A characteristic of this embodiment lies in that the spindle cartridge 133 can be disassembled integrally and can be assembled integrally as a single unit. Another characteristic of this embodiment is that a spindle head 161 has the spindle cartridge gripping portion 134 for accommodating the spindle cartridge 133, and the spindle cartridge gripping portion 134 can be disassembled by being divided at a position for dividing at least in half. Since the other arrangements are identical to those of the first embodiment, identical members will be denoted by the same reference numerals, and a detailed description thereof will be omitted.

As shown in FIG. 24, with a machine tool 160 of the eighth embodiment, the spindle cartridge 133 can be disassembled integrally and can be assembled integrally as a single unit. In addition, the spindle head 161 has the spindle cartridge gripping portion 134 for accommodating the spindle cartridge 133. Further, the spindle cartridge gripping portion 134 of the spindle head 161 can be disassembled by being divided at a position for dividing at least in half.

In the machine tool 160, the spindle head 161 has a first spindle head portion 163 and a second spindle head portion 164 which are divided at the portion of a center line 162 of the rotational axis, the two spindle head portions 163 and 164 being fastened by bolts 165. Further, the spindle cartridge 133 is fastened to both of the integrated first spindle head portion 163 and second spindle head portion 164 by bolts 167 through a flange portion 166.

With the machine tool 160, when the spindle cartridge 133 is replaced, the spindle cartridge 133 can be dismounted integrally as a single unit irrespective of the length of the Z-axis stroke by removing the first spindle head portion 163 from the second spindle head portion 164 by removing the bolts 165, and that operation can be performed easily. Here, the second spindle head portion 164 is set to a mass which can be held by a person.

It should be noted that the spindle apparatuses in accordance with the sixth, seventh, and eighth embodiments are not limited to the above-described modes for carrying out the invention, and appropriate modifications, improvements, and the like are possible.

For example, in addition to being applied to a machining center, the spindle apparatus may be applied to an NC machine tool, a general purpose machine tool for effecting feeding operation manually, and the like.

In addition, the front and rear side bearings are not limited to angular contact ball bearings, and may be deep groove ball bearings or rolling bearings such as various roller bearings.

FIGS. 25 to 29 show a ninth embodiment of the invention. The characteristics of this embodiment are as follows: There are provided an outer cylinder 181, a spindle head 183, a rotating shaft 184, front side bearings 186 and 186, a rear side bearing 188, a front housing 191, a sleeve housing 193, and a tool unclamp cylinder 194. The rotating shaft 184, the front side bearings 186, the rear side bearing 188, the front housing 191, and the sleeve housing 193 are integrally assembled to form a spindle sub-cartridge 195 which is a sub-assembly. The spindle sub-cartridge 195, the outer cylinder 181, and the tool unclamp cylinder 194 are arranged in a three-divided form. The spindle sub-cartridge 195, which is the sub-assembly, is made withdrawable from the outer cylinder 181.

Figure 25:
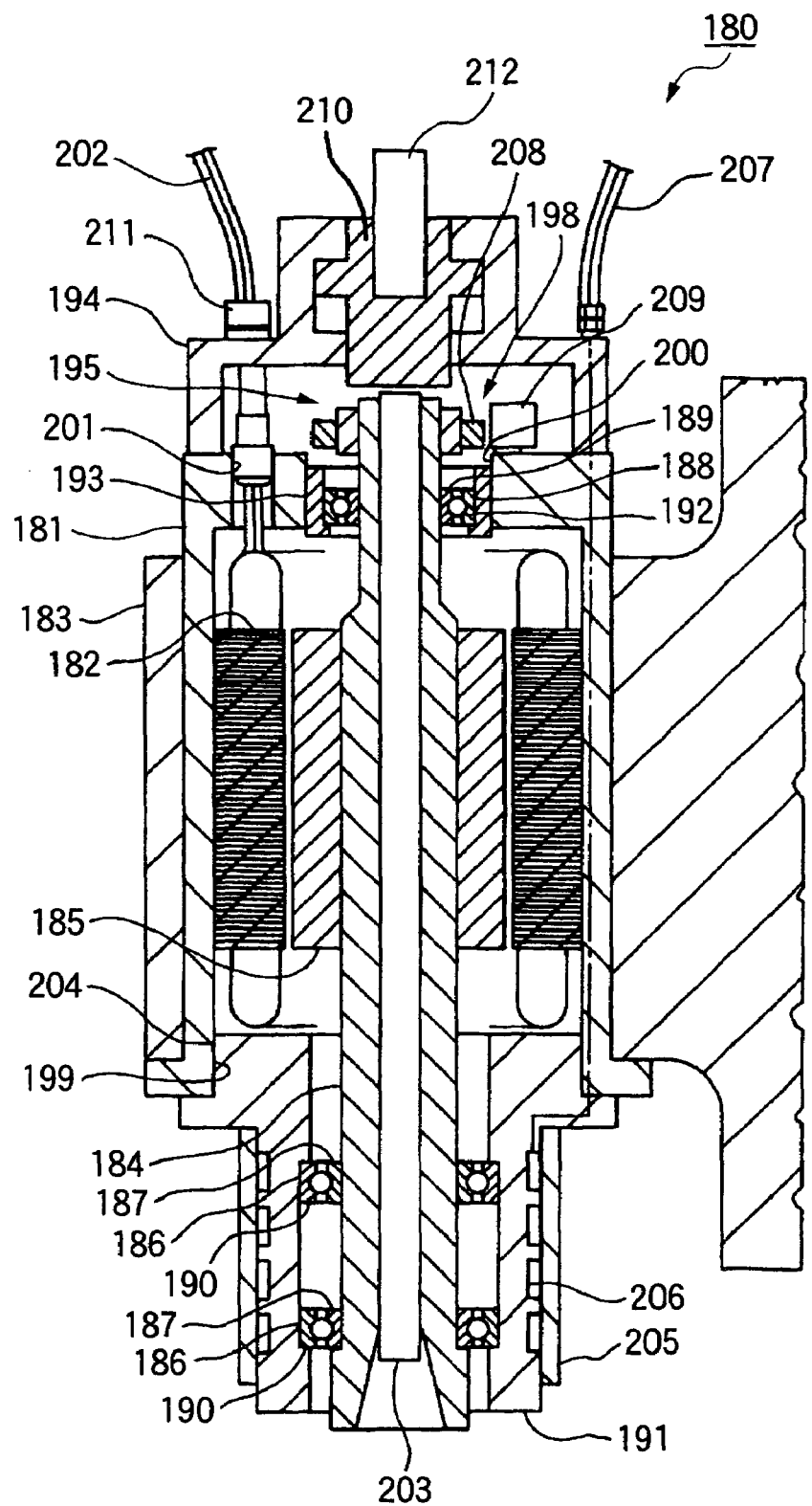
FIG. 25 is a cross-sectional view illustrating a ninth embodiment of the invention.

As shown in FIG. 25, a spindle apparatus 180 in accordance with the ninth embodiment includes the outer cylinder 181 having a stator 182; the spindle head 183 in which the outer cylinder 181 is fitted; the rotatable rotating shaft 184 having a rotor 185 disposed inside the stator 182; the front side bearings 186 and 186 having inner rings 187 and 187 in which one end of the rotating shaft 184 is fitted; the rear side bearing 188 having an inner ring 189 in which the other end of the rotating shaft 184 is fitted; the front housing 191 in which outer rings 190 and 190 of the front side bearings 186 and 186 are fitted and which is installed on one end of the outer cylinder 181; the sleeve housing 193 in which an outer ring 192 of the rear side bearing 188 is fitted and which is fitted in the other end of the outer cylinder 181; and the tool unclamp cylinder 194 fixed to the one end of the outer cylinder 181. The rotating shaft 184 with the rotor 185, the front side bearings 186, the rear side bearing 188, the front housing 191, and the sleeve housing 193 are integrally assembled to form the spindle sub-cartridge 195. That spindle sub-cartridge 195, the outer cylinder 181, and the tool unclamp cylinder 194 are arranged in a three-divided form, and the spindle sub-cartridge 195 is withdrawable from the outer cylinder 181.

In addition, the tool unclamp cylinder 194 is withdrawable from the outer cylinder 181, and an assembly (first assembly) (shown in FIG. 28) 196 of the tool unclamp cylinder 194 and the outer cylinder 181 with the spindle sub-cartridge 195 withdrawn therefrom is withdrawable from the spindle head 183.

Meanwhile, an assembly (second assembly) (shown in FIG. 29) 197 of the spindle sub-cartridge 195, the outer cylinder 181, and the tool unclamp cylinder 194 is withdrawable from the spindle head 183. A sensor (rotation sensor) 198 for detecting the rotation of the rotating shaft 184 is disposed between the rotating shaft 184 and the outer cylinder 181.

The outer cylinder 181 is formed in a cylindrical shape, and its one end portion, which is located on the lower side in FIG. 25, is formed as a front housing fixing portion 199. Further, the outer cylinder 181 has a sleeve housing fixing portion 200 formed at the other end portion which is located on the upper side in FIG. 25. An electric cable inserting portion 201 is formed in the sleeve housing fixing portion 200. The stator 182 is fixed to an inner peripheral surface of the outer cylinder 181. The stator 182 generates a rotating magnetic field on its inner peripheral side by an electric current supplied through the power supply wiring 202.

The spindle head 183 detachably grips the outer cylinder 181, and in the case of a horizontal machining center, for example, the spindle head 183 vertically moves along the Y-axis guide rails of a column fixed uprightly on a bed.

The rotating shaft 184 has the rotor 185 in non-contact with the inner peripheral portion of the stator 182. The rotor 185 rotates the rotating shaft 184 by the rotating magnetic field generated by the stator 182. The rotating shaft 184 is coupled to a tool holder (not shown) through an interiorly fitted drawbar 203.

The front side bearings 186 and 186 are multi-row angular contact ball bearings, and one end portion of the rotating shaft 184 is fitted in the inner rings 187 and 187, respectively, and the outer rings 190 and 190 are respectively fitted in the front housing 191.

The front housing 191 is formed in a cylindrical shape, and an outer cylinder interiorly-fitting portion 204 is formed in an end portion of the outer cylinder 181. Further, the front housing 191 has an outer peripheral member 205 fitted over its outer peripheral portion. A plurality of U-grooved fluid channels 206 are formed circumferentially in the front housing 191 with respect to this outer peripheral member 205. The fluid channels 206 are communicatingly connected to a cooling oil supplying hose 207 installed on the tool unclamp cylinder 194.

The rear side bearing 188 is a single-row angular contact ball bearing, and the other end portion of the rotating shaft 184 is fitted in its inner ring 189, while its outer ring 192 is fitted in the sleeve housing 193.

The sleeve housing 193 is formed in a cylindrical shape and is fitted in the sleeve housing fixing portion 200 of the outer cylinder 181.

Further, the rotation sensor 198 is disposed at the other end portion of the rotating shaft 184. The rotation sensor 198 consists of a rotator 208 fixed to the other end portion of the rotating shaft 184 and an electrical signal generator 209 fixed to the outer cylinder 181 in close proximity to the outer periphery of this rotator 208. As the rotator 208 rotates together with the rotating shaft 184, the electrical signal generator 209 electrically converts magnetism imparted from the rotator 208 to generate a pulse-like rotation signal, for example. The generated rotation signal is transferred to and monitored by a controller (not shown) through a sensor signal line (not shown) and a transmitter (not shown).

The tool unclamp cylinder 194 is detachably fixed to one end portion of the outer cylinder 181, and has a piston 210 fitted therein for moving in such a manner as to advance and retreat to press the drawbar 203. In addition, the power supply wiring 202 is installed on the tool unclamp cylinder 194 through a plug 211, and the cooling oil supplying hose 207 is screwed down thereto. The cooling oil supplying hose 207 is communicatingly connected to the fluid channels 206 through the interior of this tool unclamp cylinder 194 and the interior of the outer cylinder 181.

In such a spindle apparatus 180, the rotating shaft 184 with the rotor 185, the front side bearings 186, the rear side bearing 188, the front housing 191, the sleeve housing 193, and the rotator 208 of the rotation sensor 198 are integrally assembled to form the spindle sub-cartridge 195. The spindle sub-cartridge 195, the outer cylinder 181, and the tool unclamp cylinder 194 are arranged in a three-divided form.

Figure 26:
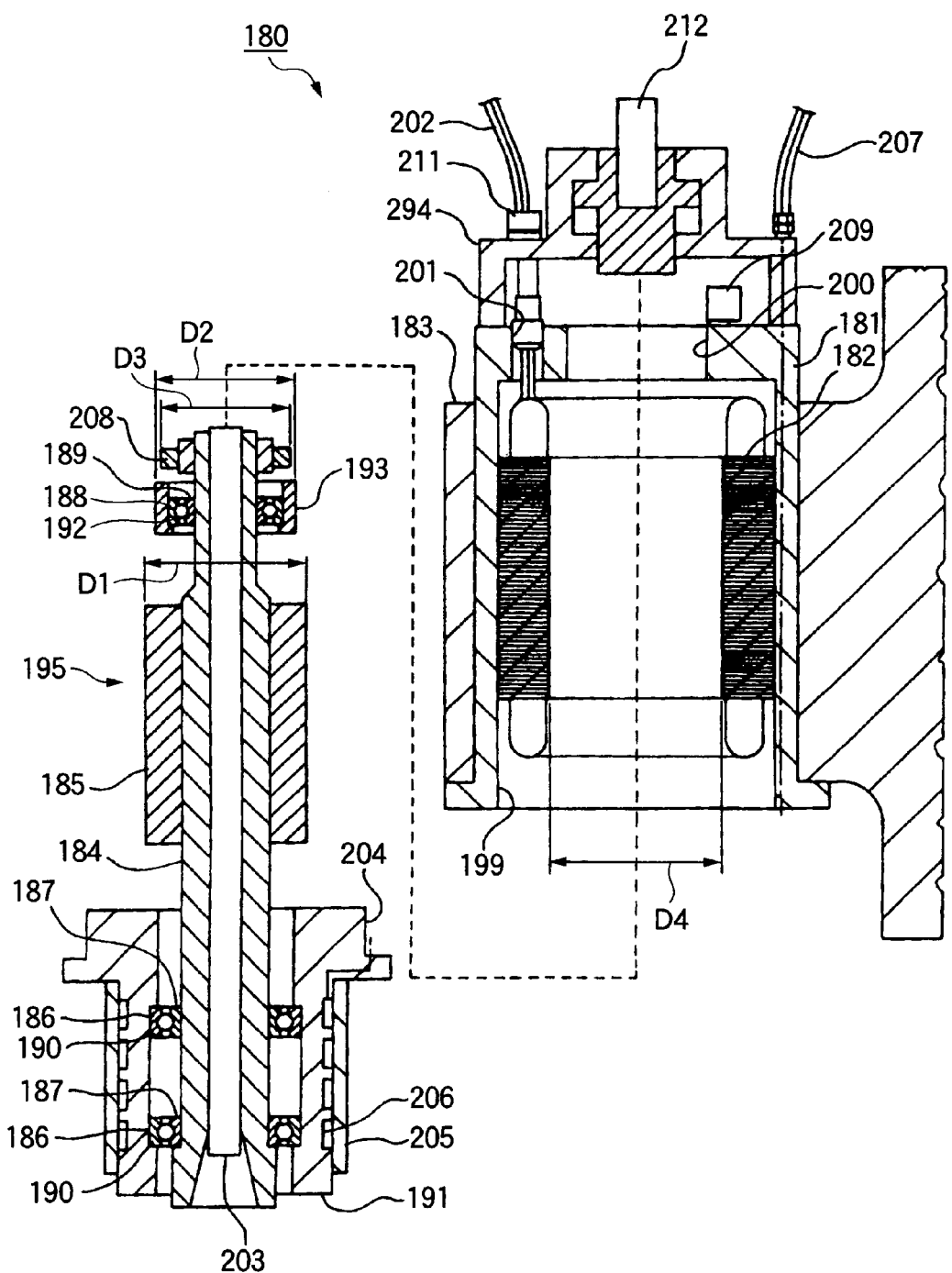
FIG. 26 is a cross-sectional view of a state in which the spindle sub-cartridge is withdrawn from an outer cylinder in accordance with the ninth embodiment.

As shown in FIG. 26, in the spindle apparatus 180, all of the outside diameter D1 of the rotor 185, the outside diameter D2 of the sleeve housing 193, and the outside diameter D3 of the rotator 208 of the rotation sensor 198 are set to be smaller than the inside diameter D4 of the stator 182. For this reason, the spindle sub-cartridge 195 can be withdrawn from the outer cylinder 181, with the front housing 191 heading first. As a result, when it has become necessary to perform maintenance, such as inspection, repair, and replacement, with respect to the rotating shaft 184 with the rotor 185, the front side bearings 186, the rear side bearing 188, the sleeve housing 193, and the rotator 208 of the rotation sensor 198, which make up the spindle sub-cartridge 195, it is possible to easily perform the maintenance operation of the spindle sub-cartridge 195.

Figure 27:
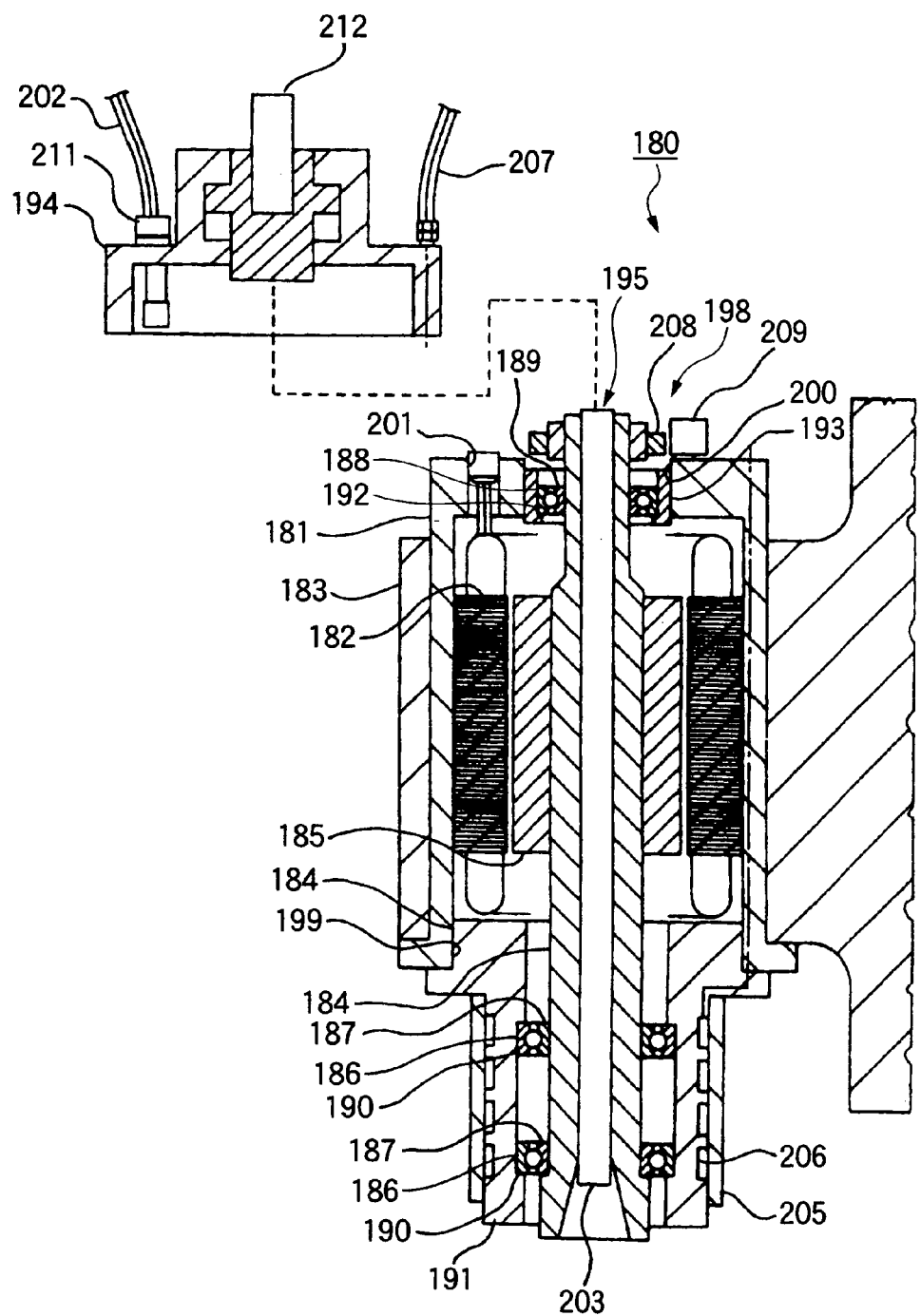
FIG. 27 is a cross-sectional view of a state in which a tool unclamp cylinder is withdrawn from the outer cylinder in accordance with the ninth embodiment.

As shown in FIG. 27, in the spindle apparatus 180, the tool unclamp cylinder 194 is detachably fixed to the end portion of the outer cylinder 181. For this reason, since only the tool unclamp cylinder 194 can be easily withdrawn from the outer cylinder 181, when it has become necessary to perform maintenance, such as inspection, repair, and replacement, with respect to a rotary joint 212, the plug 211 of the power supply wiring 202, and the cooling oil supplying hose 207, which are disposed on the tool unclamp cylinder 194, it is possible to easily perform the maintenance operation for them. Furthermore, by removing the tool unclamp cylinder 194, it is possible to easily perform the maintenance operation, such as inspection, repair, and replacement, in the electrical signal generator 209 of the rotation sensor 198.

Figure 28:
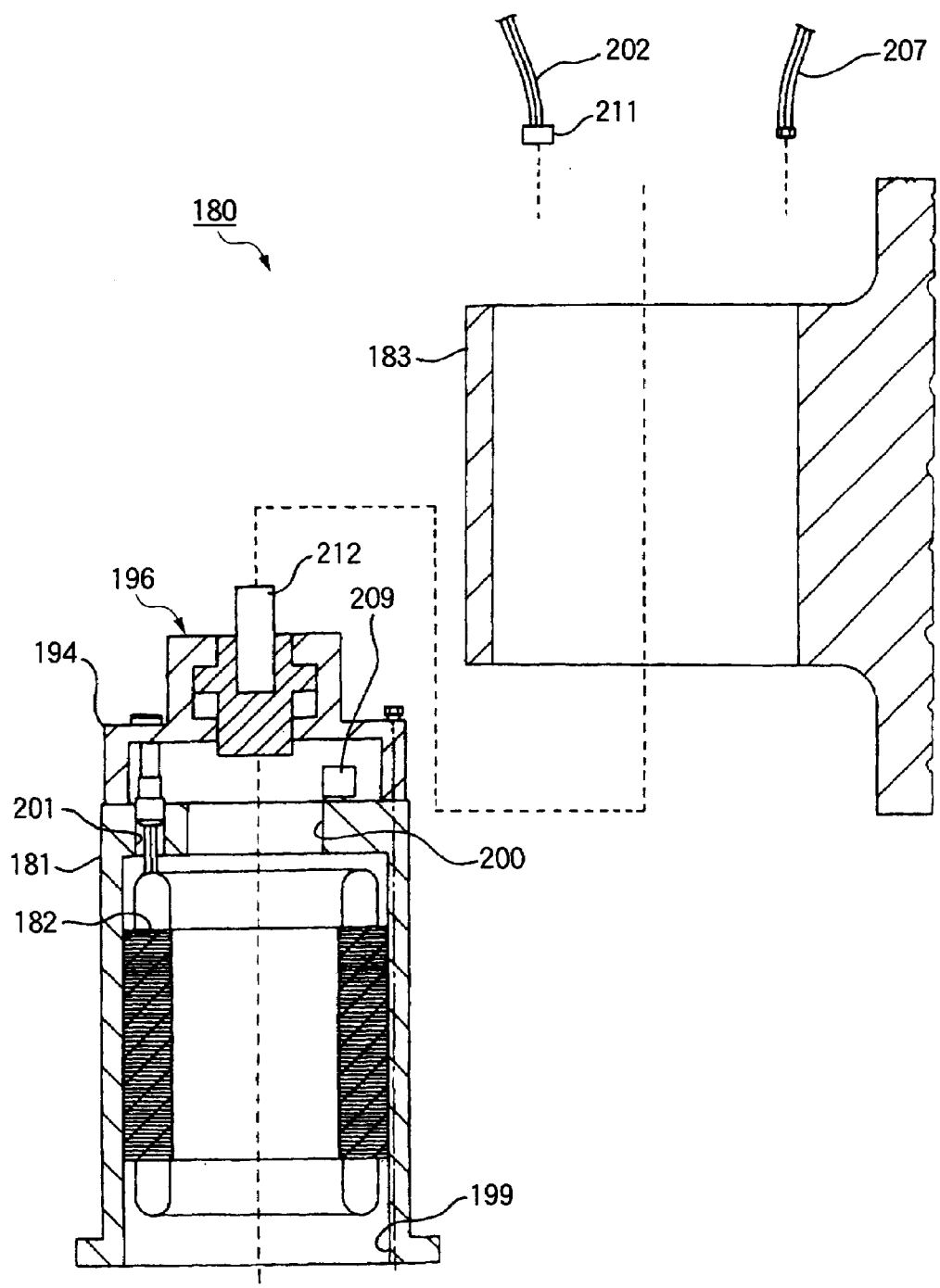
FIG. 28 is a cross-sectional view of a state in which an assembly of the tool unclamp cylinder and the outer cylinder with the spindle sub-cartridge withdrawn therefrom is withdrawn from a spindle head in accordance with the ninth embodiment.

As shown in FIG. 28, with the spindle apparatus 180, since the outer cylinder 181 is detachably gripped by the spindle head 183, the first assembly 196 made up of the tool unclamp cylinder 194 and the outer cylinder 181 with the spindle sub-cartridge 195 withdrawn therefrom can be withdrawn from the spindle head 183. As a result, when it has become necessary to perform maintenance, such as inspection, repair, and replacement, with respect to the outer cylinder 181, it is possible to easily perform the maintenance operation of the outer cylinder 181.

Figure 29:
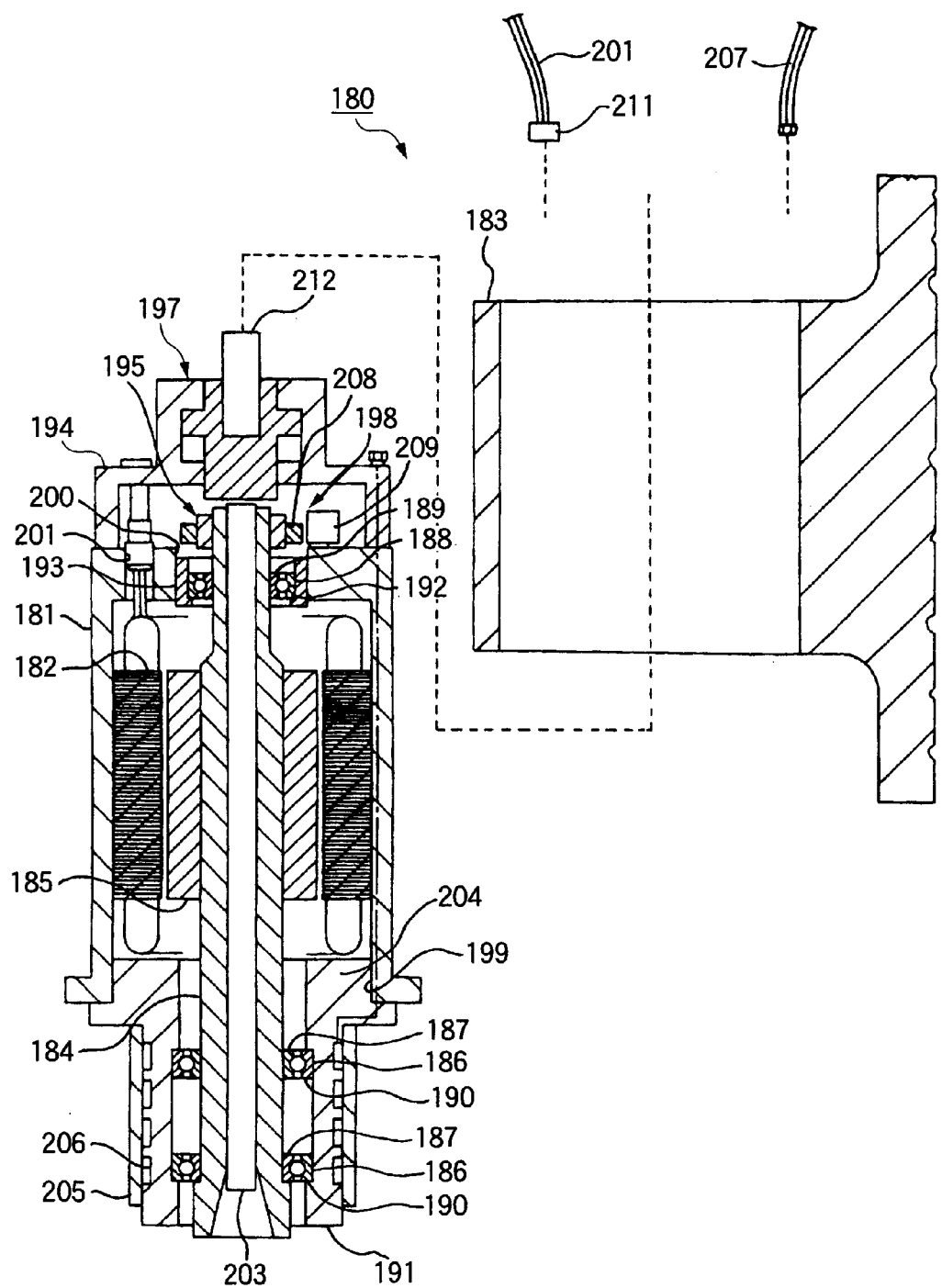
FIG. 29 is a cross-sectional view of a state in which an assembly of the spindle sub-cartridge, the outer cylinder, and the tool unclamp cylinder is withdrawn from the spindle head in accordance with the ninth embodiment.

As shown in FIG. 29, with the spindle apparatus 180, since the outer cylinder 181 is detachably gripped by the spindle head 183, the second assembly 197 made up of the spindle sub-cartridge 195, the outer cylinder 181, and the tool unclamp cylinder 194 can be withdrawn from the spindle head 183. As a result, when it has become necessary to perform maintenance, such as inspection, repair, and replacement, with respect to the second assembly 197 made up of the spindle sub-cartridge 195, the outer cylinder 181, and the tool unclamp cylinder 194, it is possible to easily perform the maintenance operation of the second assembly 197.

According to the spindle apparatus 180 of the ninth embodiment, the rotating shaft 184 with the rotor 185, the front side bearings 186, the rear side bearing 188, the front housing 191, and the sleeve housing 193 are integrally assembled to form the spindle sub-cartridge 195, and the spindle sub-cartridge 195; the outer cylinder 181, and the tool unclamp cylinder 194 are arranged in a three-divided form; and the spindle sub-cartridge 195 can be withdrawn from the outer cylinder 181. Accordingly, since the rotating shaft 184 with the rotor 185, the front side bearings 186, the rear side bearing 188, the front housing 191, and the sleeve housing 193, which make up the spindle sub-cartridge 195, can be withdrawn integrally from the outer cylinder 181, only the rotating shaft 184, the front side bearings 186, and the rear side bearing 188 which require inspection, repair, or replacement can be easily dismounted without disassembling the entire spindle apparatus 180.

In addition, according to the spindle apparatus 180 of the ninth embodiment, the tool unclamp cylinder 194 is withdrawable from the outer cylinder 181. As a result, only the tool unclamp cylinder 194 which requires inspection, repair, or replacement can be easily dismounted without disassembling the entire spindle apparatus 180.

In addition, according to the spindle apparatus 180 of the ninth embodiment, the first assembly 196 of the tool unclamp cylinder 194 and the outer cylinder 181 with the spindle sub-cartridge 195 withdrawn therefrom is withdrawable from the spindle head 183. As a result, in addition to the spindle sub-cartridge 195, the first assembly 196 of the outer cylinder 181 and the tool unclamp cylinder 194 which requires inspection, repair, or replacement can be easily dismounted from the spindle head 183 without disassembling the entire spindle apparatus 180.

In addition, according to the spindle apparatus 180 of the ninth embodiment, the second assembly 197 of the spindle sub-cartridge 195, the outer cylinder 181, and the tool unclamp cylinder 194 is withdrawable from the spindle head 183. As a result, the second assembly 197 of the spindle sub-cartridge 195, the outer cylinder 181, and the tool unclamp cylinder 194 which requires inspection, repair, or replacement can be easily dismounted from the spindle head 183 without disassembling the entire spindle apparatus 180.

Figure 30:
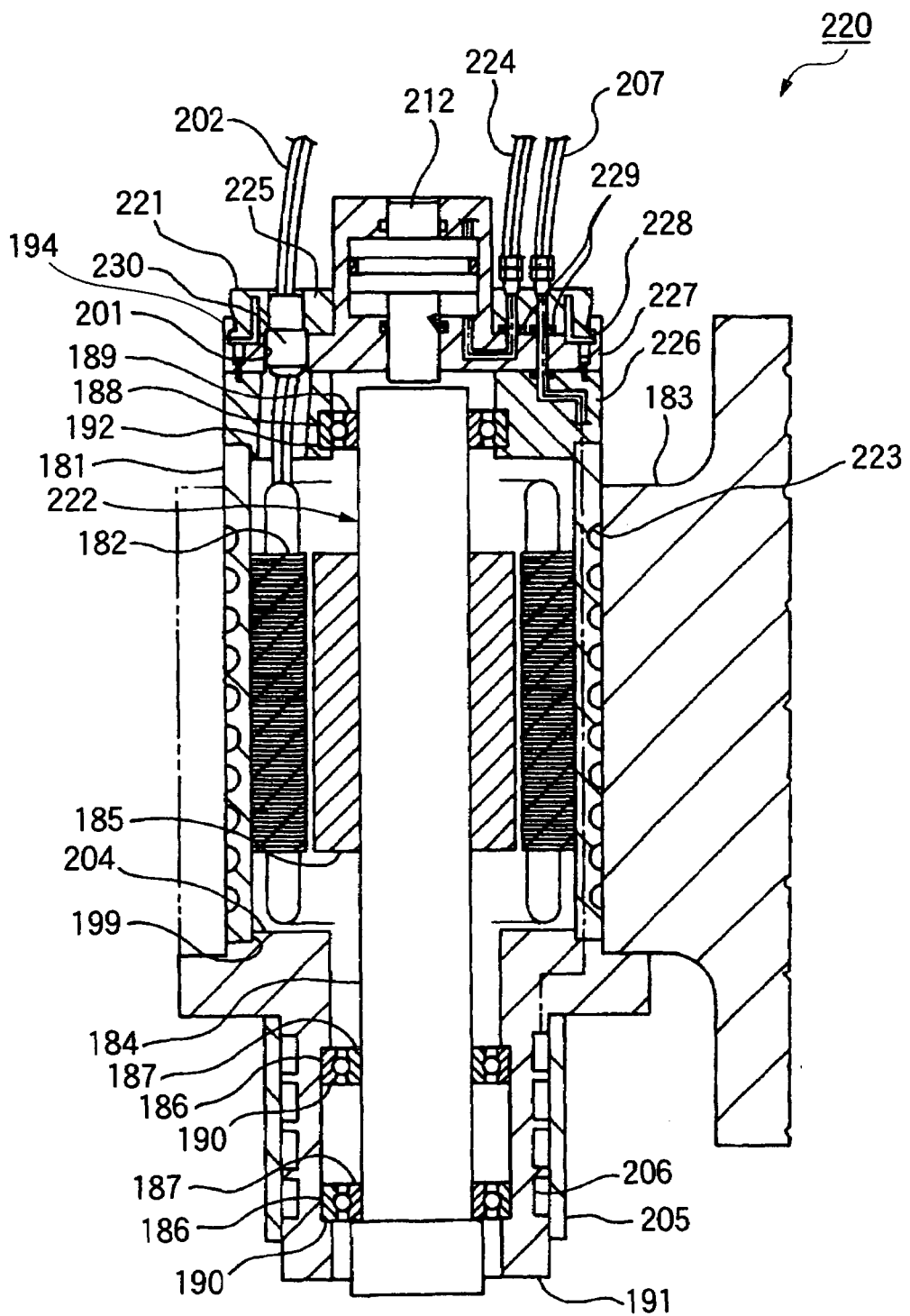
FIG. 30 is a cross-sectional view illustrating a 10th embodiment of the invention.
Figure 31:
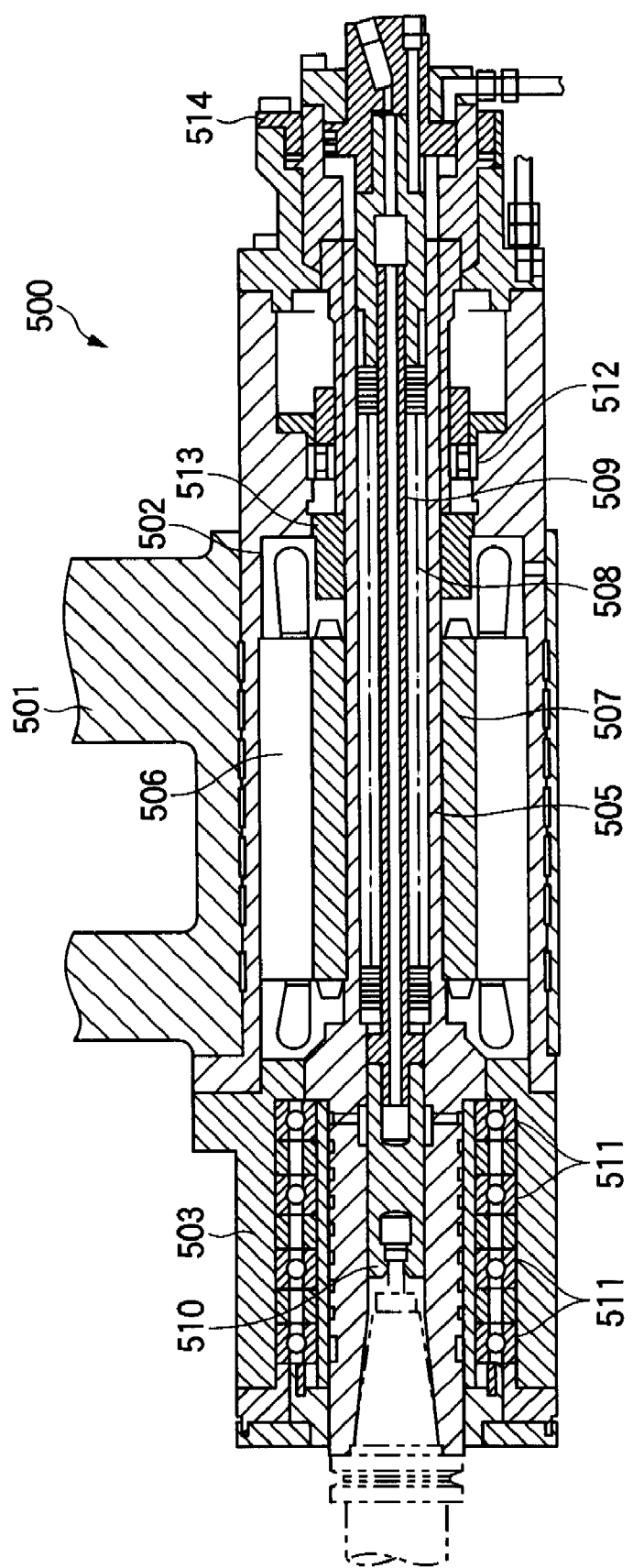
FIG. 31 is a longitudinal cross-sectional view of a conventional spindle apparatus.

FIG. 30 shows a 10th embodiment of the invention. The characteristic of this embodiment lies in that a coupler 221 on which various fluid pipings and various power supply cables are disposed is detachably mounted on the tool unclamp cylinder 194. Since the other arrangements are identical to those of the first embodiment, identical members will be denoted by the same reference numerals, and a detailed description thereof will be omitted.

As shown in FIG. 30, a spindle apparatus 220 in accordance with the 10th embodiment adopts the spindle cartridge system, the coupler 221 on which various fluid pipings and various power supply cables are disposed is detachably mounted on the tool unclamp cylinder 194.

Here, oil and air pressure pipings necessary for a spindle cartridge 222 include a cooling oil supply line, an oil pressure supply line, a cutting fluid supply line, an air purge supply line, a taper cleaning air supply line, and the like. In addition, electric cables necessary for the spindle cartridge 222 include a motor power cable, a motor rotation sensor cable, a detection switch cable, and the like. Further, when the spindle cartridge 222 is disassembled from or assembled to the spindle head 183, it is necessary to disengage these many fluid pipings and the power cables, and the operation takes time. Accordingly, the spindle apparatus 220 uses the coupler 221 in which those portions of the various fluid pipings and the various power cables that are connected to the spindle cartridge 222 are integrated.

In the coupler 221, connected to a plug 225 are the cooling oil supplying hose 207 for supplying cooling oil to fluid channels 223 formed in the outer peripheral portion of the outer cylinder 181 and to the fluid channels 206 in the front housing 191; an oil pressure hose 224 for supplying oil pressure to the tool unclamp cylinder 194; and the power supply wiring 202. Further, a socket 227 is fixed to a sleeve housing 226 which is coupled to the outer end portion of the outer cylinder 181 and in which the outer ring 192 of the rear side bearing 188 is fitted. The plug 225 and the socket 227 are fixed by pawls 228, and the pawls 228 are fastened to each other by being merely pressed. When the plug 225 is removed, the plug 225 is adapted to be pulled out by releasing the catches.

In addition, a seal 229 is disposed in the oil and air pressure lines between the plug 225 and the socket 227, so that oil and air are prevented from leaking. At this time, if a valve, which is opened and closed by the attaching and detaching operation, is incorporated in the oil pressure line, no oil leakage occurs when the coupler 221 is removed, so that the operating efficiency is excellent. In addition, a cable coupler 230 is provided for the coupler 221, and the cable coupler 230 is attached or detached at the same time as the attaching and detaching operation of the coupler 221. Such a structure may be applied to such as the cutting fluid supply line, the air purge supply line, the taper cleaning air supply line, the motor rotation sensor cable, and the detection switch cable.

By so doing, when the spindle cartridge 222 is disassembled from or assembled to the spindle head 183, the power supply wiring 202 and the many oil and air pressure pipings, such as the cooling oil supply hose 207 and the oil pressure supply hose 224, can be disengaged at one time without a tool, making it possible to reduce the operating time. In addition, as the power supply coupler 230 and opening and closing valves for the various fluid pipings 207 and 224 are provided for the coupler 221, if the operation is performed at the time of inspection, repair, or replacement after closing the various fluid pipings 207 and 224 and removing the power supply wiring 202, the operation can be performed while preventing the leakage of the fluid, entanglement of the power supply wiring, and the like. At this time, fastening with two or three bolts, for example, may be used instead of the coupler 221. By so doing, the structure can be made simple without greatly losing the operating efficiency. Further, if the structure having such a coupler 221 is applied to the spindle sub-cartridge system, when the front side bearing 186 or the rear side bearing 188 is replaced, the replacement time can be shortened by removing the spindle sub-cartridge 195 (see FIG. 25), and when the stator 182 is replaced, the entire spindle cartridge can be replaced in a short time by removing the coupler 221.

It should be noted that the spindle apparatuses in accordance with the ninth and 10th embodiments are not limited to the above-described modes for carrying out the invention, and appropriate modifications, improvements, and the like are possible.

For example, in addition to being applied to a machining center, the spindle apparatus may be applied to an NC machine tool, a general purpose machine tool for effecting feeding operation manually, and the like.

In addition, the front and rear side bearings are not limited to angular contact ball bearings, and may be deep groove ball bearings or rolling bearings such as various roller bearings.

Although the invention is described in detail and with reference to specific embodiments, it will be obvious to those skilled in the art that various changes and modifications may be made without departing from the spirit and scope of the invention.

This application is based on Japanese Patent Application filed on Apr. 7, 2003 (Japanese Patent Application No. 2003-103219), Japanese Patent Application filed on Dec. 17, 2003 (Japanese Patent Application No. 2003-419854), Japanese Patent Application filed on Mar. 31, 2003 (Japanese Patent Application No. 2003-096503), Japanese Patent Application filed on Jan. 5, 2004 (Japanese Patent Application No. 2004-000261), and Japanese Patent Application filed on Nov. 14, 2003 (Japanese Patent Application No. 2003-384703), the contents of which are incorporated herein by reference.

INDUSTRIAL APPLICABILITY

As described above, the spindle apparatus and the machine tool having the spindle apparatus in accordance with the invention make it possible to provide a spindle apparatus which facilitates assembling and removing operations at the time of maintenance and which is low cost. Further, the spindle apparatus and the machine tool having the spindle apparatus in accordance with the invention make it possible to provide a spindle apparatus which has high stiffness and excels in satisfactory damping properties and slidability. Still further, the spindle apparatus and the machine tool having the spindle apparatus in accordance with the invention make it possible to provide a machine tool in which a spindle cartridge or a spindle sub-cartridge can be disassembled and assembled in a short time, which minimizes the machine height, and which has high stiffness. Furthermore, the spindle apparatus and the machine tool having the spindle apparatus in accordance with the invention make it possible to attain improvement of the maintenance efficiency by making it possible to facilitate the operation of replacing all internal component parts.

Furthermore, since the spindle apparatus of the invention is constructed and operates as described above, a sub-assembly made up of the front housing, the rotating shaft, and the bearing sleeve is withdrawable from the outer cylinder. As a result, the assembling efficiency improves, and these parts can be replaced speedily when they became damaged. In addition, as for the bearing sleeve, since the rear side bearing is in an assembled state, the state of grease does not change in the withdrawal and insertion of the sub-assembly.

Accordingly, with this spindle apparatus, as the sub-assembly is kept in stock after performing the running-in operation in advance by using another outer cylinder, the sub-assembly can be replaced at the time of the damage of the spindle apparatus, and the normal operation is made possible immediately, thereby permitting a substantial reduction in downtime. In addition, a cost reduction is made possible in comparison with the replacement of the entire spindle apparatus, and a reduction in inventory cost is also made possible. As a result, it becomes possible to overcome the conventional problem that the downtime becomes long since the running-in operation of the bearings is required after assembly in the case of grease lubrication for which the time and trouble in maintenance cannot be reduced.

In addition, the diameter becomes smaller in the order of the inner peripheral diameter of the outer cylinder, the inside diameter of the stator, and the outside diameter of the bearing sleeve. To ensure that the non-rotating part does not constitute a hindrance when an attempt is made to withdraw the spindle in the rear of the bearing sleeve, the radius of the rotating part in an arbitrary section is smaller than a minimum radius of the non-rotating part between the rear end of the bearing sleeve and that section, thereby preventing the non-rotating part from constituting a hindrance. Accordingly, when an attempt is made to withdraw the sub-assembly, the piston mechanism and the like, which are the non-rotating part, for holding/releasing the tool do not constitute a hindrance Furthermore, since the spindle apparatus of the invention is constructed and operates as described above, the sub-assembly made up of the front housing, the rotating shaft, and the bearing sleeve is withdrawable from the outer cylinder. As a result, the assembling efficiency improves, and these parts can be replaced speedily when they became damaged. In addition, as for the bearing sleeve, since the rear side bearing is in an assembled state, the state of grease does not change in the withdrawal and insertion of the sub-assembly.

Accordingly, with this spindle apparatus, as the sub-assembly is kept in stock after performing the running-in operation in advance by using another outer cylinder, the sub-assembly can be replaced at the time of the damage of the spindle apparatus, and the normal operation is made possible immediately, thereby permitting a substantial reduction in downtime. In addition, a cost reduction is made possible in comparison with the replacement of the entire spindle apparatus, and a reduction in inventory cost is also made possible.

In addition, since the tool replacement is effected through the piston mechanism by the inside diameter part incorporated in the rotating shaft, in comparison with an externally exposed type, it is possible to effect the tool replacement with high lubricating performance.

Furthermore, since the spinndle apparatus of the invention is constructed and operates as described above, unclamping can be performed appropriately as the distance between the mounting reference plane of the sub-assembly and the piston pressing surface of the inside diameter part is adjusted to within ±0.1 mm relative to the reference dimension. Therefore, piston adjustment is made unnecessary at the time of performing the replacement of the sub-assembly, making it possible to improve the maintenance efficiency.

Furthermore, since the spindle apparatus of the invention is constructed and operates as described above, the inside diameter part is incorporated in such a manner as to be capable of compressing a spring, and the adjustment part is fixed to a rear portion of the inside diameter part, the piston pressing surface for pressing the piston mechanism being formed on the adjustment part. Therefore, since the amount of pushing of the tool holder can be set to a predetermined value by the adjustment part, it is possible to appropriately effect unclamping by adjusting its tolerance. As a result, piston adjustment is made unnecessary at the time of performing replacement of the inside diameter part, making it possible to improve the maintenance efficiency.

Furthermore, since the spindle apparatus of the invention is constructed and operates as described above, the front housing is fitted to the outer cylinder with an interference fit. Therefore, in cases such as where the sub-assembly is subjected to disassembly, assembly, or replacement, offset does not occur between the axes of the front housing and the outer cylinder, making it possible to maintain high accuracy.

Furthermore, since the spindle apparatus of the invention is constructed and operates as described above, the bearing sleeve is fitted in the sleeve housing, and the outside diameter of the bearing sleeve is clearance-fitted with respect to the inside diameter of the sleeve housing. Therefore, the rear side bearing and the bearing sleeve function mainly to support the rotating shaft, but are capable of absorbing with a simple structure the axial displacement such as thermal expansion due to the heat generation by the rotor.

Furthermore, since the spindle apparatus of the invention is constructed and operates as described above, a plurality of pairs of O-rings are interposed between the outside diameter of the bearing sleeve and the inside diameter of the sleeve housing. Therefore, the leakage of the lubricant is prevented by the plurality of pairs of O-rings between the outside diameter of the bearing sleeve and the inside diameter of the sleeve housing, and the vibration of the bearing sleeve can be damped by the damping effect based on the interference of the O-rings.

Furthermore, since the spindle apparatus of the invention is constructed and operates as described above, the ratio between, on the one hand, a fitting length of the bearing sleeve and the sleeve housing and, on the other hand, the outside diameter of the bearing sleeve is set within a range of "fitting length/outside diameter=0.45 to 0.8." Therefore, the outside diameter of the bearing sleeve and the length of the fitting portion of the sleeve housing are set to an appropriate relationship, so that it is possible to obtain a structure of the sub-assembly excelling in the maintenance efficiency and the performance of the machine tool.

Furthermore, since the spindle apparatus of the invention is constructed and operates as described above, there are provided a plurality of lubricant discharging holes provided circumferentially in the bearing sleeve, circumferential grooves provided in a fitting surface of the outer periphery of the bearing sleeve, and radial lubricant supplying passages communicatingly connected to the circumferential grooves. Therefore, it becomes possible to discharge the lubricant without a problem at whatever phase the bearing sleeve may be. Although a discharging hole is required on the lower side in the case of, for instance, a horizontally mounted spindle, discharging can be effected since one of the holes faces the lower side. Furthermore, the lubricant can be supplied at whatever position the bearing sleeve may be.

Accordingly, it becomes unnecessary to adjust the phase of the bearing sleeve, so that the operating efficiency in maintenance is excellent.

Furthermore, since the spindle apparatus of the invention is constructed and operates as described above, the rear side bearing is a back-to-back arrangement angular contact ball bearing with fixed-position preload. Therefore, it is possible to absorb with a simple structure the axial displacement such as thermal expansion due to the heat generation by the rotor.

Furthermore, since the spindle apparatus of the invention is constructed and operates as described above, grease lubrication is adopted. Therefore, maintenance can be performed at a small cost by virtue of grease lubrication which is easy to handle and is relatively inexpensive.

Furthermore, since the spindle apparatus of the invention is constructed and operates as described above, a grease replenishing unit is provided. Therefore, it is possible to replenish the shortage of grease by the grease replenishing unit, making it possible to avoid a seizure and the like.

Furthermore, since the spindle apparatus of the invention is constructed and operates as described above, a mechanism is provided for discharging excess grease after the supply of grease. Therefore, the lubricant which is supplied to the interior of the bearing and has become unnecessary adheres to a rotating member such as an outer ring spacer disposed in the vicinity of the bearing. The lubricant adhering to the rotating member is slung off to outside the bearing by the rotational force. Consequently, the lubricant which became unnecessary can be forcibly discharged to outside the bearing.

Furthermore, since the spindle apparatus of the invention is constructed and operates as described above, a very small amount of lubrication of any one of oil-air, oil-mist, and direct-injection lubrication is used. Therefore, it is possible to effect highly efficient lubrication through a very small amount of lubrication of anyone of oil-air, oil-mist, and direct-injection lubrication, so that anti-seizure properties can be improved further.

Furthermore, since the spindle apparatus of the invention is constructed and operates as described above, an elastic body is arranged between fitting surfaces of the sleeve housing and the bearing sleeve made movable in the axial direction of the rotating shaft by fitting to the sleeve housing. Therefore, it is possible to increase the radial stiffness by the elastic body and improve the damping factor on the axial direction, thereby making it possible to prevent the self-excited vibration of the rotating shaft. In addition, since a fluid for applying pressure is arranged to be supplied to the elastic body, it is possible to further increase the radial stiffness by allowing the elastic body to be deformed, and enhance the effect of suppressing the self-excited vibration of the rotating shaft by improving the damping factor on the axial direction.

Furthermore, since the spindle apparatus of the invention is constructed and operates as described above, the elastic body is an O-ring, and the fluid is compressed air, the compressed air being supplied between the O-rings provided in a plural number, so as to apply the pressure to the O-rings. Therefore, it is possible to effectively prevent the self-excited vibration of the rotating shaft by increasing the radial stiffness while maintaining high slidability. In addition, since the O-ring excels in workability and versatility, a high-performance spindle apparatus can be fabricated without requiring a complex manufacturing process.

Furthermore, since the spindle apparatus of the invention is constructed and operates as described above, the pressure of the fluid for applying pressure to the elastic body is made variable. Therefore, the amount of deformation of the elastic body due to the pressure of the fluid can be varied by changing the pressure in correspondence with the working conditions of the spindle apparatus. In addition, the self-excited vibration of the rotating shaft can be effectively prevented by setting the radial stiffness and the damping factor of the elastic body to values optimal to the working conditions. In addition, the radial stiffness and the damping factor of the elastic body can be changed by merely changing the pressure of the fluid supplied, and can be changed very easily.

Furthermore, since the spindle apparatus of the invention is constructed and operates as described above, the O-ring is formed of nitrile rubber or fluoro rubber, and the interference of the O-ring is set to be not less than 10% of a working standard value and not more than the working standard value. Therefore, the O-ring has a sealing effect and an elastically supporting effect, has wear resistance against the axial movement and heat resistance against heat generation, and can thereby be made to have a long life. In addition, it is possible to improve the radial stiffness and the axial damping properties while maintaining the slidability by appropriately increasing the stiffness of the O-ring.

Furthermore, since the spindle apparatus of the invention is constructed and operates as described above, a plurality of sets of elastic bodies are disposed, each of the sets being formed by a plurality of elastic bodies, one of the sets of elastic bodies arranged at both ends being disposed on the bearing sleeve, the other one of the sets of elastic bodies on the sleeve housing. Consequently, the assembly is facilitated, and the possibility of causing damage to the O-rings is small. It should be noted that the effect whereby the movement of the bearing sleeve is allowed to take place uniformly an stably in cases where various loads are applied to the spindle apparatus is identical to a case where the elastic body is disposed only on the bearing sleeve and a case where it is disposed only on the sleeve housing. Further, an arrangement may be provided such that two elastic bodies are disposed in the spindle apparatus, one on the bearing sleeve and the other on the sleeve housing, and a fluid is supplied to between the elastic bodies.

Furthermore, since the spindle apparatus of the invention is constructed and operates as described above, the spindle cartridge is inserted in the spindle cartridge gripping portion provided in the axial direction of the spindle head, and the amount of movement in the feeding axis direction parallel to the axial direction of the rotating shaft is set to be longer than the length necessary for inserting the spindle cartridge into the spindle head. The spindle cartridge is thereby capable of being disassembled and assembled integrally with respect to the spindle head. Consequently, since the amount of movement in the Z-axis, which is the feeding axis direction parallel to the axial direction of the rotating shaft, is set to be longer than the length necessary for inserting the spindle cartridge into the spindle head, it is possible to easily effect the withdrawal making use of the Z-axis feeding.

Furthermore, since the spindle apparatus of the invention is constructed and operates as described above, the amount of movement in the feeding axis direction parallel to the axial direction of the rotating shaft is set to be longer than the length necessary for inserting the spindle sub-cartridge into the spindle head. The spindle sub-cartridge is thereby capable of being disassembled and assembled integrally with respect to the spindle head. Consequently, since the amount of movement in the Z-axis, which is the feeding axis direction parallel to the axial direction of the rotating shaft, is set to be longer than the length necessary for inserting the spindle sub-cartridge into the spindle head, it is possible to easily effect the withdrawal making use of the Z-axis feeding.

Furthermore, since the spindle apparatus of the invention is constructed and operates as described above, the spindle cartridge gripping portion of the spindle head can be disassembled by being divided at a position for dividing at least in half. Consequently, even if, for instance, the amount of Z-axis movement is set to be short, removal and assembly can be performed by dividing and developing the spindle cartridge gripping portion of the spindle head. Further, the stiffness of the entire machine tool can be increased by increasing the fastening stiffness of the spindle cartridge and the spindle head.

Furthermore, since the spindle apparatus of the invention is constructed and operates as described above, the rotating shaft with the rotor, the front side bearing, the rear side bearing, the front housing, and the sleeve housing are integrally assembled to form the spindle sub-cartridge, the spindle sub-cartridge, the outer cylinder, and the tool unclamp cylinder are arranged in a three-divided form, and the spindle sub-cartridge is withdrawable from the outer cylinder.

Accordingly, since the rotating shaft with the rotor, the front side bearing, the rear side bearing, the front housing, and the sleeve housing, which make up the spindle sub-cartridge, can be withdrawn integrally from the outer cylinder, only the rotating shaft, the front side bearing, and the rear side bearing which require inspection, repair, or replacement can be easily dismounted without disassembling the entire spindle apparatus. Consequently, it becomes possible to control any parts making up the spindle cartridge without removing the wirings and pipings.

Furthermore, since the spindle apparatus of the invention is constructed and operates as described above, the tool unclamp cylinder is withdrawable from the outer cylinder. Consequently, since only the tool unclamp cylinder can be easily dismounted without disassembling the entire spindle apparatus, inspection, repair, or replacement is easily possible for any parts making up the tool unclamp cylinder.

Furthermore, since the spindle apparatus of the invention is constructed and operates as described above, an assembly of the tool unclamp cylinder and the outer cylinder with the spindle sub-cartridge withdrawn therefrom is withdrawable from the spindle head. Consequently, in addition to the spindle sub-cartridge, an assembly of the outer cylinder and the tool unclamp cylinder can be easily dismounted from the spindle head without disassembling the entire spindle apparatus, so that inspection, repair, or replacement is easily possible for any parts making up the outer cylinder or the tool unclamp cylinder.

Furthermore, since the spindle apparatus of the invention is constructed and operates as described above, an assembly of the spindle sub-cartridge, the outer cylinder, and the tool unclamp cylinder is withdrawable from the spindle head. Consequently, an assembly of the spindle sub-cartridge, the outer cylinder, and the tool unclamp cylinder can be easily dismounted from the spindle head without disassembling the entire spindle apparatus, so that inspection, repair, or replacement is easily possible for any parts making up the spindle apparatus.

Furthermore, since the spindle apparatus of the invention is constructed and operates as described above, a coupler having various fluid pipings and a power supply coupler is detachably installed on the tool unclamp cylinder or the outer cylinder. Consequently, as a power supply coupler and opening and closing valves for the various fluid pipings are provided for the coupler, if the operation is performed at the time of inspection, repair, or replacement after closing the various fluid pipings and removing the power supply wiring, the operation can be performed while preventing the leakage of the fluid, entanglement of the power supply wiring, and the like.

Furthermore, since the spindle apparatus of the invention is constructed and operates as described above, a sensor for detecting the rotation of the rotating shaft is disposed between the rotating shaft and the outer cylinder. Consequently, the inspection, repair, or replacement of the sensor becomes possible by merely removing the tool unclamp cylinder.

The invention claimed:

1. A spindle apparatus comprising:
an outer cylinder having a stator;
a rotatable rotating shaft having a rotor;
a front side bearing having an outer ring fixed to a front housing and an inner ring fitted over one end of the rotating shaft;
a bearing sleeve disposed on another end side of the rotating shaft and fitted in the outer cylinder so as to be movable in an axial direction of the rotating shaft; and
a rear side bearing having an inner ring fitted over the other end of the rotating shaft and an outer ring fixed to the bearing sleeve to rotatably support the rotating shaft in cooperation with the front side bearing,
wherein the diameter becomes smaller in the order of an inner peripheral diameter of the outer cylinder, an inside diameter of the stator, and an outside diameter of the bearing sleeve,
wherein a sub-assembly made up of the front housing, the rotating shaft, and the bearing sleeve is withdrawable from the outer cylinder,
wherein a radius of a rotating part in an arbitrary section located rearwardly of the bearing sleeve is smaller than a minimum radius of a non-rotating part between a rear end of the bearing sleeve and the section, and
wherein the front housing is fitted to the outer cylinder with an interference fit.

2. The spindle apparatus according to claim 1, wherein the bearing sleeve is fitted in a sleeve housing, and an outside diameter of the bearing sleeve is clearance-fitted with respect to an inside diameter of the sleeve housing.

3. The spindle apparatus according to claim 2, wherein a plurality of pairs of O-rings are interposed between the outside diameter of the bearing sleeve and the inside diameter of the sleeve housing.

4. The spindle apparatus according to claim 2, wherein a ratio between a fitting length of the bearing sleeve and the sleeve housing, and an outside diameter of the bearing sleeve is set within a range of fitting length to outside diameter equal to between 0.45 and 0.8.

5. The spindle apparatus according to claim 1, wherein there are provided a plurality of lubricant discharging holes provided circumferentially in the bearing sleeve, circumferential grooves provided in a fitting surface of an outer periphery of the bearing sleeve, and radial lubricant supplying passages communicatingly connected to the circumferential grooves.

6. The spindle apparatus according to claim 1, wherein the rear side bearing is arranged in a back-to-back arrangement with a second rear side angular contact ball bearing with fixed-position preload.

7. The spindle apparatus according to claim 1, wherein grease lubrication is adopted.

8. The spindle apparatus according to claim 7, wherein a mechanism is provided for discharging excess grease after the supply of grease.

9. The spindle apparatus according to claim 1, further comprising:
a grease replenishing unit.

10. The spindle apparatus according to claim 1, wherein an amount of lubrication of any one of oil-air, oil-mist, and direct-injection lubrication is used.

11. The spindle apparatus according to claim 10, wherein the front housing is fitted into the outer cylinder with the interference fit.

12. A spindle apparatus comprising:
an outer cylinder having a stator;
a rotatable rotating shaft having a rotor;
a front side bearing having an outer ring fixed to a front housing and an inner ring fitted over one end of the rotating shaft;
a bearing sleeve disposed on another end side of the rotating shaft and fitted in the outer cylinder so as to be movable in an axial direction of the rotating shaft; and
a rear side bearing having an inner ring fitted over the other end of the rotating shaft and an outer ring fixed to the bearing sleeve to rotatably support the rotating shaft in cooperation with the front side bearing,
wherein a sub-assembly made up of the front housing, the rotating shaft, and the bearing sleeve is withdrawable from the outer cylinder, and
an inside diameter part capable of clamping and unclamping a tool is incorporated in the rotating shaft, and a piston mechanism for tool replacement is provided, and
wherein the front housin2 is fitted to theouter cylinder with an interference fit.

13. The spindle apparatus according to claim 12, wherein a distance between a mounting reference plane of the sub-assembly and a piston pressing surface of the inside diameter part is adjusted to within .+-.0.1 mm relative to a reference dimension.

14. The spindle apparatus according to claim 13, wherein the inside diameter part is incorporated in such a manner as to be capable of compressing a spring, and an adjustment part is fixed to a rear portion of the inside diameter part, the piston pressing surface for pressing the piston mechanism being formed on the adjustment part.

15. The spindle apparatus according to claim 12, wherein the front housing is fitted into the outer cylinder with the interference fit.

16. The spindle apparatus according to claim 12, wherein the bearing sleeve is fitted in a sleeve housing, and
an outside diameter of the bearing sleeve is clearance-fitted with respect to an inside diameter of the sleeve housing.

17. The spindle apparatus according to claim 16, wherein a plurality of pairs of O-rings are interposed between the outside diameter of the bearing sleeve and the inside diameter of the sleeve housing.

18. The spindle apparatus according to claim 16, wherein a ratio between a fitting length of the bearing sleeve and the sleeve housing, and an outside diameter of the bearing sleeve is set with a range of fitting length to outside diameter eciual to 0.45 to 0.8.

19. The spindle apparatus according to claim 12, wherein there are provided a plurality of lubricant discharging holes provided circumferentially in the bearing sleeve, circumferential grooves provided in a fitting surface of an outer periphery of the bearing sleeve, and radial lubricant supplying passages communicatingly connected to the circumferential grooves.

20. The spindle apparatus according to claim 12, wherein the rear side bearing is arranged in a back-to-back arrangement with a second rear side angular contact ball bearing with fixed-position preload.

21. The spindle apparatus according to claim 12, wherein grease lubrication is adopted.

22. The spindle apparatus according to claim 21, wherein a mechanism is provided for discharging excess grease after the supply of grease.

23. The spindle apparatus according to claim 12, further comprising:

a grease replenishing unit.

24. The spindle apparatus according to claim 12, wherein an amount of lubrication of any one of oil-air, oil-mist, and direct-injection lubrication is used.

* * * * *